(12) United States Patent  
Chang et al.

(10) Patent No.: US 9,274,377 B2
(45) Date of Patent: Mar. 1, 2016

(54) LIQUID CRYSTAL DISPLAY DEVICE

(75) Inventors: Hak Sun Chang, Yongin-si (KR); Eun-Kil Park, Cheonan-si (KR); Hyun-Ho Kang, Ansan-si (KR); Jang Wi Ryu, Seoul (KR); Seung-Suk Yang, Asan-si (KR); Ki Chul Shin, Suwon-si (KR); Se Hyun Lee, Seoul (KR); Jae-Soo Jang, Suwon-si (KR); Hyo Ju Jung, Incheon (KR)

(73) Assignee: Samsung Display Co., Ltd., Yongin-si (KR)

( * ) Notice: Subject to any disclaimer, the term of this patent is extended or adjusted under 35 U.S.C. 154(b) by 553 days.

(21) Appl. No.: 13/613,331

(22) Filed: Sep. 13, 2012

(65) Prior Publication Data

US 2013/0242239 A1    Sep. 19, 2013

(30) Foreign Application Priority Data

Mar. 13, 2012 (KR) .................. 10-2012-0025561
Mar. 14, 2012 (KR) .................. 10-2012-0026073

(51) Int. Cl.
*G02F 1/1343* (2006.01)
*G02F 1/1337* (2006.01)
*G02F 1/1333* (2006.01)
*G02F 1/1362* (2006.01)

(52) U.S. Cl.
CPC .... *G02F 1/133707* (2013.01); *G02F 1/134336* (2013.01); *G02F 1/133345* (2013.01); *G02F 2001/133742* (2013.01); *G02F 2001/134345* (2013.01); *G02F 2001/136222* (2013.01)

(58) Field of Classification Search
None
See application file for complete search history.

(56) References Cited

U.S. PATENT DOCUMENTS

| 2003/0193625 | A1 | 10/2003 | Yoshida et al. |
| 2006/0227270 | A1 | 10/2006 | Ahn et al. |
| 2008/0252828 | A1 | 10/2008 | Shin et al. |
| 2009/0002588 | A1 | 1/2009 | Lee et al. |
| 2010/0195034 | A1* | 8/2010 | Lee et al. ............ 349/124 |
| 2011/0260957 | A1 | 10/2011 | Jeong et al. |

OTHER PUBLICATIONS

Extended European Search Report issued in EP Application No. 12186665.1, dated Jun. 17, 2013.

* cited by examiner

*Primary Examiner* — Richard Kim
(74) *Attorney, Agent, or Firm* — H.C. Park & Associates, PLC

(57) ABSTRACT

A liquid crystal display including a partial plate electrode along with a minute pattern in pixel electrode thereby increasing the viewing angle and the lateral visibility of the liquid crystal display, as well as the response speed. A step provider is provided to reinforce the control force of the liquid crystal molecules, thereby reducing the texture generated in the center of the pixel.

31 Claims, 43 Drawing Sheets

FIG.19
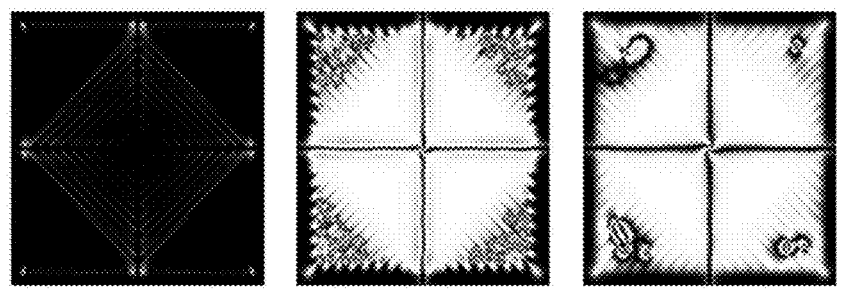
(a)
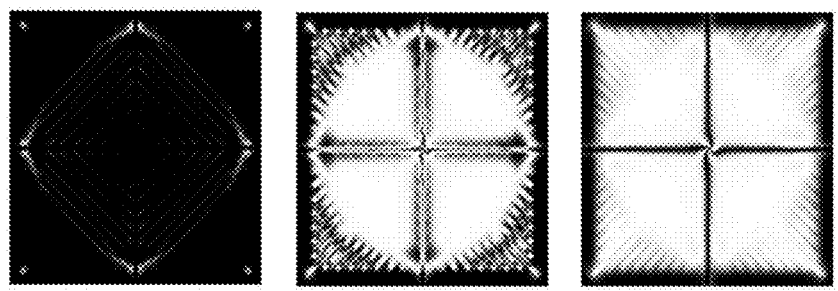
(b)
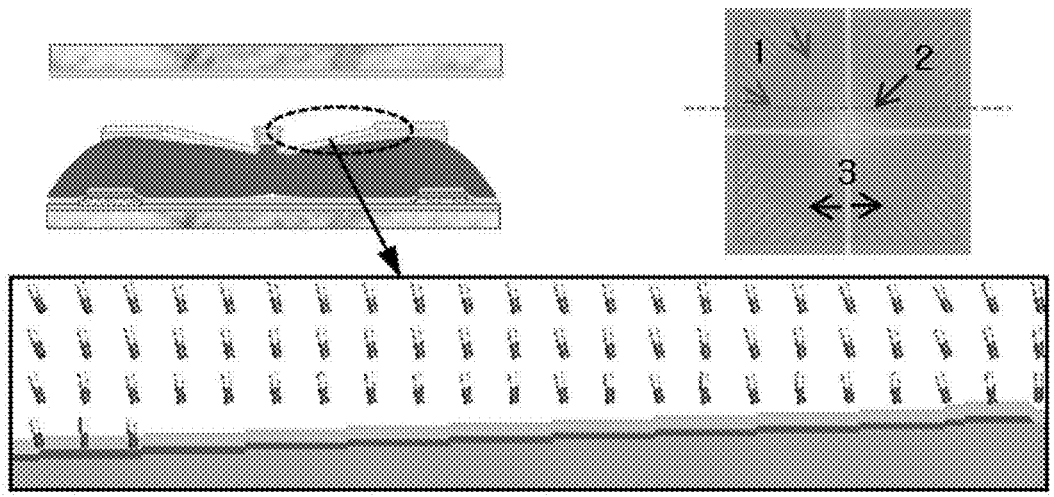
(c)

(a)  (b)  (c)

LIQUID CRYSTAL DISPLAY DEVICE

CROSS-REFERENCE TO RELATED APPLICATIONS

This application claims priority from and the benefit of Korean Patent Applications No. 10-2012-0025561, filed on Mar. 13, 2012, and No. 10-2012-0026073, filed on Mar. 14, 2012, which is hereby incorporated by reference for all purposes as if fully set forth herein.

BACKGROUND

1. Field

Exemplary embodiments of the present invention relate to a liquid crystal display.

2. Discussion of the Background

A liquid crystal display (LCD) is one of the most widely used flat panel displays (FPD), and it is composed of two display panels on which field generating electrodes such as a is pixel electrode and a common electrode are formed, and a liquid crystal layer interposed between the two display panels. A voltage is applied to the field generating electrodes to generate an electric field on the liquid crystal layer, and the orientation of liquid crystal molecules of the liquid crystal layer is determined and the polarization of incident light is controlled through the generated electric field to display an image.

Among these LCDs, a vertical alignment mode LCD, which arranges major axes of liquid crystal molecules so as to be perpendicular to the display panel in a state in which an electric field is not applied, has been developed.

In the vertically aligned (VA) mode liquid crystal display, it is important to ensure a light viewing angle, and for this purpose, a method of forming a cutout, such as a micro-slit on the field generating electrode, is used. Cutouts and protrusions determine a tilt direction of liquid crystal molecules, such that a viewing angle may be increased by appropriately disposing the cutouts and protrusions to disperse the tilt direction of the liquid crystal molecule in various directions.

In the case of forming a plurality of branch electrodes by forming the minute slits in the pixel electrode, an aperture ratio of the liquid crystal display is reduced, and as a result, transmittance is deteriorated.

The above information disclosed in this Background section is only for enhancement of understanding of the background of the invention and therefore it may contain information that does not form any part of the prior art nor what the prior art may suggest to a person of ordinary skill in the art.

SUMMARY

Exemplary embodiments of the present invention relate to a liquid crystal display with improved transmittance and aperture ratio, and reduced texture.

Additional features of the invention will be set forth in the description which follows, and in part will be apparent from the description, or may be learned by practice of the invention.

An exemplary embodiment of the present invention discloses: a substrate; a pixel electrode including a partial plate electrode and a plurality of minute branch electrodes extended from the partial plate electrode and formed on the substrate; and a step provider positioned between the substrate and the pixel electrode.

insulatorinsulatorinsulatorinsulatorIt is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 19 is a view showing an experimental result using the exemplary embodiment of FIG. 17 and FIG. 18.

DETAILED DESCRIPTION OF THE ILLUSTRATED EMBODIMENTS

Figure 1:
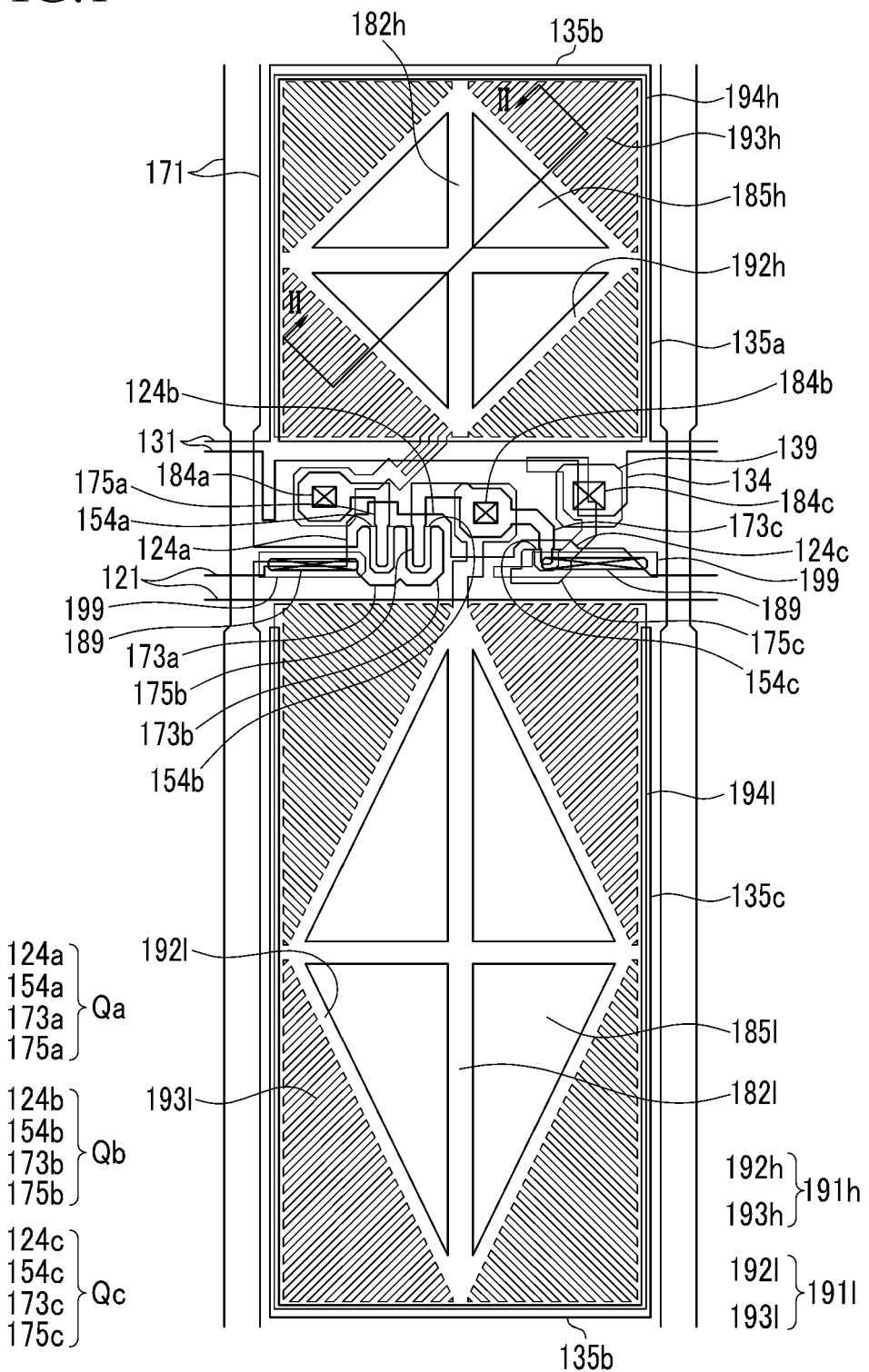
FIG. 1 is a layout view of a liquid crystal display according to an exemplary embodiment of the present invention.

The present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

In the drawings, the thickness of layers, films, panels, regions, etc., are exaggerated for clarity. Like reference numerals designate like elements throughout the specification. It will be understood that when an element such as a layer, film, region, or substrate is referred to as being "on" or "connected to" another element, it can be directly on or directly connected to the other element, or intervening elements may also be present. In contrast, when an element is referred to as being "directly on" or "directly connected to" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ}.

A liquid crystal display according to an exemplary embodiment of the present invention will be described with reference to FIG. 1 and FIG. 2.

Figure 2:
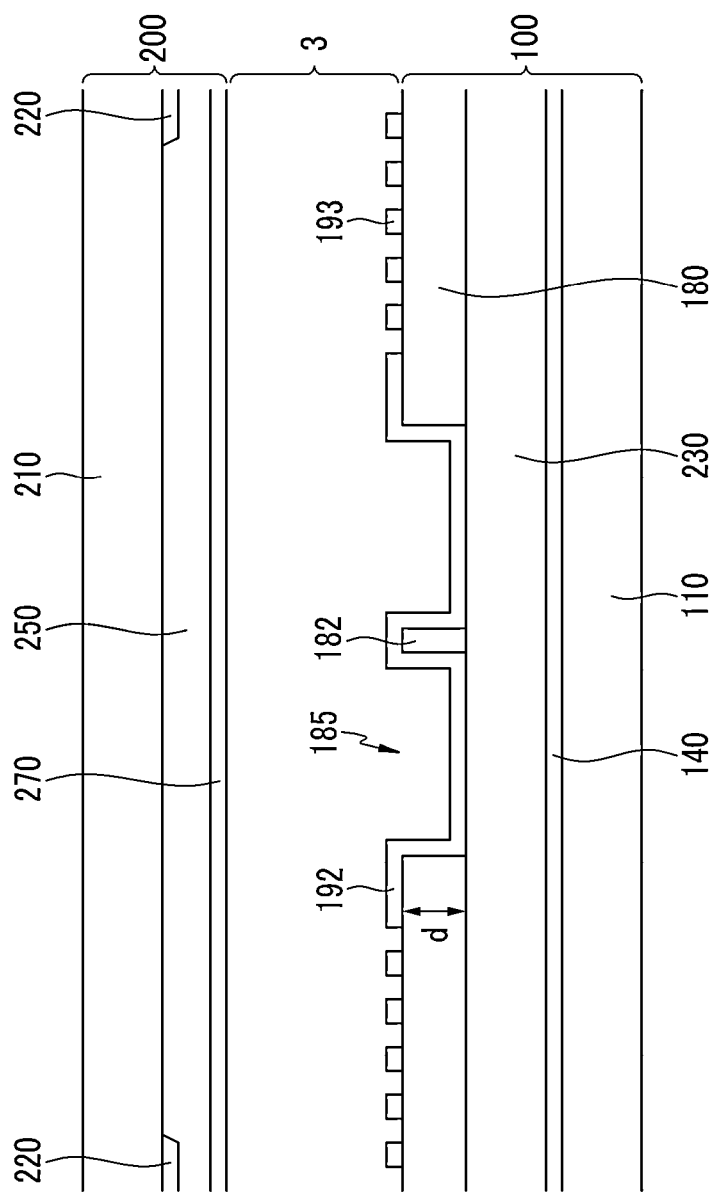
FIG. 2 is a cross-sectional view taken along the line II-II of FIG. 1.

FIG. 1 is a layout view of a liquid crystal display according to an exemplary embodiment of the present invention, and FIG. 2 is a cross-sectional view taken along the line II-II of FIG. 1.

Referring to FIG. 1 and FIG. 2, a liquid crystal display according to the present exemplary embodiment includes a lower panel 100 and an upper panel 200 facing each other, a liquid crystal layer 3 disposed between the two display panels 100 and 200, and a pair of polarizers (not shown) attached at the outer surfaces of the display panels 100 and 200.

The lower panel 100 will be described below.

A gate line 121 and a storage voltage line 131 are formed on an insulation substrate 110. The gate line 121 includes a first gate electrode 124a, a second gate electrode 124b, and a third gate electrode 124c. The storage voltage line 131 includes storage electrodes 135a, 135b, and 135c, and a capacitor electrode 134 extending downward. The storage voltage line 131 includes two first longitudinal storage electrode parts 135a extending upward, a transverse storage electrode part 135b connecting the two first longitudinal storage electrode parts 135a, and two second longitudinal storage electrode parts 135c further extending upward from the transverse storage electrode part 135b.

The first longitudinal storage electrode part 135a is formed along a longitudinal edge of a first sub-pixel electrode 191h formed thereon, and the second longitudinal storage electrode part 135c is formed along a longitudinal edge of a second sub-pixel electrode 191l formed thereon. The transverse storage electrode part 135b is positioned between a transverse edge of the previous second sub-pixel electrode 191l and the transverse edge of the current first sub-pixel electrode 191h, and is formed along the two transverse edges.

As a result, the first longitudinal storage electrode part 135a and the transverse storage electrode part 135b are formed along the edge of the first sub-pixel electrode 191h, thereby at least partially overlapping the first pixel sub-electrode 191h, and the second longitudinal storage electrode part 135c and the transverse storage electrode part 135b are formed along the edge of the second sub-pixel electrode 191l, thereby at least partially overlapping the second sub-pixel electrode 191l.

In FIG. 1, the overlying transverse storage electrode part 135b and the underlying transverse storage electrode part 135b appear to be separated from each other, but in actuality, is transverse storage electrode parts 135b of the pixels PX that are adjacent up and down are electrically connected to each other.

A gate insulating layer 140 is formed on the gate line 121 and the storage voltage line 131. A first semiconductor 154a, a second semiconductor 154b, and a third semiconductor 154c are formed on the gate insulating layer 140.

A plurality of ohmic contacts (not shown) are formed on the first semiconductor 154a, the second semiconductor 154b, and the third semiconductor 154c.

Data conductors 171, 173c, 175a, 175b, and 175c including a plurality of data lines 171 which include a first source electrode 173a and a second source electrode 173b, a first drain electrode 175a, a second drain electrode 175b, a third source electrode 173c, and a third drain electrode 175c, are formed on the semiconductors (the first semiconductor 154a, the second semiconductor 154b, and the third semiconductor 154c), the ohmic contacts (not shown), and the gate insulating layer 140.

The first gate electrode 124a, the first source electrode 173a, and the first drain electrode 175a form a first thin film transistor Qa together with the first semiconductor 154a, and a channel of the first thin film transistor Qa is formed in the semiconductor 154a between the first source electrode 173a and the first drain electrode 175a. Similarly, the second gate electrode 124b, the second source electrode 173b, and the second drain electrode 175b form a second thin film transistor Qb together with the second semiconductor 154b, a channel of the second thin film transistor Qb is formed in the semiconductor portion 154b between the second source electrode 173b and the second drain electrode 175b, the third gate electrode 124c, the third source electrode 173c, and the third drain electrode 175c form a third thin film transistor Qc together with the third semiconductor 154c, and a channel of the third thin film transistor Qc is formed in the semiconductor 154c between the third source electrode 173c and the third drain electrode 175c.

A color filter 230 and a passivation layer 180 are sequentially formed on the gate insulating layer 140, the data conductors 171, 173c, 175a, 175b, and 175c, and exposed portions of the semiconductors 154a, 154b, and 154c. The color filter 230 may display one of three primary colors such as red, green, and blue, but it is not limited to display of a primary color and may also display one of cyan, magenta, yellow, and white-based colors. Meanwhile, the passivation layer 180 may be formed of an insulator, such as silicon nitride and silicon oxide, or an insulator, and in the exemplary embodiment of FIG. 1, the organic insulating layer including the insulator is described.

A step provider providing a step to an overlying layer is formed in the passivation layer 180 of the insulator, and in FIG. 1, step providing grooves 185h and 185l and a cross-shaped protrusion 182 positioned between the step providing grooves 185h and 185l function as the step provider. As shown in FIG. 1, the step providing grooves 185h and 185l have a right triangle structure and are symmetrical to each other in a diagonal direction. As a result, the passivation layer 180 includes the cross-shaped protrusion 182.

The color filter 230 and the passivation layer 180 include a first contact hole 184a, a second contact hole 184b, and a third contact hole 184c respectively exposing the first drain electrode 175a, the second drain electrode 175b, and the third drain electrode 175c. The passivation layer 180 includes an opening 189 collecting a gas emitted from the color filter 230. According to FIG. 1, one pixel may include a pair of openings 189.

A pixel electrode 191 including the first subpixel electrode 191h and the second subpixel electrode 191l is formed on the passivation layer 180. The first subpixel electrode 191h and the second subpixel electrode 191l respectively include partial plate electrodes 192h and 192l positioned at a center thereof, and a plurality of minute branch electrodes 193h and 193l protruding from the partial plate electrodes 192h and 192l in an oblique direction.

The first subpixel electrode 191h includes the first partial plate electrode 192h and a plurality of first minute branch electrodes 193h positioned in the square region, and is connected to a wide end portion of the first drain electrode 175a by a first minute branch connection 194h extending outside the square region.

The first partial plate electrode 192h has a rhombus shape, a center thereof is positioned at a center of the square region, and each vertex of the rhombus meets the boundary of the square region. The first partial plate electrode 192h covers the first step providing groove 185h of the passivation layer 180 and a first cross-shaped protrusion 182h. As a result, the first partial plate electrode 192h has a step provided by the first step providing groove 185h of the passivation layer 180 and the first cross-shaped protrusion 182h. Here, the first cross-shaped protrusion 182h provides a pretilt to liquid crystal molecules positioned at the center of the square region, thereby functioning to control an arrangement direction of the liquid crystal molecules, and as a result, the texture is reduced.

A plurality of first minute branch electrodes 193h are extended at an edge of the oblique direction of the first partial plate electrode 192h. The plurality of first minute branch electrode 193h fill the rest of the square region, form an angle of 45 degrees with respect to the gate line 121 or the data line 171, and form an angle of 90 degrees with respect to the edge of the oblique direction of the first partial plate electrode 192h.

In the exemplary embodiment of the present invention shown in FIG. 1, the first subpixel electrode 191h includes a first minute branch connection 194h connecting the first is partial plate electrode 192h and the ends of a plurality of first minute branch electrodes 193h in a longitudinal direction or a horizontal direction. The first minute branch connection 194h overlaps the first subpixel electrode 191h and the underlying storage electrode 135a and 135b, thereby forming a storage capacitance. However, according to an exemplary embodiment of the present invention, the first minute branch connection 194h may be omitted, and in this case, a plurality of first minute branch electrodes 193h protrude to the outside.

The second subpixel electrode 191l includes the second partial plate electrode 192l and a plurality of second minute branch electrodes 193l formed in the rectangle region having a longitudinal edge, and is connected to the wide end portion of the second drain electrode 175l by a second minute branch connection 194l extended outside the rectangle region.

The center of the second partial plate electrode 192l is positioned at the center of the rectangle region and has the rhombus shape connecting the center of each edge of the rectangle region. As a result, each vertex of the rhombus meets the boundary of the rectangle region, and the second partial plate electrode 192l has a greater width in the vertical direction than the horizontal direction. The second partial plate electrode 192l covers the second step providing groove 185l of the passivation layer 180 and a second cross-shaped protrusion 182l. As a result, the second partial plate electrode 192l has the step provided by the second step providing groove 185l of the passivation layer 180 and the second cross-shaped protrusion 182l of the cross type. A plurality of second minute branch electrodes 193l extend from the edge of the oblique direction of the second partial plate electrode 192l. The plurality of second minute branch electrodes 193l fill the rest of the rectangle region, form an angle of 45 degrees with respect to the gate line 121 or the data line 171, and form an angle of 90±15 degrees with respect to the edge of the oblique direction of the second partial plate electrode 192l.

Meanwhile, in the exemplary embodiment of FIG. 1, the second subpixel electrode 191l includes the second minute branch connection 194l connecting the second partial plate electrode 192l and the ends of a plurality of second minute branch electrode 193l in a longitudinal direction or a horizontal direction. The second minute branch connection 194l overlaps the second subpixel electrode 191l and the underlying storage electrode 135b and 135c, thereby forming a storage capacitance. However, according to an exemplary embodiment of the present invention, the second minute branch connection 194l may be omitted, and in this case, a plurality of second minute branch electrodes 193l protrude outside.

The first subpixel electrode 191h and the second subpixel electrode 191l are physically and electrically connected to the first drain electrode 175a and the second drain electrode 175b through the contact holes 184a and 184b, thereby receiving data voltages from the first drain electrode 175a and the second drain electrode 175b. At this time, the portion of the data voltage applied to the second drain electrode 175b is divided through the third source electrode 173c, such that a magnitude of the voltage applied to the second subpixel electrode 191l is less than the magnitude of the voltage applied to the first subpixel electrode 191h. Here, an area of the second subpixel electrode 191l may be approximately one to two times less than that of the first subpixel electrode 191h.

A storage electrode connecting member 139 connects the capacitor electrode 134 of the storage voltage line 131 and the third drain electrode 175c through the contact hole 184c. The storage voltage Vcst is applied to the capacitor electrode 134 of the storage voltage line 131 to have a predetermined voltage, thereby apply the storage voltage Vcst to the third thin film transistor Qc through the third drain electrode 175c. As a result, the voltage applied to the second sub-pixel may be decreased.

A cover 199 covering the opening 189 of the passivation layer 180 is formed on the opening 189. The cover 199 is formed to block transmission of a gas emitted from the color filter 230 to other elements, and according to FIG. 1, one pixel may include a pair of covers 199. The pixel electrode 191 and the cover 199 may be made of a transparent conductive material such as ITO or IZO. Accordingly to an exemplary embodiment of the present invention, the opening 189 and the cover 199 may be omitted.

A lower alignment layer (not shown) is formed on the pixel electrodes 191. The lower alignment layer may be a vertical alignment layer and may be the alignment layer including a photo-reactive material. The photo-reactive material will be described with reference to FIG. 44.

The common electrode panel 200 will be described below.

A light blocking member 220 is formed on an insulation substrate 210. The light blocking member 220 is referred to as black matrix and prevents light leakage. The light blocking member 220 extends along the gate line 121, covers a region where the first thin film transistor (Qh), the second thin film transistor (Ql), and the third thin film transistor (Qc) are positioned, is extended along the data line 171, and covers the surroundings of the data line 171. A region that is not covered by the light blocking member 220 emits light to the outside, thereby displaying the images.

A planarization layer 250 providing a planar lower surface and made of organic material is formed under the light blocking member 220.

A common electrode 270 made of the transparent conductive material is formed under the planarization layer 250.

An upper alignment layer (not shown) may be formed under the common is electrode 270. The upper alignment layer may be a vertical alignment layer and may be an alignment layer in which a photo-polymer material is photo-aligned.

Polarizers (not shown) are formed on the outer surface of the display panels 100 and 200, the polarization axis of the two polarizers are crossed, and one polarization axis thereof may be parallel to the gate lines 121. The polarizer may be disposed on one outer surface among the two display panels 100 and 200.

The first subpixel electrode 191h and the second subpixel electrode 191l to which the data voltage is applied generate an electric field in conjunction with the common electrode 270 of the common electrode panel 200 such that the liquid crystal molecules of the liquid crystal layer 3 that are aligned vertically to the surface of two electrodes 191 and 270 in the absence of the electric field are slanted in a direction parallel to the surface of the two electrodes 191 and 270, and thereby the luminance of the light transmitted through the liquid crystal layer 3 differs depending on the slant degree of the liquid crystal molecules.

The liquid crystal display may further include a spacer (not shown) to maintain a cell interval between the two display panels 100 and 200, and the spacer may be attached to either the upper panel 200 or the lower panel 100.

The liquid crystal layer 3 disposed between the lower panel 100 and the upper panel 200 includes the liquid crystal molecules 31 having negative dielectric anisotropy.

The liquid crystal layer 3 or the alignment layer (not shown) may further include a polymer that is polymerized by light, such as ultraviolet rays. The polymer included in the liquid crystal layer 3 provides the pretilt to the liquid crystal layer 3, and a method of providing the pretilt angle will be described in detail in FIG. 44. That is, the liquid crystal layer 3 may not include the polymer when the arrangement direction is sufficiently controlled without the is polymer providing the pretilt angle.

As described above, in the exemplary embodiment of FIG. 1 and FIG. 2, the step provider is formed in the passivation layer 180 of the insulator and includes the step providing grooves 185h and 185l and the cross-shaped protrusions 182h and 182l positioned between the step providing grooves 185h and 185l.

Figure 3:
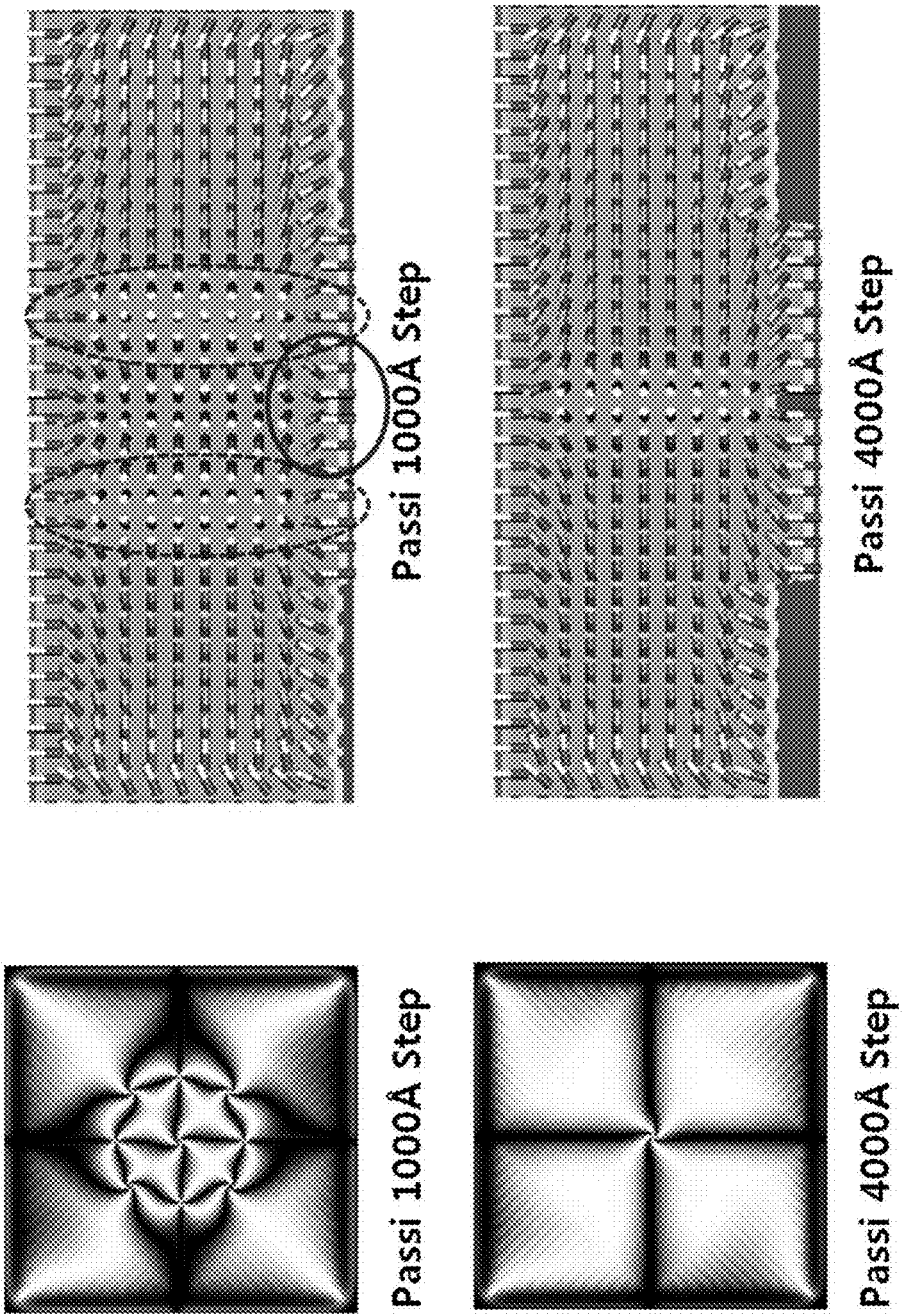
FIG. 3 is a view showing an experimental result using the exemplary embodiment of FIG. 1 and FIG. 2.

However, the texture is reduced the most according to the provided step (referring to d of FIG. 2), thereby increasing the transmittance, with reference to FIG. 3.

FIG. 3 is a view showing an experimental result using the exemplary embodiment of FIG. 1 and FIG. 2.

In FIG. 3, "Passi" means the passivation layer 180 of the insulator, and the two upper pictures in FIG. 3 are a case where the passivation layer 180 of the insulator is formed with a thickness of 1000 Å, while the two lower pictures in FIG. 3 are a case where the passivation layer 180 of the insulator is formed with a thickness of 4000 Å.

In FIG. 3, when providing the step via the step providing groove and the cross-shaped protrusion, as in the exemplary embodiment of FIG. 1 and FIG. 2, the texture may be not controlled and the transmittance is decreased when a step of 1000 Å is provided, but the texture may be controlled and the transmittance is increased when a step of 4000 Å is provided. When providing the step via the step providing groove and the cross-shaped protrusion, as in the exemplary embodiment of FIG. 1 and FIG. 2, it may be confirmed that the control force of the liquid crystal molecules is reinforced when the step is large such that the texture is decreased, and the texture is decreased when the step is more than 3000 Å such that the transmittance is greater than a predetermined degree.

In the exemplary embodiment of FIG. 1 and FIG. 2, the passivation layer 180 of is the insulator includes the step providing groove and the cross-shaped protrusion. However, the step providing groove and the cross-shaped protrusion may be formed in the color filter 230. The passivation layer 180 on the color filter 230 may be formed of an inorganic insulating material or may be omitted. Although the step provider is formed by using the step providing groove and the cross-shaped protrusion of the color filter 230, as shown in FIG. 3, a step of more than 3000 Å must be provided to reduce the texture.

Next, another exemplary embodiment of the present invention will be described with reference to FIG. 4 to FIG. 6.

Figure 4:
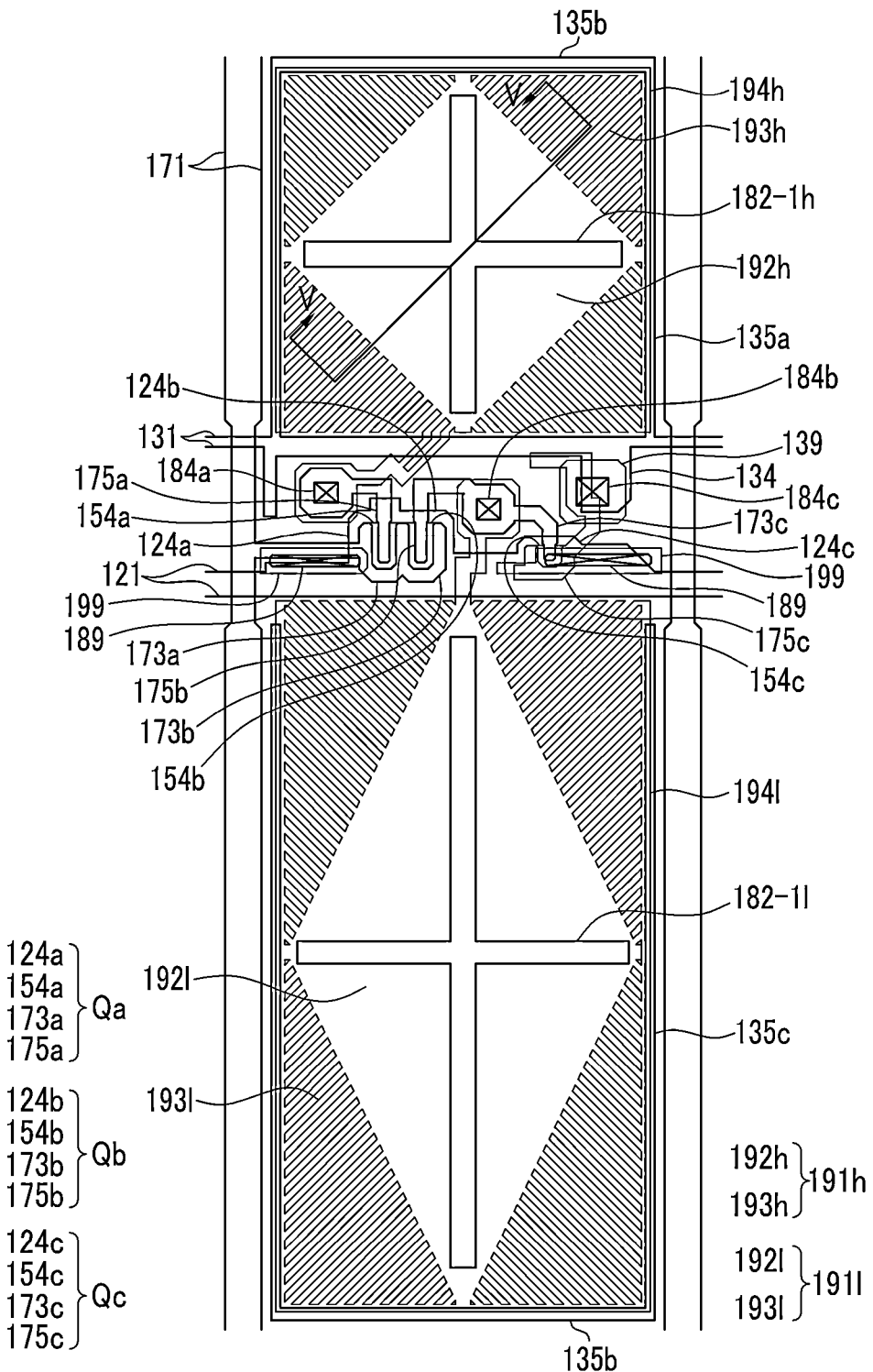
FIG. 4 is a layout view of a liquid crystal display according to another exemplary embodiment of the present invention.
Figure 5:
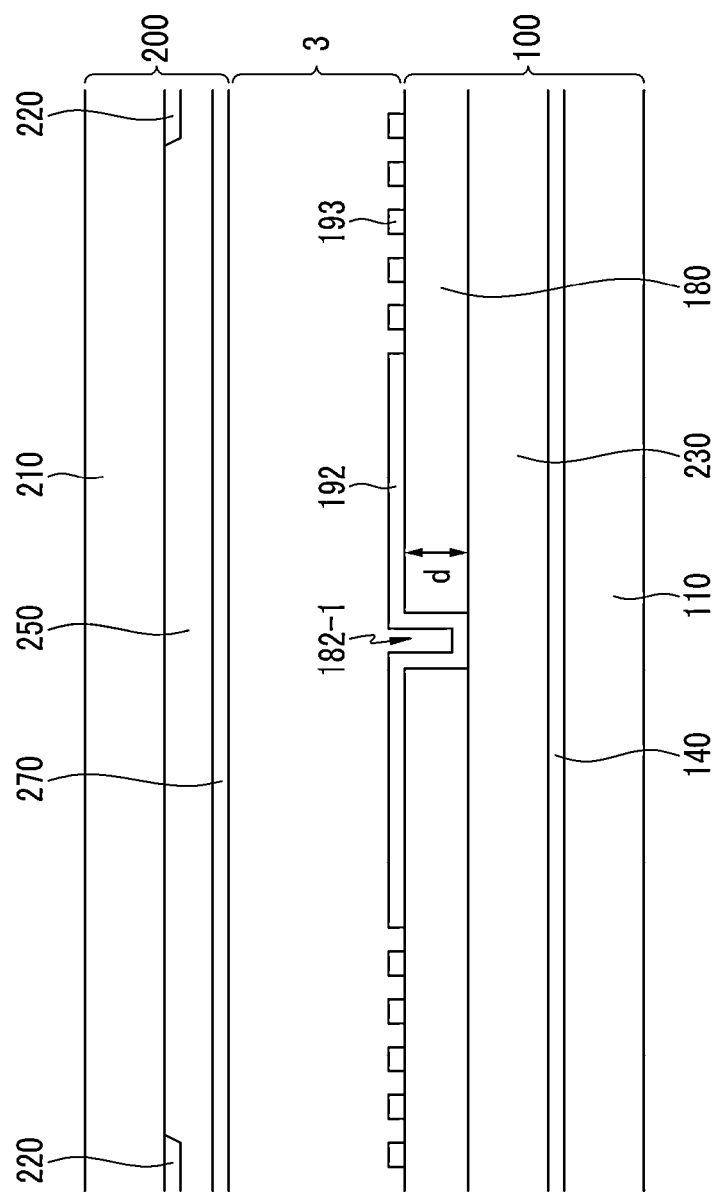
FIG. 5 is a cross-sectional view taken along the line V-V of FIG. 4.

FIG. 4 is a layout view of a liquid crystal display according to another exemplary embodiment of the present invention, and FIG. 5 is a cross-sectional view taken along the line V-V of FIG. 4.

The exemplary embodiment of FIG. 4 and FIG. 5 is a case of forming cross-shaped grooves 182-1h and 182-1l as the step provider, which differs from the exemplary embodiment of FIG. 1 and FIG. 2.

Referring to FIG. 4 and FIG. 5, the liquid crystal display according to the present exemplary embodiment includes the lower panel 100 and the upper panel 200 facing each other, a liquid crystal layer 3 disposed between the two display panels 100 and 200, and a pair of polarizers (not shown) attached at the outer surfaces of the display panels 100 and 200. The upper panel 200 of the exemplary embodiment of FIG. 4 and FIG. 5 is the same as that of FIG. 1 and FIG. 2 such that the description thereof is omitted.

The lower panel 100 will be described, and the layered structure from the insulation substrate 110 to the color filter 230 in the lower panel 100 is the same as the exemplary embodiment of FIG. 1 and FIG. 2.

The gate line 121 and the storage voltage line 131 are formed on the insulation substrate 110. The gate line 121 includes a first gate electrode 124a, a second gate electrode 124b, and a third gate electrode 124c. The storage voltage line 131 includes storage electrodes 135a, 135b, and 135c, and a capacitor electrode 134 extending downward. The storage voltage line 131 includes two first longitudinal storage electrode parts 135a extending upward, a transverse storage electrode part 135b connecting two first longitudinal storage electrode parts 135a, and two second longitudinal storage electrode parts 135c further extending upward from the transverse storage electrode part 135b.

The first longitudinal storage electrode part 135a is formed along a longitudinal edge of the first sub-pixel electrode 191h formed thereon, and the second longitudinal storage electrode part 135c is formed along the longitudinal edge of the second sub-pixel electrode 191l formed thereon. Meanwhile, the transverse storage electrode part 135b is positioned between a transverse edge of the previous second sub-pixel electrode 191l and the transverse edge of the current first sub-pixel electrode 191h, and is formed along the two transverse edges.

As a result, the first longitudinal storage electrode part 135a and the transverse storage electrode part 135b are formed along the edge of the first sub-pixel electrode 191h, thereby at least partially overlapping the first sub-pixel electrode 191h, and the second longitudinal storage electrode part 135c and the transverse storage electrode part 135b are formed along the edge of the second sub-pixel electrode 191l, thereby at least partially overlapping the second sub-pixel electrode 191l.

In FIG. 4, the overlying transverse storage electrode part 135b and the underlying transverse storage electrode part 135b appear to be separated from each other, but in actuality, the transverse storage electrode parts 135b of the pixels PX that are adjacent up and down are electrically connected to each other.

The gate insulating layer 140 is formed on the gate line 121 and the storage voltage line 131. The first semiconductor 154a, the second semiconductor 154b, and the third semiconductor 154c are formed on the gate insulating layer 140.

A plurality of ohmic contacts (not shown) may be formed on the first semiconductor 154a, the second semiconductor 154b, and the third semiconductor 154c.

Data conductors 171, 173c, 175a, 175b, and 175c including a plurality of data lines 171 which include the first source electrode 173a and the second source electrode 173b, the first drain electrode 175a, the second drain electrode 175b, the third source electrode 173c, and the third drain electrode 175c, are formed on the semiconductor (the first semiconductor 154a, the second semiconductor 154b, and the third semiconductor 154c), the ohmic contacts (not shown), and the gate insulating layer 140.

The first gate electrode 124a, the first source electrode 173a, and the first drain electrode 175a form a first thin film transistor Qa together with the first semiconductor 154a, and a channel of the first thin film transistor Qa is formed in the semiconductor portion 154a between the first source electrode 173a and the first drain electrode 175a. Similarly, the second gate electrode 124b, the second source electrode 173b, and the second drain electrode 175b form a second thin film transistor Qb together with the second semiconductor 154b, a channel of the second thin film transistor Qb is formed in the semiconductor portion 154b between the second source electrode 173b and the second drain electrode 175b, the third gate electrode 124c, the third source electrode 173c, and the third drain electrode 175c form a third thin film transistor Qc together with the third semiconductor 154c, and a channel of the third thin film transistor Qc is formed in the semiconductor portion 154c between the third source electrode 173c and the third is drain electrode 175c.

The color filter 230 and the passivation layer 180 are sequentially formed on the gate insulating layer 140, the data conductors 171, 173c, 175a, 175b, and 175c, and the exposed portion of the semiconductors 154a, 154b, and 154c. The color filter 230 may display one of three primary colors such as red, green, and blue, but it is not limited to display of a primary color and may also display and may display one of cyan, magenta, yellow, and white-based colors. Meanwhile, the passivation layer 180 may be formed of an insulator such as silicon nitride and silicon oxide, or an insulator, and in the exemplary embodiment of FIG. 1, the organic insulating layer including the insulator is described.

The step provider providing the step to the overlying layer is formed in the passivation layer 180 of the insulator, and in FIG. 4, the cross-shaped grooves 182-1h and 182-1l are the only step provider. The cross-shaped grooves 182-1h and 182-1l are formed with a predetermined depth d while having the cross shape, as shown in FIG. 4 and FIG. 5. In FIG. 5, the cross-shaped grooves 182-1h and 182-1l of the step provider are formed by entirely etching the passivation layer 180 of the insulator such that the color filter 230 is formed directly under the cross-shaped grooves 182-1h and 182-1l without the passivation layer 180, although the passivation layer 180 may have a predetermined thickness according to an exemplary embodiment of the present invention.

The color filter 230 and the passivation layer 180 include the first contact hole 184a, the second contact hole 184b, and the third contact hole 184c respectively exposing the first drain electrode 175a, the second drain electrode 175b, and the third drain electrode 175c.

The pixel electrode 191, including the first subpixel electrode 191h and the second subpixel electrode 191l, is formed on the passivation layer 180. The first subpixel is electrode 191h and the second subpixel electrode 191l respectively include partial plate electrodes 192h and 192l positioned at a center thereof, and a plurality of minute branch electrodes 193h and 193l protruding from the partial plate electrode 192h and 192l in an oblique direction.

The first subpixel electrode 191h includes the first partial plate electrode 192h and a plurality of first minute branch electrodes 193h positioned in the square region, and is connected to a wide end portion of the first drain electrode 175a by the first minute branch connection 194h extending outside the square region.

The first partial plate electrode 192h has a rhombus shape, a center thereof is positioned at a center of the square region, and each vertex of the rhombus meets the boundary of the square region. Also, the first partial plate electrode 192h covers the first cross-shaped groove 182-1h of the passivation layer 180. As a result, the first partial plate electrode 192h has the step provided by the first cross-shaped groove 182-1h of the passivation layer 180, as illustrated in FIG. 5. Here, the first cross-shaped groove 182-1h provides the pretilt to the liquid crystal molecules positioned at the center of the square region, thereby controlling the arrangement direction of the liquid crystal molecules and, as a result, the reducing the texture.

A plurality of first minute branch electrodes 193h extend to an edge of the oblique direction of the first partial plate electrode 192h. A plurality of first minute branch electrodes 193h fill the rest of the square region, form an angle of 45 degrees with respect to the gate line 121 or the data line 171, and form an angle of 90 degrees with respect to the edge of the oblique direction of the first partial plate electrode 192h.

Meanwhile, in the exemplary embodiment of FIG. 4, the first subpixel electrode 191h includes the first minute branch connection 194h connecting the first partial plate electrode 192h and the ends of a plurality of first minute branch electrodes 193h in a longitudinal direction or a horizontal direction. The first minute branch connection 194h overlaps the first subpixel electrode 191h and the underlying storage electrode 135a and 135b, thereby forming the storage capacitance. However, according to an exemplary embodiment of the present invention, the first minute branch connection 194h may be omitted, and in this case, a plurality of first minute branch electrodes 193h protrude to the outside.

On the other hand, the second subpixel electrode 191l includes the second partial plate electrode 192l and a plurality of second minute branch electrodes 193l formed in the rectangle region having a longitudinal edge, and is connected to the wide end portion of the second drain electrode 175l by the second minute branch connection 194l extending outside the rectangle region.

The center of the second partial plate electrode 192l is positioned at the center of the rectangle region, and has a rhombus shape connecting the center of each edge of the rectangle region. As a result, each vertex of the rhombus meets the boundary of the rectangle region. In addition, the second partial plate electrode 192l covers the second cross-shaped groove 182-1l of the passivation layer 180. As a result, the second partial plate electrode 192l has the step provided by the second cross-shaped groove 182-1l of the passivation layer 180, as illustrated in FIG. 5.

A plurality of second minute branch electrodes 193l extend from the edge of the oblique direction of the second partial plate electrode 192l. The plurality of second minute branch electrodes 193l fills the rest of the rectangle region, form an angle of 45 degrees with respect to the gate line 121 or the data line 171, and form an angle of 90±15 degrees with respect to the edge of the oblique direction of the second partial plate electrode 192l.

In the exemplary embodiment of FIG. 4, the second subpixel electrode 191l includes the second minute branch connection 194l connecting the second partial plate electrode 192l and the ends of a plurality of second minute branch electrodes 193l in a longitudinal direction or a horizontal direction. The second minute branch connection 194l overlaps the second subpixel electrode 191l and the underlying storage electrodes 135b and 135c, thereby forming the storage capacitance. However, according to an exemplary embodiment, the second minute branch connection 194l may be omitted, and in this case, a plurality of second minute branch electrodes 193l protrude to the outside.

The first subpixel electrode 191h and the second subpixel electrode 191l are physically and electrically connected to the first drain electrode 175a and the second drain electrode 175b through the contact holes 184a and 184b, thereby receiving data voltages from the first drain electrode 175a and the second drain electrode 175b. At this time, the portion of the data voltage applied to the second drain electrode 175b is divided through the third source electrode 173c such that a magnitude of the voltage applied to the second subpixel electrode 191l is less than the magnitude of the voltage applied to the first subpixel electrode 191h. Here, an area of the second subpixel electrode 191l may be approximately one to two times less than that of the first subpixel electrode 191h.

A lower alignment layer (not shown) is formed on the pixel electrodes 191. The lower alignment layer may be a vertical alignment layer, and may be an alignment layer including a photo-reactive material. The photo-reactive material will be described with reference to FIG. 44.

As described above, in the exemplary embodiment of FIG. 4 and FIG. 5, the step provider is formed in the passivation layer 180 of the insulator and is made of the cross-shaped is grooves 182-1h and 182-1l.

Figure 6:
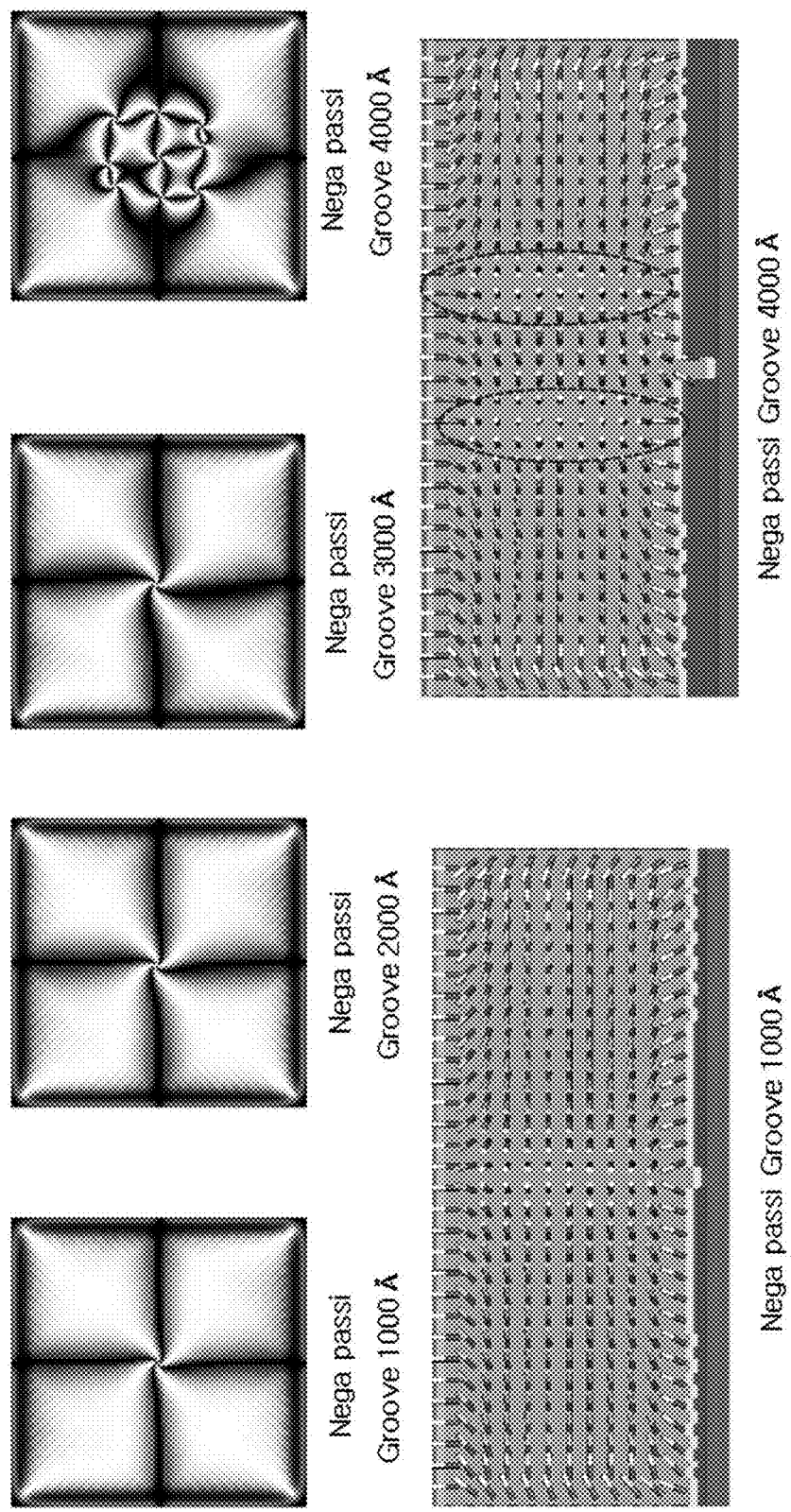
FIG. 6 is a view showing an experimental result using the exemplary embodiment of FIG. 4 and FIG. 5.

However, the texture is most reduced according to the provided step (referring to d of FIG. 5), thereby increasing the transmittance with reference to FIG. 6.

FIG. 6 is a view showing an experimental result using the exemplary embodiment of FIG. 4 and FIG. 5.

In FIG. 6, "passi" refers to the passivation layer 180 of the insulator, and "Nega" refers to the cross-shaped groove formed as the step provider. As shown in FIG. 6, as the depth of the cross-shaped groove is increased, the control force controlling the liquid crystal molecules becomes weaker such that the texture is largely generated. Therefore, if the depth of the cross-shaped groove is small when forming the cross-shaped groove as the step provider, the texture is decreased and the depth of 3000 Å is preferable.

In the exemplary embodiment of FIG. 4 and FIG. 5, although the cross-shaped groove as the step provider is formed in the passivation layer 180 of the insulator, an exemplary embodiment forming the cross-shaped groove in the color filter 230 is possible. The passivation layer 180 on the color filter 230 may be formed of an inorganic insulating material or may be omitted. Although the cross-shaped groove as the step provider is formed in the color filter 230, as shown in FIG. 6, a step of less than 3000 Å must be provided to reduce the texture. The cross-shaped groove must have a minimum depth, and a depth of more than 100 Å is preferable.

Next, another exemplary embodiment of the present invention will be described with reference to FIG. 7 to FIG. 9.

Figure 7:
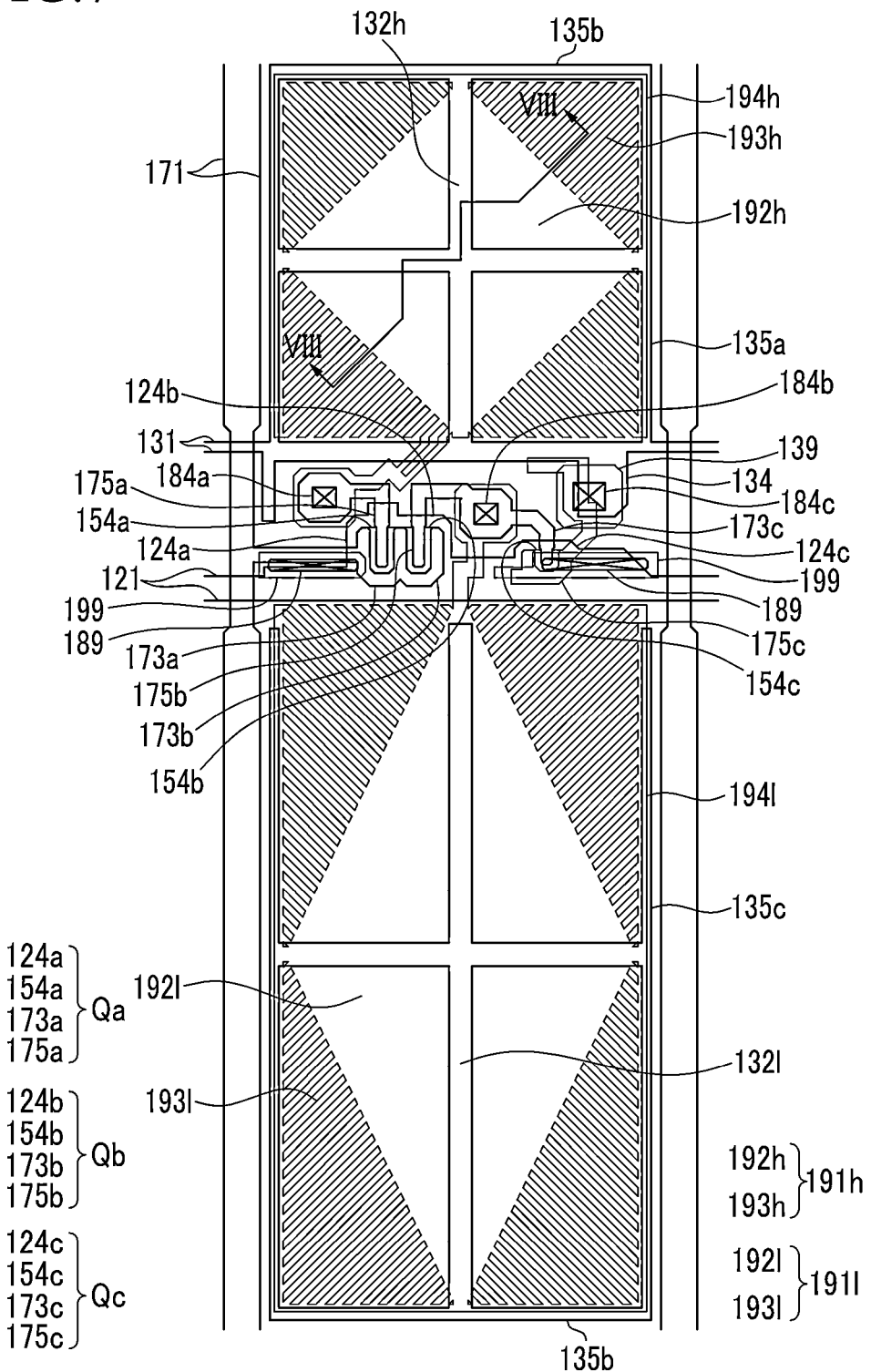
FIG. 7 is a layout view of a liquid crystal display according to another exemplary embodiment of the present invention.
Figure 8:
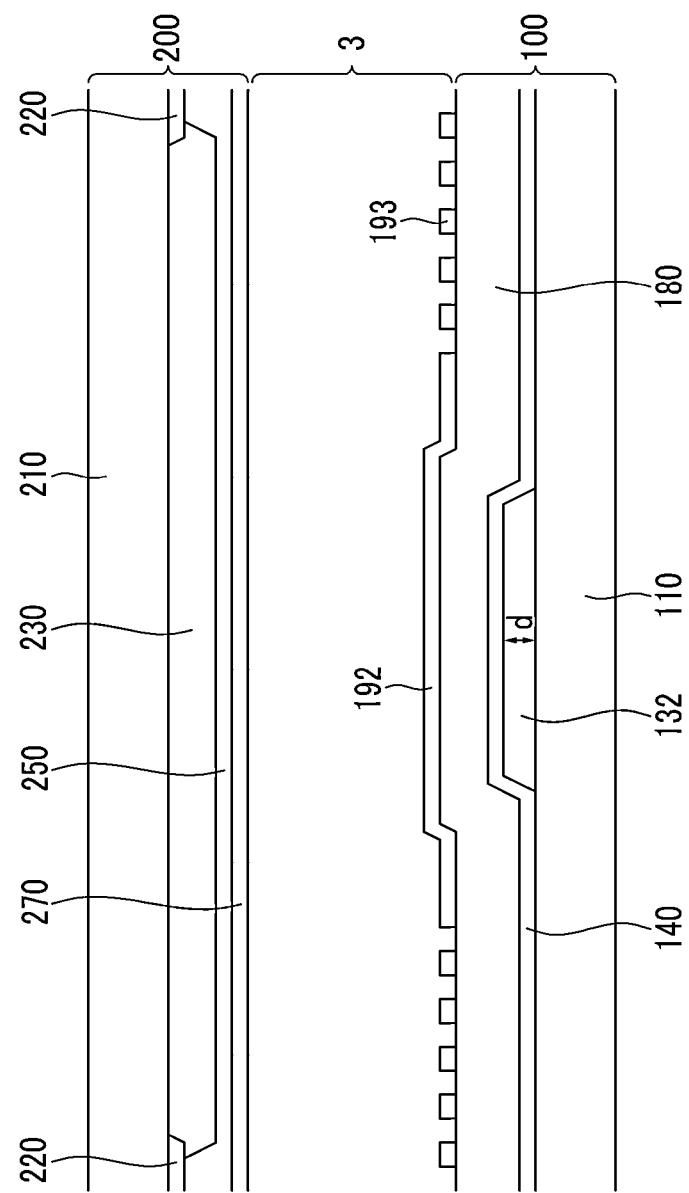
FIG. 8 is a cross-sectional view taken along the line VIII-VIII of FIG. 7.

FIG. 7 is a layout view of a liquid crystal display according to another exemplary embodiment of the present invention, and FIG. 8 is a cross-sectional view taken along the line VIII-VIII of FIG. 7.

In the exemplary embodiment of FIG. 7 and FIG. 8, as opposed to the exemplary embodiments of FIG. 1, FIG. 2, FIG. 4, and FIG. 5, step providing wiring is formed with the same layer as the gate line as the step provider, and thereby the step is generated in the overlying insulating layer/passivation layer as a result of the thickness of the step providing wiring.

In the exemplary embodiment of FIG. 7 and FIG. 8, as opposed to the exemplary embodiments of FIG. 1, FIG. 2, FIG. 4, and FIG. 5, the color filter 230 is not formed in the lower panel 100, but is formed in the upper panel 200. In the present exemplary embodiment, the color filter 230 may be formed in the lower panel 100, although the color filter 230 may be formed lower (a side of the substrate) than the wiring providing the step. This is because the step provided by the step providing wiring may not be generated at the position of the pixel electrode because of the planarization characteristic of the color filter 230 when forming the color filter 230 on the wiring such as the gate line. Also, forming the insulating layer/passivation layer including the inorganic material on the wiring, such as the gate line, as compared with the passivation layer/insulating layer including the organic material, may transmit the step provided by the step providing wiring to the position where the pixel electrode is formed as it is. As a result, in the exemplary embodiment of FIG. 7 and FIG. 8, the gate insulating layer 140 and the passivation layer 180 are formed of the inorganic material.

Referring to FIG. 7 and FIG. 8, the liquid crystal display according to the present exemplary embodiment includes the lower panel 100 and the upper panel 200 facing each other, a liquid crystal layer 3 interposed between the two display panels 100 and 200, and a pair of polarizers (not shown) attached at the outer surfaces of the display panels 100 and 200.

First, the lower panel 100 will be described.

The gate line 121, the storage voltage line 131, and the step providing wires 132h and 132l are formed on the insulation substrate 110. The gate line 121 includes a first gate electrode 124a, a second gate electrode 124b, and a third gate electrode 124c. The storage voltage line 131 includes storage electrodes 135a, 135b, and 135c, and a capacitor electrode 134 extending downward. The storage voltage line 131 includes two first longitudinal storage electrode parts 135a extending upward, a transverse storage electrode part 135b connecting two first longitudinal storage electrode parts 135a, and two second longitudinal storage electrode parts 135c further extending upward from the transverse storage electrode part 135b. The first longitudinal storage electrode part 135a is formed along a longitudinal edge of the first sub-pixel electrode 191h formed thereon, and the second longitudinal storage electrode part 135c is formed along the longitudinal edge of the second sub-pixel electrode 191l formed thereon. Meanwhile, the transverse storage electrode part 135b is positioned between a transverse edge of the previous second sub-pixel electrode 191l and the transverse edge of the current first sub-pixel electrode 191h, and is formed along the two transverse edges. As a result, the first longitudinal storage electrode part 135a and the transverse storage electrode part 135b are formed along the edge of the first sub-pixel electrode 191h, thereby at least partially overlapping the first sub-pixel electrode 191h, and the second longitudinal storage electrode part 135c and the transverse storage electrode part 135b are formed along the edge of the second sub-pixel electrode 191l, thereby at least partially overlapping the second sub-pixel electrode 191l. In FIG. 1, the overlying transverse storage electrode part 135b and the underlying transverse storage electrode part 135b appear to be separated from each other, but in actuality, the transverse storage electrode part 135b of the pixels PX that are adjacent up and down are electrically connected to each other.

The step providing wires 132h and 132l are formed with the same layer and the is same material as the gate line 121 and the storage voltage line 131 in the exemplary embodiment of FIG. 7, and are electrically connected to the storage electrodes 135a, 135b, and 135c of the storage voltage line 131. That is, the first step providing wire 132h has a cross shape, and four ends are respectively connected to the first longitudinal storage electrode part 135a, the transverse storage electrode part 135b, and the storage voltage line 131. Meanwhile, the second step providing wire 132l has a cross shape, and three of four ends are respectively connected to the second longitudinal storage electrode part 135c and the transverse storage electrode part 135b, and the remaining end is not connected.

The step providing wires 132h and 132l have a predetermined thickness to provide the step to the overlying insulating layer/passivation layer, as will be described with reference to FIG. 9.

The gate insulating layer 140 made of the inorganic insulating material is formed on the gate line 121, the storage voltage line 131, and the step providing wires 132h and 132l. The first semiconductor 154a, the second semiconductor 154b, and the third semiconductor 154c are formed on the gate insulating layer 140.

The plurality of ohmic contacts (not shown) are formed on the first semiconductor 154a, the second semiconductor 154b, and the third semiconductor 154c.

Data conductors 171, 173c, 175a, 175b, and 175c including a plurality of data lines 171 which include the first source electrode 173a and the second source electrode 173b, the first drain electrode 175a, the second drain electrode 175b, the third source electrode 173c, and the third drain electrode 175c, are formed on the semiconductor (the first semiconductor 154a, the second semiconductor 154b, and the third semiconductor 154c), the ohmic contacts (not shown), and the gate insulating layer 140.

The first gate electrode 124a, the first source electrode 173a, and the first drain electrode 175a form a first thin film transistor Qa together with the first semiconductor 154a, and a channel of the first thin film transistor Qa is formed in the semiconductor portion 154a between the first source electrode 173a and the first drain electrode 175a. Similarly, the second gate electrode 124b, the second source electrode 173b, and the second drain electrode 175b form a second thin film transistor Qb together with the second semiconductor 154b, a channel of the second thin film transistor Qb is formed in the semiconductor portion 154b between the second source electrode 173b and the second drain electrode 175b, the third gate electrode 124c, the third source electrode 173c, and the third drain electrode 175c form a third thin film transistor Qc together with the third semiconductor 154c, and a channel of the third thin film transistor Qc is formed in the semiconductor portion 154c between the third source electrode 173c and the third drain electrode 175c.

The passivation layer 180 is formed on the gate insulating layer 140, the data conductors 171, 173c, 175a, 175b, and 175c, and the exposed portion of the semiconductors 154a, 154b, and 154c. The passivation layer 180 is formed of the insulator, such as silicon nitride and silicon oxide, thereby maintaining the step provided by the step providing wires 132h and 132l without planarization. As a result, the cross-shaped step corresponding to the shape of the step providing wires 132h and 132l is formed on the passivation layer 180, and hereafter, a portion where the step is formed on the passivation layer 180 is referred to as "a wiring providing step part".

The passivation layer 180 of the inorganic insulating layer includes the first contact hole 184a, the second contact hole 184b, and the third contact hole 184c respectively exposing the first drain electrode 175a, the second drain electrode 175b, and the third drain is electrode 175c.

The pixel electrode 191, including the first subpixel electrode 191h and the second subpixel electrode 191l, is formed on the passivation layer 180. The first subpixel electrode 191h and the second subpixel electrode 191l respectively include partial plate electrodes 192h and 192l positioned at a center thereof, and a plurality of minute branch electrodes 193h and 193l protruding from the partial plate electrode 192h and 192l in an oblique direction.

The first subpixel electrode 191h includes the first partial plate electrode 192h and a plurality of first minute branch electrodes 193h positioned in the square region, and is connected to a wide end portion of the first drain electrode 175a by the first minute branch connection 194h extending outside the square region.

The first partial plate electrode 192h has a rhombus shape, a center thereof being positioned at a center of the square region, and each vertex of the rhombus meets the boundary of the square region. The first partial plate electrode 192h covers the first wiring providing step part generated in the passivation layer 180 by the first step providing wire 132h. As a result, the first partial plate electrode 192h has the step provided by the first wiring providing step part of the passivation layer 180. Referring to FIG. 8, the first wiring providing step part provides the pretilt to the liquid crystal molecules positioned at the center of the square region, thereby controlling the arrangement direction of the liquid crystal molecules, and as a result, reducing the texture.

A plurality of first minute branch electrodes 193h extend in an edge of the oblique direction of the first partial plate electrode 192h. The plurality of first minute branch electrodes 193h fill the rest of the square region, form an angle of 45 degrees with respect to the gate line 121 or the data line 171, and form an angle of 90 degrees with respect to the edge of the oblique direction of the first partial plate electrode 192h.

Meanwhile, in the exemplary embodiment of FIG. 7, the first subpixel electrode 191h includes the first minute branch connection 194h connecting the first partial plate electrode 192h and the ends of a plurality of the first minute branch electrodes 193h in a longitudinal direction or a horizontal direction. The first minute branch connection 194h overlaps the first subpixel electrode 191h and the underlying storage electrodes 135a and 135b, thereby forming a storage capacitance. However, according to an exemplary embodiment of the present invention, the first minute branch connection 194h may be omitted, and in this case, a plurality of first minute branch electrodes 193h protrude to the outside.

The second subpixel electrode 191l includes the second partial plate electrode 192l and a plurality of second minute branch electrodes 193l formed in the rectangle region having a longitudinal edge, and is connected to the wide end portion of the second drain electrode 175l by the second minute branch connection 194l extending outside the rectangle region.

The center of the second partial plate electrode 192l is positioned at the center of the rectangle region, and has a rhombus shape connecting the center of each edge of the rectangle region. As a result, each vertex of the rhombus meets the boundary of the rectangle region. Also, the second partial plate electrode 192l covers the second wiring providing step part generated in the passivation layer 180 by the second step providing wires 132l. As a result, the second partial plate electrode 192l has the step provided by the second wiring providing step part of the passivation layer 180, as illustrated in FIG. 8.

A plurality of second minute branch electrodes 193l extend from the edge of the is oblique direction of the second partial plate electrode 192l. A plurality of second minute branch electrodes 193l fill the rest of the rectangle region, form an angle of 45 degrees with respect to the gate line 121 or the data line 171, and form an angle of 90±15 degrees with respect to the edge of the oblique direction of the second partial plate electrode 192l.

In the exemplary embodiment of FIG. 4, the second subpixel electrode 191l includes the second minute branch connection 194l connecting the second partial plate electrode 192l and the ends of a plurality of second minute branch electrodes 193l in a longitudinal direction or a horizontal direction. The second minute branch connection 194l overlaps the second subpixel electrode 191l and the underlying storage electrode 135b and 135c, thereby forming a storage capacitance. However, according to an exemplary embodiment of the present invention, the second minute branch connection 194l may be omitted, and in this case, a plurality of second minute branch electrodes 193l protrude to the outside.

The first subpixel electrode 191h and the second subpixel electrode 191l are physically and electrically connected to the first drain electrode 175a and the second drain electrode 175b through the contact holes 184a and 184b, thereby receiving data voltages from the first drain electrode 175a and the second drain electrode 175b. At this time, a portion of the data voltage applied to the second drain electrode 175b is divided through the third source electrode 173c, such that a magnitude of the voltage applied to the second subpixel electrode 191l is less than the magnitude of the voltage applied to the first subpixel electrode 191h. Here, an area of the second subpixel electrode 191l may be approximately one to two times less than that of the first subpixel electrode 191h.

A lower alignment layer (not shown) is formed on the pixel electrodes 191. The lower alignment layer may be a vertical alignment layer, and may be an alignment layer is including a photo-reactive material. The photo reactive material will be described with reference to FIG. 44.

Next, the upper panel 200 will be described. The upper panel 200 of FIG. 7 and FIG. 8 includes the color filter 230.

That is, the light blocking member 220 is positioned under the insulation substrate 210. The light blocking member 220 is referred to as a "black matrix" and prevents light leakage. The light blocking member 220 extends along the gate line 121, covers a region where the first thin film transistor (Qh), the second thin film transistor (Ql), and the third thin film transistor (Qc) are positioned, extends along the data line 171, and covers the surroundings of the data line 171. A region that is not covered by the light blocking member 220 emits light to the outside, thereby displaying the images.

The color filter 230 is formed under the light blocking member 220. The color filter 230 may display one of three primary colors such as red, green, and blue. Alternatively, each color filter 230 may display the primary colors of yellow, cyan, magenta, and the like, or may display a plurality of colors other than these colors.

A planarization layer 250 providing a planar lower surface and made of the organic material is formed under the color filter 230.

A common electrode 270 made of the transparent conductive material is formed under the planarization layer 250.

An upper alignment layer (not shown) is formed under the common electrode 270. The upper alignment layer may be the vertical alignment layer, and may be an alignment layer in which a photo-polymer material is photo-aligned.

Polarizers (not shown) are formed on the outer surface of the display panels 100 and 200, the polarization axes of the two polarizers are crossed, and one polarization axis thereof may be parallel to the gate lines 121. However, the polarizer may only be disposed on one outer surface among the two display panels 100 and 200.

The liquid crystal layer 3 between the lower panel 100 and the upper panel 200 includes liquid crystal molecules 31 having negative dielectric anisotropy.

The liquid crystal layer 3 or the alignment layer (not shown) may further include the polymer that is polymerized by light, such as ultraviolet rays. The polymer included in the liquid crystal layer 3 provides the pretilt to the liquid crystal layer 3, and a method of providing the pretilt angle will be described in detail in FIG. 44. That is, the liquid crystal layer 3 may not include the polymer when the arrangement direction is sufficiently controlled without the polymer providing the pretilt angle.

As described above, in the exemplary embodiment of FIG. 7 and FIG. 8, the step provider is the step providing wiring of the cross type formed with the same layer as the gate line, thereby generating the step in the overlying insulating layer/passivation layer.

Figure 9:
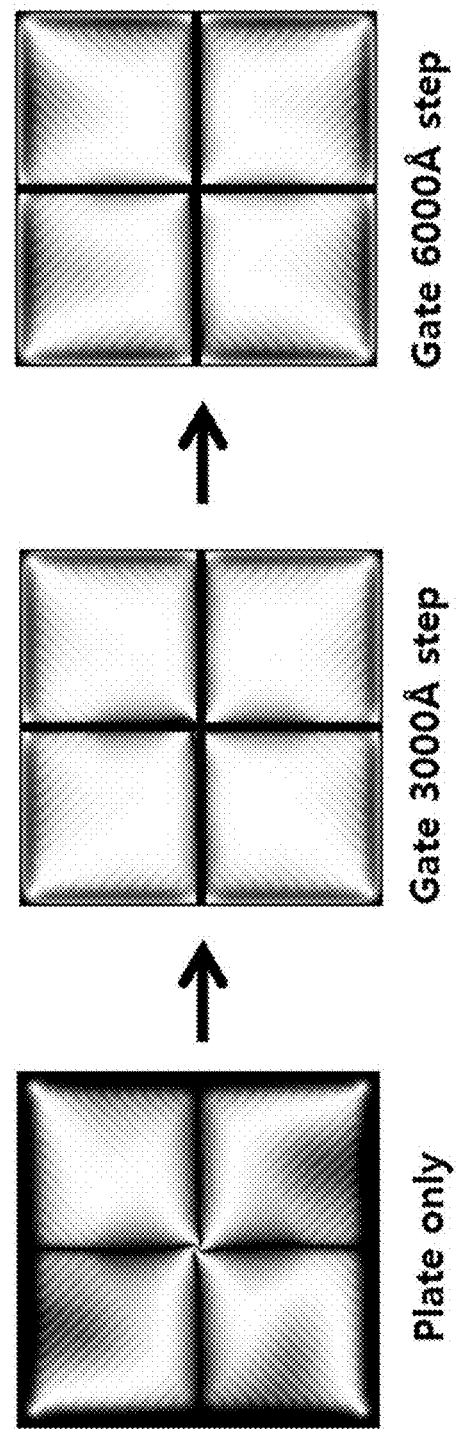
FIG. 9 is a view showing an experimental result using the exemplary embodiment of FIG. 7 and FIG. 8.

FIG. 9 illustrates how the texture is reduced the most according to the thickness of the step providing wiring (referring to d of FIG. 8), thereby increasing the transmittance.

FIG. 9 is a view showing an experimental result using the exemplary embodiment of FIG. 7 and FIG. 8.

In FIG. 9, "Plate only" means a case that the step providing wiring is not formed, and "Gate" is an exemplary embodiment in which the step providing wiring is formed with the same layer as the gate line. That is, referring to FIG. 9, the texture is lowest in the case of the step providing wiring when the same layer as the gate line has a thickness of 3000 Å compared to without the step providing wiring, and in the case that the thickness of the step providing is wiring is 6000 Å, the texture may be further generated. Through the above experiment, when the step providing wiring with the same layer as the gate line has a thickness of more than 3000 Å and less than 4000 Å, the control force of the liquid crystal molecules is improved such that the texture is reduced.

In the exemplary embodiment of FIG. 7 and FIG. 8, the step providing wiring is formed with the same layer as the gate line. However, the step providing wiring may be formed with the same layer as the data line as the step provider. Also, the step providing wiring may be formed with the same layer as the gate line and the data line, and this will be described with reference to FIG. 10.

Figure 10:
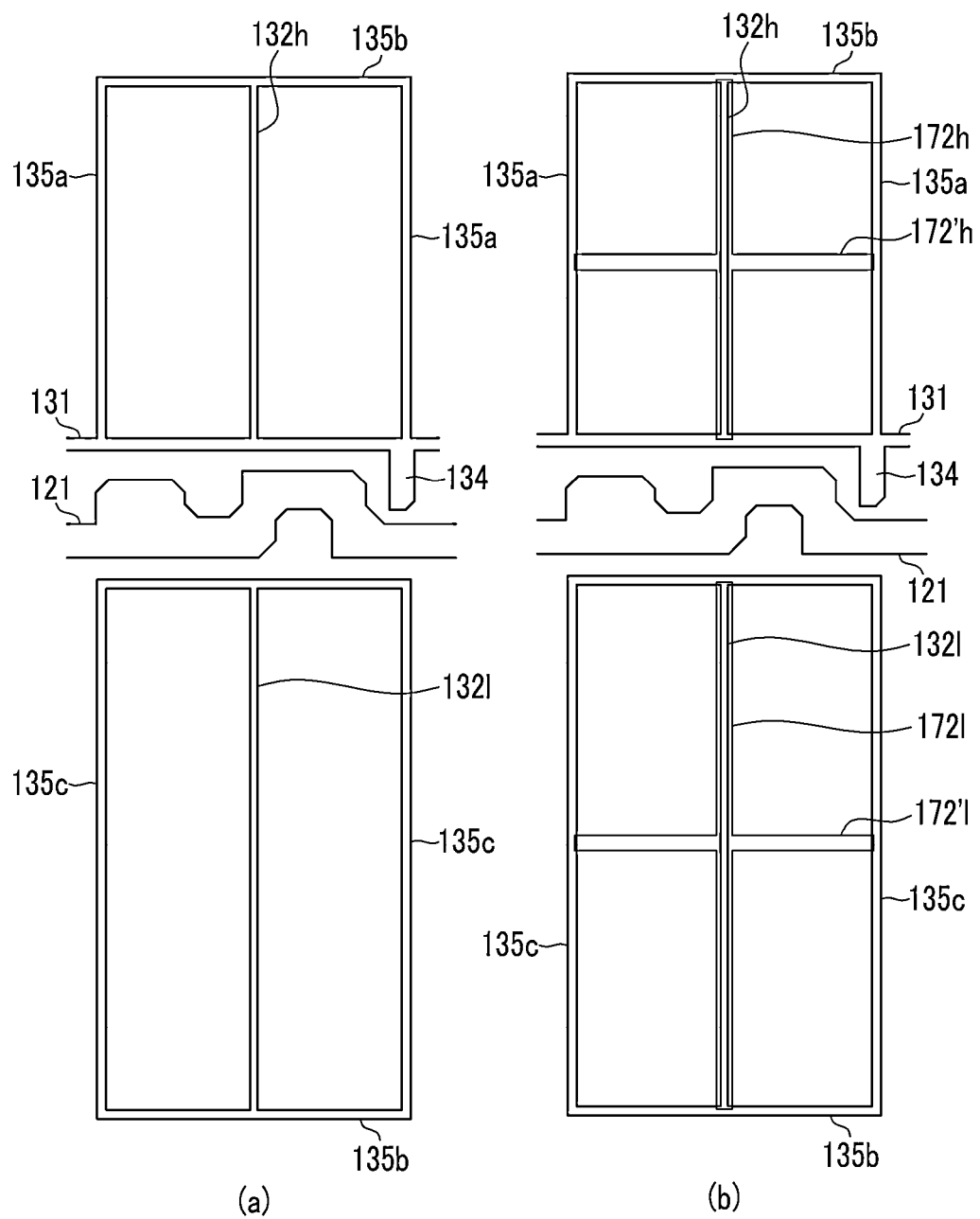
FIG. 10 is a layout view of a partial wiring part in a liquid crystal display according to another exemplary embodiment of the present invention.

FIG. 10 is a layout view of a partial wiring part in a liquid crystal display according to another exemplary embodiment of the present invention.

In (a) of FIG. 10, the step providing wiring is formed with the same layer as the gate line, and (b) of FIG. 10 illustrates the step providing wiring being additionally formed with the same layer as the data line, and the remaining structure is the same as the exemplary embodiment of FIG. 6 and FIG. 7. That is, in FIG. 10, the pixel electrode is not shown, however, similar to the structure of the pixel electrode shown in FIG. 6 and FIG. 7, the pixel electrode 191 includes the first subpixel electrode 191$h$ and the second subpixel electrode 192$l$, the first subpixel electrode 191$h$ includes the first partial plate electrode 192$h$ and a plurality of first minute branch electrodes 193$h$, and the second subpixel electrode 191$l$ includes the second partial plate electrode 192$l$ and a plurality of second minute branch electrodes 193$l$.

Among the step provider according to the exemplary embodiment of FIG. 10, the first step providing wiring formed with the same layer as the gate line will be described with reference to (a) of FIG. 10.

In (a) of FIG. 10, gate line 121, the storage voltage line 131 and the first step providing wiring 132$h$ and 132$l$ are formed on the insulation substrate 110. The storage voltage line 131 includes storage electrodes 135$a$, 135$b$, and 135$c$, and a capacitor electrode 134 extending downward. The storage voltage line 131 includes two first longitudinal storage electrode parts 135$a$ extending upward, a transverse storage electrode part 135$b$ connecting the two first longitudinal storage electrode parts 135$a$, and two second longitudinal storage electrode parts 135$c$ further extending upward from the transverse storage electrode part 135$b$. The first longitudinal storage electrode part 135$a$ is formed along a longitudinal edge of the first sub-pixel electrode 191$h$ formed thereon, and the second longitudinal storage electrode part 135$c$ is formed along the longitudinal edge of the second sub-pixel electrode 191$l$ formed thereon. Meanwhile, the transverse storage electrode part 135$b$ is positioned between a transverse edge of the previous second sub-pixel electrode 191$l$ and the transverse edge of the current first sub-pixel electrode 191$h$, and is formed along the two transverse edges. The first longitudinal storage electrode part 135$a$ and the transverse storage electrode part 135$b$ are formed along the edge of the first sub-pixel electrode 191$h$, thereby at least partially overlapping the first sub-pixel electrode 191$h$, and the second longitudinal storage electrode part 135$c$ and the transverse storage electrode part 135$b$ are formed along the edge of the second sub-pixel electrode 191$l$, thereby at least partially overlapping the second sub-pixel electrode 191$l$. In FIG. 1, the overlying transverse storage electrode part 135$b$ and the underlying transverse storage electrode part 135$b$ appear to be separated from each other, but in actuality, the transverse storage electrode parts 135$b$ of the pixels PX that are adjacent up and down are electrically connected to each other.

The first step providing wiring 132$h$ and 132$l$ is formed with the same layer and the same material as the gate line 121 and the storage voltage line 131, and in the exemplary is embodiment of FIG. 10, is electrically connected to the storage electrodes 135$a$, 135$b$, and 135$c$ of the storage voltage line 131. That is, the first-first step providing wiring 132$h$ has the straight shape extending in the longitudinal direction, and two ends are respectively connected to the transverse storage electrode part 135$b$ and the storage voltage line 131. The first-second step providing wiring 132$l$ has the straight shape extending in the longitudinal direction, and two ends are connected to the transverse storage electrode part 135$b$.

The gate insulating layer is formed on the gate line 121, the storage voltage line 131, and the first step providing wiring 132$h$ and 132$l$, and the semiconductor layer and the ohmic contact layer are formed thereon.

As shown in (b) of FIG. 10, second step providing wires 172$h$, 172'$h$, 172$l$, and 172'$l$ are additionally formed with the same layer as the data line. Among the second step providing wires 172$h$, 172'$h$, 172$l$, and 172'$l$, the second-first step providing wires 172$h$ and 172$l$ have the straight shape extending in the longitudinal direction and overlap the first step providing wires 132$h$ and 132$l$. Meanwhile, the second-second step providing wires 172'$h$ and 172'$l$ have the straight shape extending in the transverse direction, and the second-first step providing wires 172$h$ and 172$l$ are connected, thereby forming a cross shape.

The exemplary embodiment of FIG. 10 has the following advantages.

Referring to FIG. 9, the step providing wiring must be formed with a thickness of more than about 3000 Å to less than 4000 Å. However, it is difficult to form the above thickness with a single layer. In this case, as shown in FIG. 10($a$) and FIG. 10($b$), one step providing wire is formed with the same material as the gate line, and one step providing wire formed with the same material as the data line is formed thereon, thereby providing the sufficient step.

As opposed to the exemplary embodiment of FIG. 10, the first step providing wiring formed with the same layer as the gate line may have a cross shape, and in this case, one end of the first step providing wiring may be connected to the storage electrodes 135$a$, 135$b$, and 135$c$.

The passivation layer formed of the inorganic material is formed on the data line and the second step providing wires 172$h$, 172'$h$, 172$l$, and 172'$l$, and the wiring providing step part is formed in the passivation layer by the first and second step providing wiring.

In FIG. 10, the pixel electrode is not shown. However, referring to FIG. 7 and FIG. 8, the first partial plate electrode 192$h$ covers the first wiring providing step part generated in the passivation layer 180 by the first and second step providing wires 132$h$, 172$h$, and 172'$h$. As a result, the first partial plate electrode 192$h$ has the step provided by the first wiring providing step part of the passivation layer 180. Also, the second partial plate electrode 192$l$ covers the second wiring providing step part generated in the passivation layer 180 by the first and second step providing wires 132$l$, 172$l$, and 172'$l$. As a result, the second partial plate electrode 192$l$ has the step provided by the second wiring providing step part of the passivation layer 180.

Here, the first and second wiring providing step part provides the pretilt to the liquid crystal molecules, thereby controlling an arrangement direction of the liquid crystal molecules, and as a result, texture is reduced.

In the exemplary embodiment of FIG. 4, FIG. 5, FIG. 7, and FIG. 8, the various exemplary embodiments of the step provider shown in FIG. 1 and FIG. 2 have been described.

In FIG. 11 to FIG. 16, similar to the step provider of FIG. 1 and FIG. 2, the step providing groove and the cross-shaped protrusion are formed in the passivation layer 180 of the insulator, and variations of the step providing groove and a manufacturing method thereof will is be described.

Figure 11:
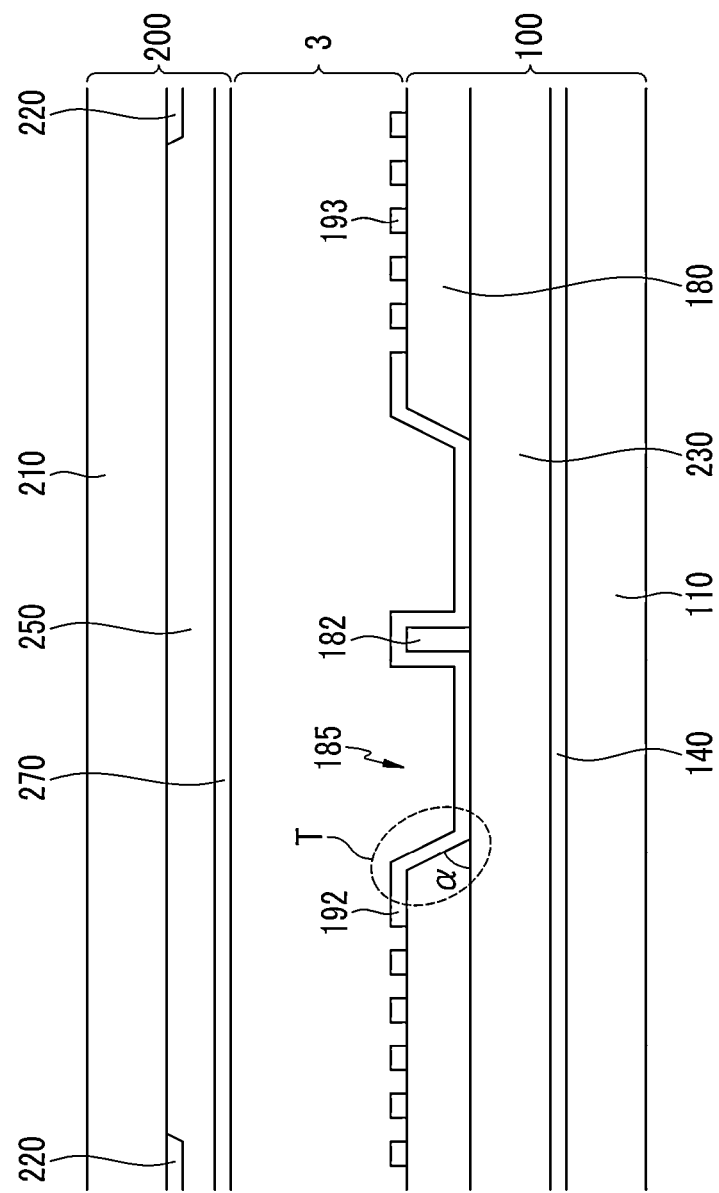
FIG. 11, (b) of FIG. 12, and FIG. 14 are cross-sectional views of a liquid crystal display according to another exemplary embodiment of the present invention, where (a) of FIG. 12 is a layout view and (c) of FIG. 12 is an experimental result using the exemplary embodiment.
Figure 13:
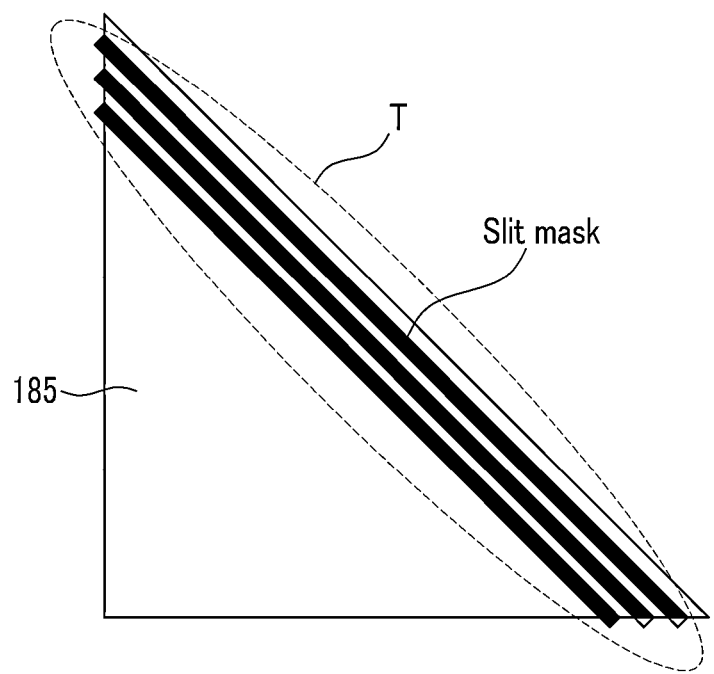
FIG. 13, FIG. 15, and FIG. 16 are masks used for manufacturing the liquid crystal display according to another exemplary embodiment of the present invention.
Figure 15:
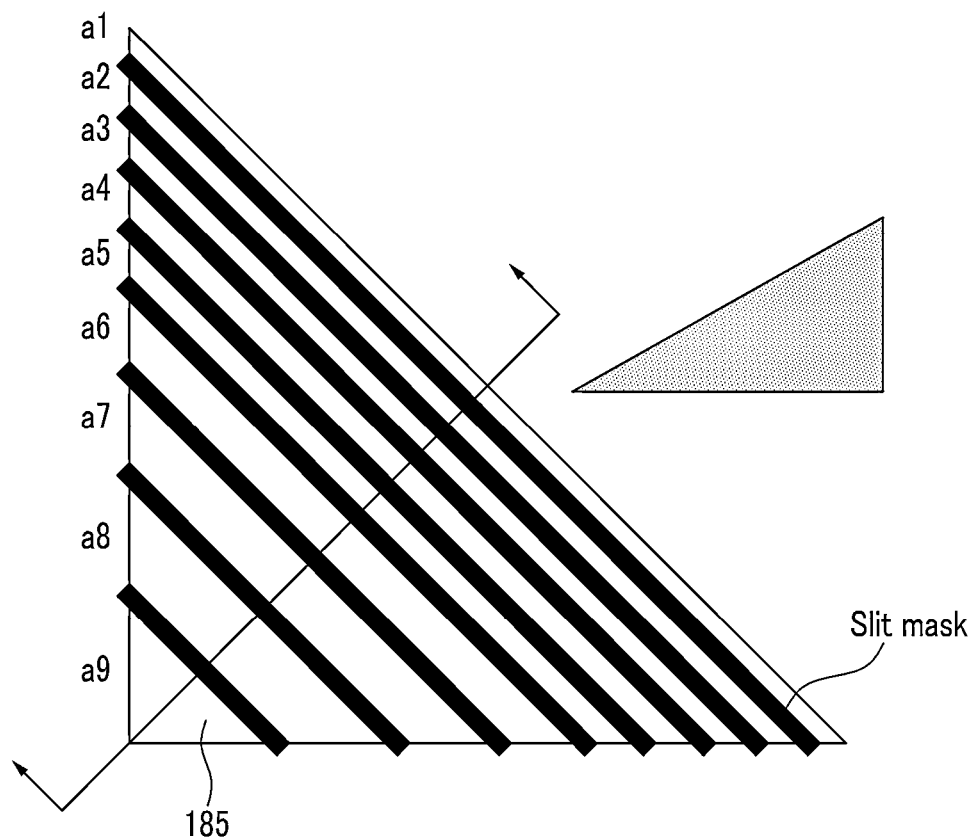
Figure 16:
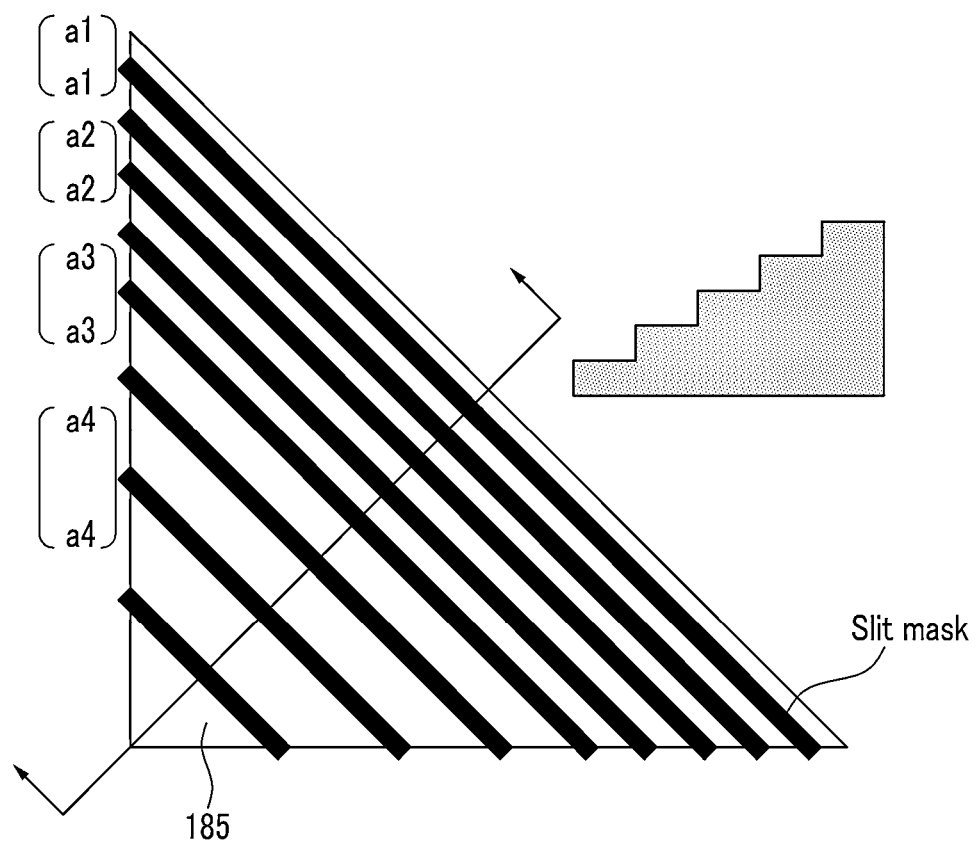

FIGS. 11, (b) of 12, and 14 are cross-sectional views of a liquid crystal display according to another exemplary embodiment of the present invention, and FIGS. 13, 15, and 16 illustrate masks used for manufacturing the same.

Firstly, an exemplary embodiment having a taper structure in a side wall in a step providing groove 185 formed in the passivation layer 180 of the insulator will be described with reference to FIG. 11 to FIG. 13.

FIG. 11 corresponds to FIG. 2, and is the same as FIG. 2 except for a point where the side wall of the step providing groove 185 has a taper structure (referring to "T") and is inclined. As shown in the layout view, the taper structure is indicated by T in (a) of FIG. 12. As shown in (a) of FIG. 12, the tapered region is formed in the slanted side surface of the step providing groove 185 corresponding to each edge of the partial plate electrode. Also, in the layout view, the step providing groove 185 is a right triangle, and the side surface corresponding to the oblique edge in the layout view has a slanted taper structure.

Meanwhile, in the exemplary embodiment of FIG. 11, the cross-shaped protrusion 182 formed in the passivation layer 180 of the insulator does not have the taper structure. However, according to an exemplary embodiment, as shown in (b) of FIG. 12, the cross-shaped protrusion 182 may also have the taper structure.

Figure 12:
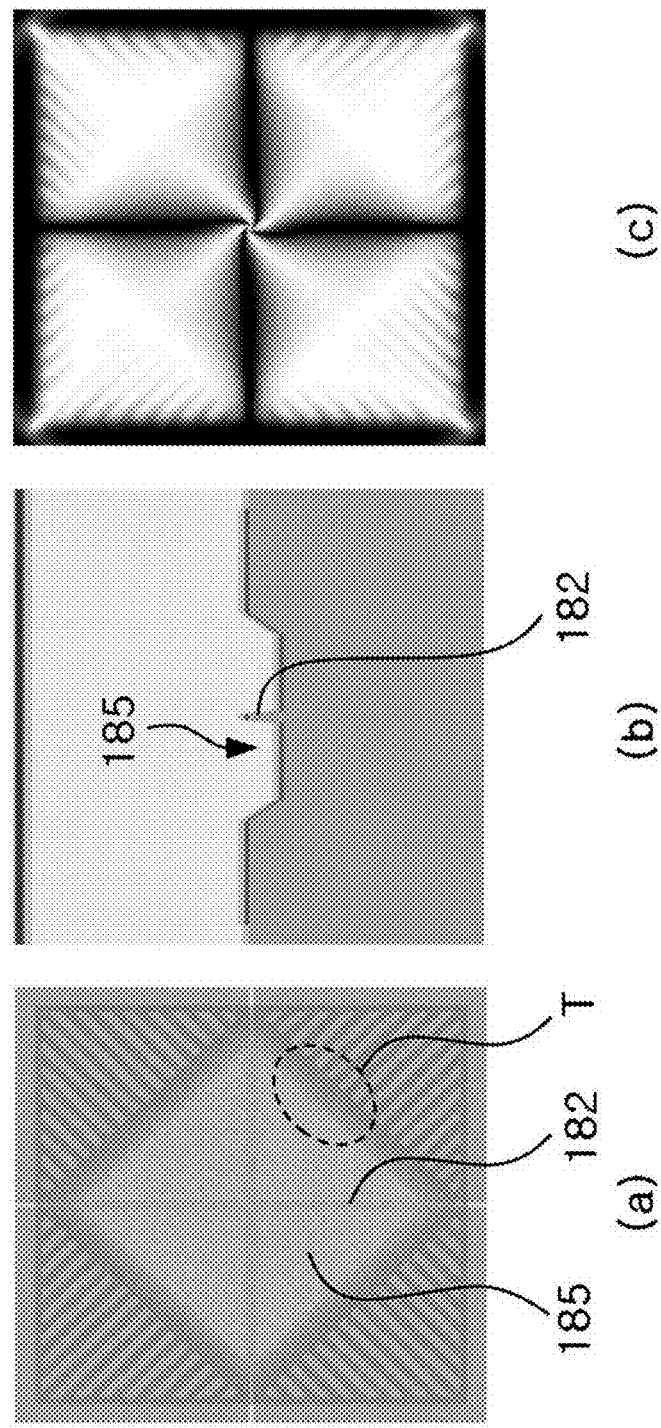

In (c) of FIG. 12 as the drawing for testing the texture generation and the transmittance of the pixel having the structure of FIG. 11 and (a) of FIG. 12, it may be confirmed that the control force of the liquid crystal molecules is improved in the side wall of the step providing groove 185 formed with the taper structure such that the texture is decreased compared with the other side walls of the step providing groove 185.

As shown in FIG. 11 and (a) of FIG. 12, to form the taper structure at the side wall of the step providing groove 185, a slit mask shown in FIG. 13 may be used for exposure and developing.

In FIG. 13, a slit mask is positioned at the side wall where the taper structure will be formed in the step providing groove 185, and the exposure process is executed such that the taper structure is formed by the difference of the exposure amount. In the slit mask used in the present exemplary embodiment of the present invention, a bar blocking light and an opening part transmitting light are repeated 2-4 times, and the width of the bar and the opening part has a value of more than 0.8 to less than 2 μm.

According to an exemplary embodiment of the present invention, the tapered side wall may be formed without the slit mask shown in FIG. 13. This is the because the side wall does not have the completely vertical structure and the tapered structure is formed when forming the pattern through the general exposure/developing such that the step providing groove 185 having the slightly tapered side wall may be formed without the separate slit mask.

The case of using the slit mask as shown in FIG. 13 may be applied when forming a larger taper angle than the general etching.

Figure 14:
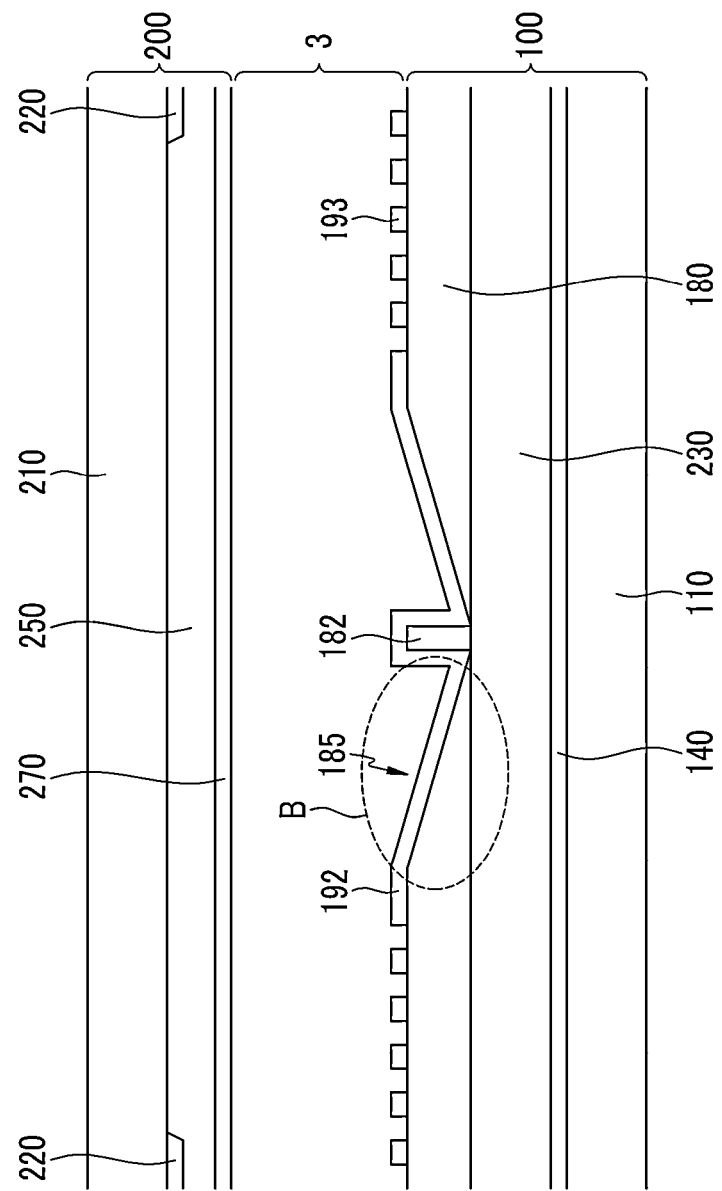

On the other hand, FIG. 14 to FIG. 16 show an exemplary embodiment in which a lower surface (a bottom surface) of the step providing groove 185 formed in the passivation layer 180 of the insulator is slanted differently than as shown in FIG. 11 to FIG. 13.

In FIG. 14 corresponding to FIG. 2, the lower surface (the bottom surface) of the step providing groove 185 is completely inclined, while the lower surface and one side surface are integrally formed with a predetermined slope. That is, in the exemplary embodiment of FIG. 14, the tapered region is wider than in the exemplary embodiment of FIG. 11 such that the "B" is region of FIG. 14 has an overall tapered structure.

As shown in FIG. 14, to form the entire inclination structure on the lower surface, a mask such as the slit mask controlling the exposure amount must be used, and the usable mask is respectively shown in FIG. 15 and FIG. 16.

First, the mask of FIG. 15 as the slit mask is positioned through the overall step of providing the groove 185 formed in the passivation layer 180 of the insulator and then the exposure is executed, and the slit mask includes the bar blocking the light and the opening part passing the light that are repeated and has a structure in which the width of the opening part is gradually increased. Here, the width of the bar has a value of more than 0.8 to less than 2 μm, and the width of the opening part is continuously increased from the width more than 0.8 to less than 2 μm to a value of more than 0.2 to less than 0.5 μm.

If the step providing groove 185 is formed by using this slit mask as shown in FIG. 15, the step providing groove 185 has a structure in which the depth of the cross-section is uniformly changed.

On the other hand, a slit mask of FIG. 16 has a structure including a group having the opening part of the same interval, as opposed to that shown in FIG. 15, and a group a1, a group a2, a group a3, and a group a4 are shown in FIG. 16. That is, the width of the bar in all groups has an equal value of more than 0.8 to less than 2 μm, although each group has a different interval of the opening part. However, the interval of group a2 is greater than group a1, and the interval of the opening part is increased to be closer to group a2, group a3, and group a4.

When exposing by using the slit mask shown in FIG. 16, a step providing groove 185 having a step-shaped like the cross-section shown in FIG. 16 may be formed. The real pattern has the rounded step shape compared with the cross-section shown in FIG. 16, thereby is having the cross-sectional structure in which the width is gradually changed.

Figure 44:
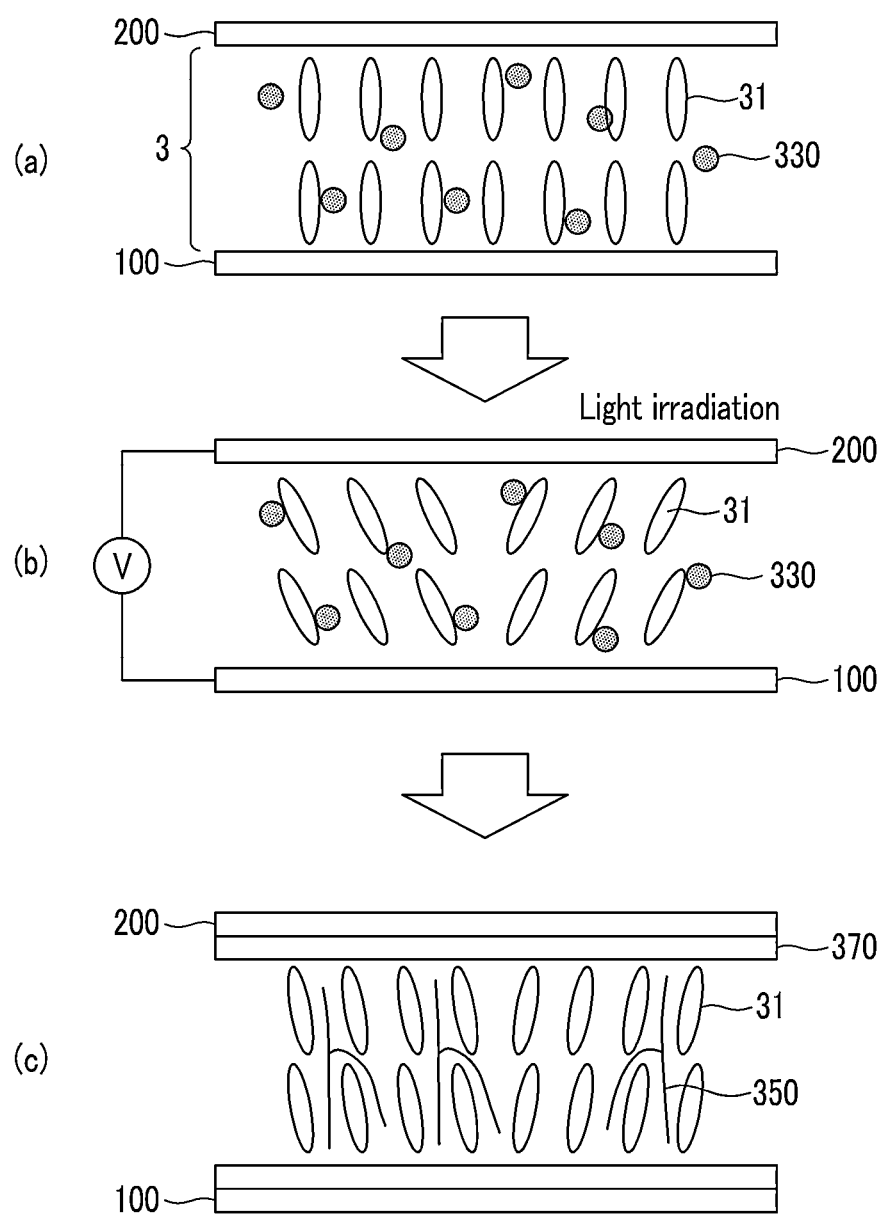
FIG. 44 is a view of a process of providing a pretilt to liquid crystal molecules by using a prepolymer that is polymerized by light such as ultraviolet rays.

The step providing groove 185 formed by using the slit mask shown in FIG. 15 and FIG. 16 improves the control force of the liquid crystal molecules as a result of the step in the step providing groove 185, thereby reducing the generation of the texture. Also, the step providing groove 185 reinforces the control force of the liquid crystal molecules more than any other exemplary embodiment, as shown in FIG. 44. Although the liquid crystal layer or the alignment layer does not include the pretilt providing polymer that is polymerized by light such as ultraviolet rays, the liquid crystal molecules may be sufficiently controlled and the texture may be prevented.

The exemplary embodiment of the present invention that does not include the pretilt providing polymer that is polymerized by light, such as ultraviolet rays, will be described with reference to FIG. 17 to FIG. 19.

Figure 17:
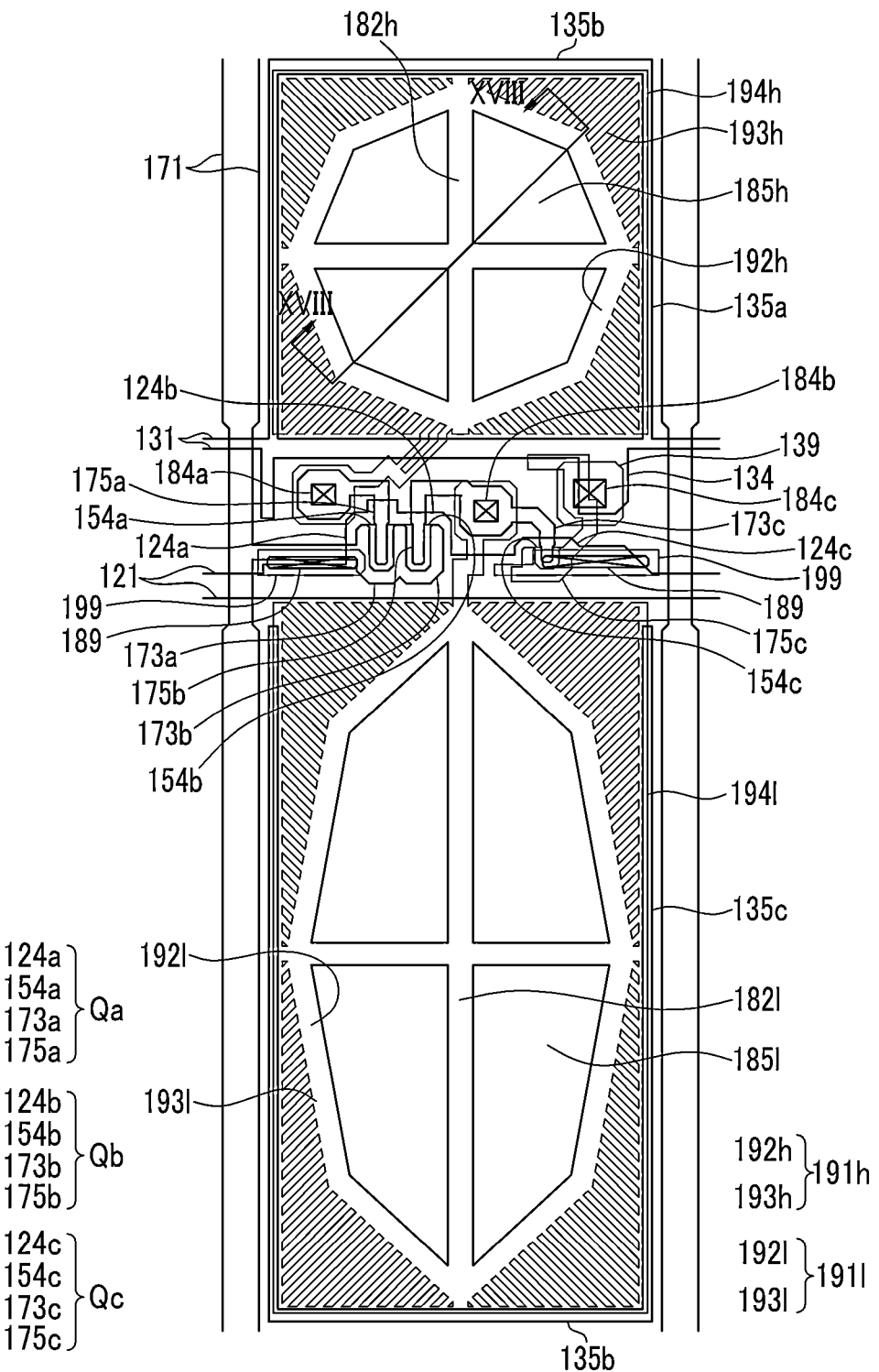
FIG. 17 is a layout view of a liquid crystal display according to another exemplary embodiment of the present invention.
Figure 18:
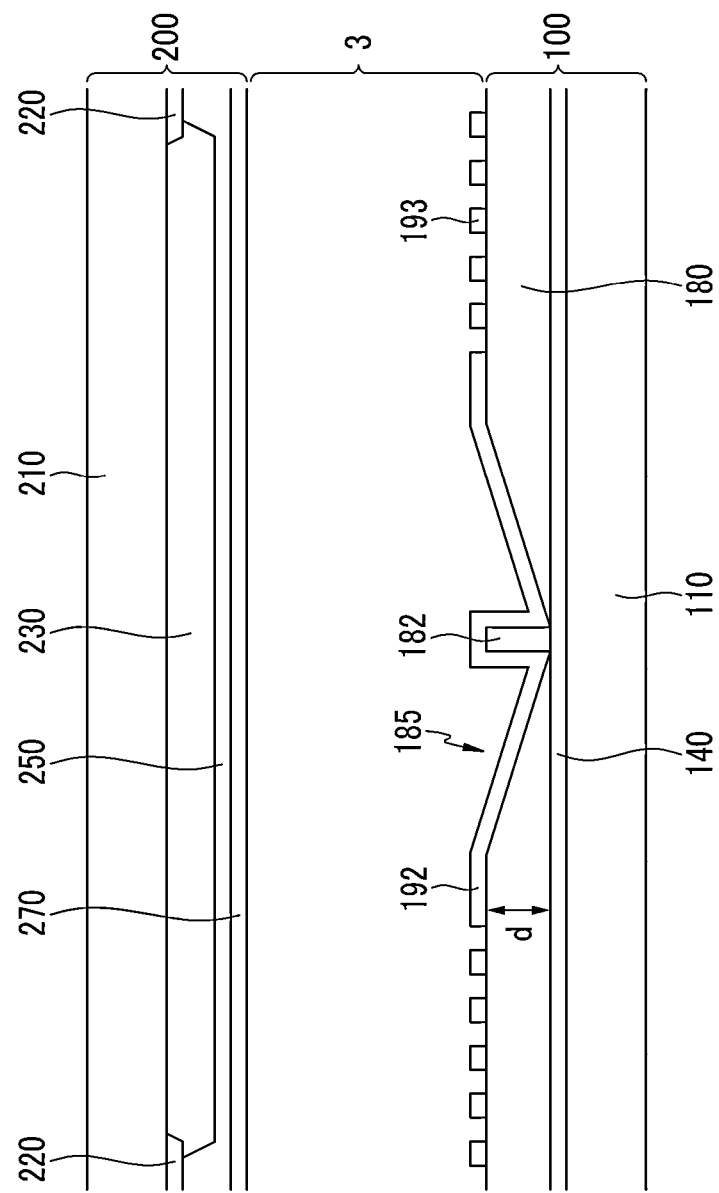
FIG. 18 is a cross-sectional view taken along the line XVIII-XVIII of FIG. 17.

FIG. 17 is a layout view of a liquid crystal display according to another exemplary embodiment of the present invention, and FIG. 18 is a cross-sectional view taken along the line XVIII-XVIII of FIG. 17.

Referring to FIG. 17 and FIG. 18, the liquid crystal display according to the present exemplary embodiment includes the lower panel 100 and the upper panel 200 facing each other, the liquid crystal layer 3 interposed between the two display panels 100 and 200, and a pair of polarizers (not shown) attached at the outer surfaces of the display panels 100 and 200.

The lower panel 100 will now be described.

The gate line 121 and the storage voltage line 131 are formed on an insulation substrate 110. The gate line 121 includes a first gate electrode 124a, a second gate electrode 124b, and a third gate electrode 124c. The storage voltage line 131 includes storage electrodes 135a, 135b, and 135c, and a capacitor electrode 134 extending downward. The storage voltage line 131 includes two first longitudinal storage electrode parts 135a extending upward, a transverse storage electrode part 135b connecting the two first longitudinal storage electrode parts 135a, and two second longitudinal storage electrode parts 135c further extending upward from the transverse storage electrode part 135b.

The first longitudinal storage electrode part 135a is formed along a longitudinal edge of the first sub-pixel electrode 191h formed thereon, and the second longitudinal storage electrode part 135c is formed along the longitudinal edge of the second sub-pixel electrode 191l formed thereon. Meanwhile, the transverse storage electrode part 135b is positioned between a transverse edge of the previous second sub-pixel electrode 191l and the transverse edge of the current first sub-pixel electrode 191h, and is formed along the two transverse edges.

As a result, the first longitudinal storage electrode part 135a and the transverse storage electrode part 135b are formed along the edge of the first sub-pixel electrode 191h, thereby at least partially overlapping the first sub-pixel electrode 191h, and the second longitudinal storage electrode part 135c and the transverse storage electrode part 135b are formed along the edge of the second sub-pixel electrode 191l, thereby at least partially overlapping the second sub-pixel electrode 191l.

In FIG. 17, the overlying transverse storage electrode part 135b and the underlying transverse storage electrode part 135b appear to be separated from each other, but in actuality, the transverse storage electrode parts 135b of the pixels PX that are adjacent up and down are electrically connected to each other.

The gate insulating layer 140 is formed on the gate line 121 and the storage voltage line 131. The first semiconductor 154a, the second semiconductor 154b, and the third is semiconductor 154c are formed on the gate insulating layer 140.

The plurality of ohmic contacts (not shown) are formed on the first semiconductor 154a, the second semiconductor 154b, and the third semiconductor 154c.

Data conductors 171, 173c, 175a, 175b, and 175c including a plurality of data lines 171 which include the first source electrode 173a and the second source electrode 173b, the first drain electrode 175a, the second drain electrode 175b, the third source electrode 173c, and the third drain electrode 175c, are formed on the semiconductor (the first semiconductor 154a, the second semiconductor 154b, and the third semiconductor 154c), the ohmic contacts (not shown), and the gate insulating layer 140.

The first gate electrode 124a, the first source electrode 173a, and the first drain electrode 175a form a first thin film transistor Qa together with the first semiconductor 154a, and a channel of the first thin film transistor Qa is formed in the semiconductor portion 154a between the first source electrode 173a and the first drain electrode 175a. Similarly, the second gate electrode 124b, the second source electrode 173b, and the second drain electrode 175b form a second thin film transistor Qb together with the second semiconductor 154b, a channel of the second thin film transistor Qb is formed in the semiconductor portion 154b between the second source electrode 173b and the second drain electrode 175b, the third gate electrode 124c, the third source electrode 173c, and the third drain electrode 175c form a third thin film transistor Qc together with the third semiconductor 154c, and a channel of the third thin film transistor Qc is formed in the semiconductor portion 154c between the third source electrode 173c and the third drain electrode 175c.

The passivation layer 180 is formed on the gate insulating layer 140, the data conductors 171, 173c, 175a, 175b, and 175c, and the exposed portion of the semiconductors 154a, 154b, and 154c. The passivation layer 180 may be formed of an insulator such as silicon nitride and silicon oxide, or an insulator, and in the exemplary embodiment of FIG. 17, the organic insulating layer including the insulator is described.

The step provider providing the step to the overlying layer is formed in the passivation layer 180 of the insulator, and in FIG. 17, the step providing grooves 185h and 185l and the protrusion 182 of the cross type positioned between the step providing grooves 185h and 185l are the step provider. As shown in FIG. 17, the step providing grooves 185h and 185l have a quadrangle structure having two edges crossing perpendicularly and are symmetrical to each other in the diagonal direction. As a result, the passivation layer 180 includes the cross-shaped protrusion 182.

Also, referring to FIG. 18, the lower surface of the step providing grooves 185h and 185l are entirely inclined, while forming the predetermined slope by the lower surface and one side surface that are integral. As described above, the lower surface of the step providing grooves 185h and 185l has a slope such that the alignment direction of the liquid crystal molecules is controlled, thereby reducing the generation of the texture.

The passivation layer 180 includes the first contact hole 184a, the second contact hole 184b, and the third contact hole 184c respectively exposing the first drain electrode 175a, the second drain electrode 175b, and the third drain electrode 175c. The passivation layer 180 includes the opening 189 collecting the gas emitted from the color filter 230. According to FIG. 17, one pixel may include a pair of openings 189.

The pixel electrode 191, including the first sub-pixel electrode 191h and the second sub-pixel electrode 191l, is formed on the passivation layer 180. The first sub-pixel electrode 191h and the second sub-pixel electrode 191l respectively include partial plate is electrodes 192h and 192l positioned at a center thereof and a plurality of minute branch electrodes 193h and 193l protruding from the partial plate electrode 192h and 192l in an oblique direction.

The first sub-pixel electrode 191h includes the first partial plate electrode 192h and a plurality of first minute branch electrodes 193h positioned in the square region, and is connected to a wide end portion of the first drain electrode 175a by the first minute branch connection 194h extending outside the square region.

The first partial plate electrode 192h has an equilateral octagonal shape, the center thereof is positioned at the center of the square region, and four vertices of the equilateral octagonal shape meet the boundary of the square region. The first partial plate electrode 192h covers the first step providing groove 185h of the passivation layer 180 and the first cross-shaped protrusion 182h. As a result, the first partial plate electrode 192h has the step provided by the first step providing groove 185h of the passivation layer 180 and the first cross-shaped protrusion 182h. Here, referring to FIG. 18, the first cross-shaped protrusion 182h provides a pretilt to the liquid crystal molecules at the center of the square region, thereby controlling an arrangement direction of the liquid crystal molecules, and as a result, texture is reduced.

A plurality of first minute branch electrodes 193h are extended in eight edges of the oblique direction of the first partial plate electrode 192h. A plurality of first minute branch electrodes 193h fill the rest of the square region, form an angle of 45 degrees with respect to the gate line 121 or the data line 171, and form an angle of 90 degrees with respect to the edge of the oblique direction of the first partial plate electrode 192h.

In the exemplary embodiment of FIG. 17, the first sub-pixel electrode 191h includes the first minute branch connection 194h connecting the first partial plate electrode 192h and the ends of a plurality of first minute branch electrodes 193h in a longitudinal direction or a horizontal direction. The first minute branch connection 194h overlaps the first sub-pixel electrode 191h and the underlying storage electrodes 135a and 135b, thereby forming a storage capacitance. However, according to an exemplary embodiment, the first connection 194h may be omitted, and in this case, a plurality of first minute branch electrodes 193h protrude to the outside.

The second sub-pixel electrode 191l includes the second partial plate electrode 192l and a plurality of second minute branch electrodes 193l formed in the rectangle region having a longitudinal edge, and is connected to the wide end portion of the second drain electrode 175l by the second connection 197l extending outside the rectangle region.

The center of the second partial plate electrode 192l is positioned at the center of the rectangle region and has an octagonal shape connecting the center of each edge of the rectangle region. As a result, four vertices of the octagon meet the boundary of the rectangle region. The second partial plate electrode 192l covers the second step providing groove 185l of the passivation layer 180 and the second cross-shaped protrusion 182l. As a result, the second partial plate electrode 192l has the step provided by the second step providing groove 185l of the passivation layer 180 and the second cross-shaped protrusion 182l. (referring to FIG. 18)

A plurality of second minute branch electrodes 193l extend from eight edges of the oblique direction of the second partial plate electrode 192l. A plurality of second minute branch electrodes 193l fill the rest of the rectangle region, form an angle of 45 degrees with respect to the gate line 121 or the data line 171, and form an angle of 90±15 degrees with respect to the edge of the oblique direction of the second partial plate electrode 192l.

In the exemplary embodiment of FIG. 17, the second sub-pixel electrode 191l is includes the second minute branch connection 194l connecting the second partial plate electrode 192l and the ends of a plurality of second minute branch electrodes 193l in a longitudinal direction or a horizontal direction. The second minute branch connection 194l overlaps the second sub-pixel electrode 191l and the underlying storage electrodes 135b and 135c, thereby forming a storage capacitance. However, according to an exemplary embodiment, the second minute branch connection 194l may be omitted, and in this case, a plurality of second minute branch electrodes 193l protrude to the outside.

The first sub-pixel electrode 191h and the second sub-pixel electrode 191l are physically and electrically connected to the first drain electrode 175a and the second drain electrode 175b through the contact holes 184a and 184b, thereby receiving data voltages from the first drain electrode 175a and the second drain electrode 175b. At this time, the portion of the data voltage applied to the second drain electrode 175b is divided through the third source electrode 173c, such that a magnitude of the voltage applied to the second sub-pixel electrode 191l is less than the magnitude of the voltage applied to the first sub-pixel electrode 191h. Here, an area of the second sub-pixel electrode 191l may be approximately one to two times less than that of the first sub-pixel electrode 191h.

The storage electrode connecting member 139 connects the capacitor electrode 134 of the storage voltage line 131 and the third drain electrode 175c through the contact hole 184c. A storage voltage Vcst is applied to the capacitor electrode 134 of the storage voltage line 131 to have a predetermined voltage, and thereby apply the storage voltage Vcst to the third thin film transistor Qc through the third drain electrode 175c. As a result, the voltage applied to the second sub-pixel may be decreased.

The cover 199 covering the opening 189 of the passivation layer 180 is formed on is the opening 189. According to FIG. 17, one pixel may include a pair of covers 199. The pixel electrode 191 and the cover 199 may be made of the transparent conductive material such as ITO or IZO. According to an exemplary embodiment of the present invention, the opening 189 and the cover 199 may be omitted.

The lower alignment layer (not shown) is formed on the pixel electrodes 191. The lower alignment layer may be a vertical alignment layer. The lower alignment layer does not include the photo-reactive material shown in FIG. 44. This is because the exemplary embodiment of FIG. 17 has sufficient control force of the liquid crystal molecules.

The common electrode panel 200 will now be described. The upper panel 200 of FIG. 17 and FIG. 18 includes the color filter 230.

The light blocking member 220 is formed on an insulation substrate 210. The light blocking member 220 is referred to as black matrix, and prevents light leakage. The light blocking member 220 extends along the gate line 121, covers a region where the first thin film transistor (Qh), the second thin film transistor (Ql), and the third thin film transistor (Qc) are positioned, extends along the data line 171, and covers the surroundings of the data line 171. The region that is not covered by the light blocking member 220 emits light to the outside, thereby displaying the images.

The color filter 230 is formed under the light blocking member 220. The color filter 230 may display one of three primary colors such as red, green, and blue, but it is not limited to display of the three primary colors and may display one of cyan, magenta, yellow, and white-based colors.

A planarization layer 250 providing a planar lower surface and made of the organic material may be formed under the color filter 230.

A common electrode 270 made of the transparent conductive material may be formed under the planarization layer 250.

The upper alignment layer (not shown) is formed under the common electrode 270. The upper alignment layer may be a vertical alignment layer. The upper alignment layer does not include the photo-reactive material shown in FIG. 44. This is because the exemplary embodiment of FIG. 17 has sufficient control force of the liquid crystal molecules.

Polarizers (not shown) are formed on the outer surface of the display panels 100 and 200, the polarization axis of the two polarizers are crossed, and one polarization axis thereof may be parallel to the gate lines 121. The polarizer may be disposed on one outer surface among the two display panels 100 and 200.

The first sub-pixel electrode 191h and the second sub-pixel electrode 191l to which the data voltage is applied generate an electric field in conjunction with the common electrode 270 of the common electrode panel 200 such that the liquid crystal molecules of the liquid crystal layer 3 that are aligned vertical to the surface of the two electrodes 191 and 270 in the absence of an electric field are slanted in the direction parallel to the surface of the two electrodes 191 and 270, and thereby the luminance of the light transmitted through the liquid crystal layer 3 differs depending on the slant degree of the liquid crystal molecules.

The liquid crystal display may further include a spacer to maintain a cell interval between the two display panels 100 and 200, and the spacer may be attached to the upper panel 200 or the lower panel 100.

The liquid crystal layer 3 disposed between the lower panel 100 and the upper panel 200 includes the liquid crystal molecules 31 having negative dielectric anisotropy. The liquid crystal layer 3 does not include the photo-reactive material shown in FIG. 44. This is because the exemplary embodiment of FIG. 17 has sufficient control force of the liquid crystal molecules.

As described above, in the exemplary embodiment of FIG. 17 and FIG. 18, the step provider is formed in the passivation layer 180 of the insulator and made of the cross-type protrusions 182*h* and 182*l* positioned between the step providing grooves 185*h* and 185*l*. The partial plate electrodes 192*h* and 192*l* have an octagonal shape.

The lower surface of the step providing grooves 185*h* and 185*l* is totally inclined, while forming the predetermined slope by the lower surface and one integral side surface. As described above, the lower surface of the step providing grooves 185*h* and 185*l* is inclined such that the alignment direction of the liquid crystal molecules is controlled, thereby providing the pretilt. The step providing grooves 185*h* and 185*l* of FIG. 17 are formed at a wider region than another exemplary embodiment such that the region providing the pretilt to the liquid crystal molecule is widened. As a result, the liquid crystal molecules are not misaligned, and the texture is not generated. Because the texture is not generated in the embodiment of FIG. 17, the photo-reactive material shown in FIG. 44 may not be included.

Next, a characteristic of the exemplary embodiment of FIG. 17 and FIG. 18 will be described focusing on an experimental result for the exemplary embodiment of FIG. 17 and FIG. 18.

FIG. 19 is a view showing an experimental result using the exemplary embodiment of FIG. 17 and FIG. 18.

First, (a) of FIG. 19 is an experimental result of the exemplary embodiment in which the partial plate electrode has a rhombus structure, the step providing groove has a lower surface that is entirely inclined, and the photo-reactive material is not inclined in the liquid is crystal layer or the alignment layer. As shown in (a) of FIG. 19, the texture is generated in the portion of the minute branch electrode. This is because the photo-reactive material does not exist on the minute branch electrode such that the liquid crystal molecules do not have the pretilt.

(b) of FIG. 19 is an experimental result using the exemplary embodiment of FIG. 17 and FIG. 18. The partial plate electrode has an octagonal structure such that the region forming the minute branch electrodes is reduced, and as a result, although the photo-reactive material does not exist, the liquid crystal molecules are controlled with the pretilt provided by the inclined lower surface in the step providing groove such that the texture may not be generated.

In FIG. 19, (c) clearly shows the direction of the pretilt provided from the lower surface of the step providing groove and the pretilt provided to the liquid crystal molecules as a result of the cross-shaped protrusion. That is, in the cross-sectional view of (c) of FIG. 19, the liquid crystal molecule has the pretilt according to the slope of the lower surface of the step providing groove, and in the plane view of (c) of FIG. 19, the pretilt direction of the liquid crystal molecules is shown through arrows 1, 2, and 3. In the plane view of (c) of FIG. 19, the arrow 1 indicates the pretilt direction generated by the inclined slope in the side wall portion of the step providing groove. In the plane view of (c) of FIG. 19, the arrow 2 indicates the pretilt direction generated by the inclined slope in the lower surface of the step providing groove. In the plane view of (c) of FIG. 19, the arrow 3 indicates the pretilt direction generated by the cross-type protrusion.

As described above, in the exemplary embodiment of FIG. 17 and FIG. 18, although the photo-reactive material is not formed in the liquid crystal layer or the alignment layer, the alignment direction of the liquid crystal molecules may be sufficiently controlled in three large pretilt directions such that the texture is not generated.

Next, various structures of the pixel electrode will be described with reference to FIG. 20 to FIG. 24.

FIG. 20 to FIG. 24 are enlarged views of a pixel electrode of a liquid crystal display according to another exemplary embodiment of the present invention.

Figure 20:
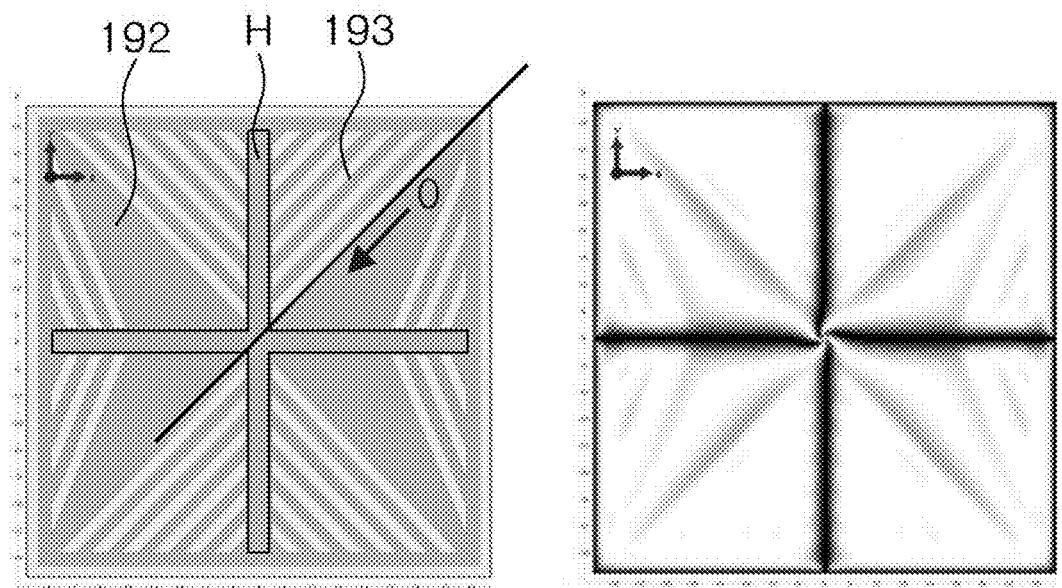
FIG. 20, FIG. 21, FIG. 22, FIG. 23, and FIG. 24 are enlarged views of a pixel is electrode of a liquid crystal display according to another exemplary embodiment of the present invention.

Firstly, FIG. 20 shows a structure of the pixel electrode including an "X" shaped partial plate electrode and an experimental result of transmittance. FIG. 20 shows the structure corresponding to the first sub-pixel electrode of FIG. 1.

The pixel electrode according to the exemplary embodiment of FIG. 20 includes an "X" shaped partial plate electrode 192 and the minute branch electrodes 193 extended therefrom.

In the "X" shaped partial plate electrode 192, a transverse extension and a longitudinal extension traversing the pixel area in the longitudinal direction and the transverse direction are formed.

The "x" shaped partial plate electrode 192 has four portions forming the X shape, and each portion has a structure in which the width is gradually decreased from the center of the pixel electrode to the outer part.

Each portion has a triangular shape having the center of the pixel, one corner of the pixel, and the position on the center of the pixel and the transverse extension as the vertices.

In the "X" shaped partial plate electrode 192, the transverse extension, the longitudinal extension, and minute branch electrodes 193 are extended and formed in the rest of the portion of the pixel area, and are arranged parallel to the edge of the adjacent portion.

In the exemplary embodiment of FIG. 20, a minute branch connection enclosing the outer part of the pixel area is further included. The minute branch connection is formed at is four edges of the pixel area. However, according to an exemplary embodiment, it may be formed at at least one edge or may not be formed at all.

The pixel according to the exemplary embodiment of FIG. 20 includes a step provider H. FIG. 20 schematically shows the step provider H providing the step to the corresponding region as one of the above-described drawings.

Referring to the transmittance of the exemplary embodiment of FIG. 20, the texture is partially generated according to the edge of the "X" shaped partial plate electrode 192 such that it may be confirmed that the texture of the "X" shape is generated.

Figure 21:
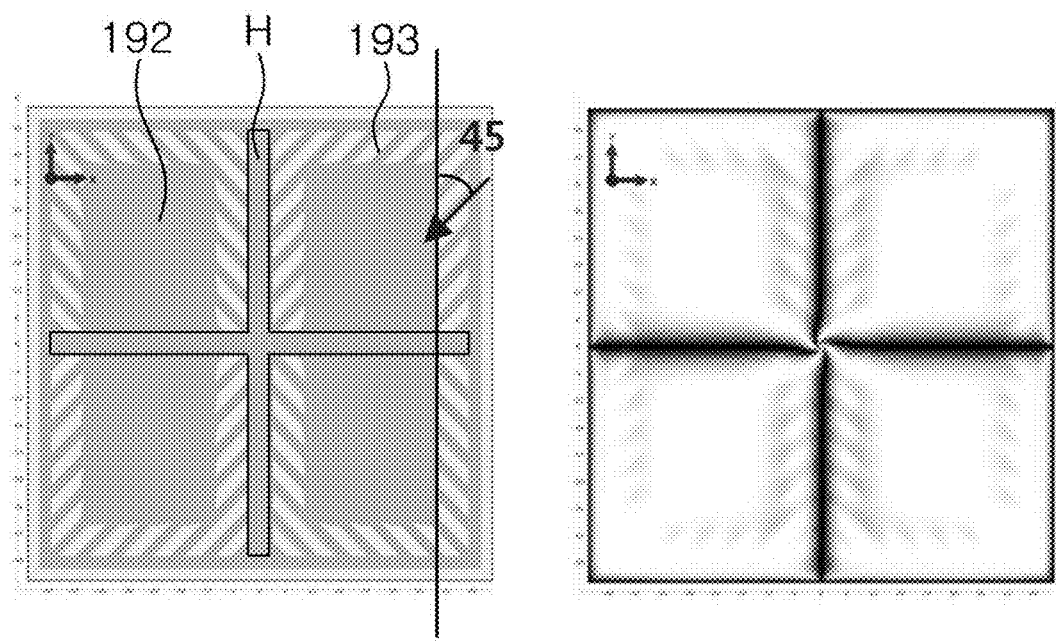

FIG. 21 shows an exemplary embodiment having the partial plate electrode having two rectangle structures in one pixel area. FIG. 21 shows a structure corresponding to the first sub-pixel electrode of FIG. 1.

The pixel electrode of the exemplary embodiment of FIG. 21 includes the partial plate electrode 192 having two rectangle structures and the minute branch electrodes 193 extending therefrom.

The pixel electrode includes the transverse extension and the longitudinal extension crossing the pixel area, and the transverse extension crossing the partial plate electrode of two rectangle structures.

The partial plate electrode 192 has two rectangle structures, and one rectangle structure is formed parallel to the longitudinal extension.

In the partial plate electrode 192, the transverse extension, the longitudinal extension, and the minute branch electrodes 193 extend and are formed in the rest of the pixel area, while forming an angle of, for example, 45 degrees with respect to one edge of the partial plate electrode.

The exemplary embodiment of FIG. 21 further includes the minute branch connection enclosing the outer part of the pixel area. The minute branch connection is formed at four edges of the pixel area. However, according to an exemplary embodiment, it may be formed at at least one edge or may not be formed at all.

The pixel according to the exemplary embodiment of FIG. 21 includes the step provider H. FIG. 21 schematically shows the step provider H providing the step to the corresponding region as one of the above-described drawings.

Referring to the transmittance of the exemplary embodiment of FIG. 21, the texture is weakly generated according to the edge of the partial plate electrode 192 of the rectangle.

Figure 22:
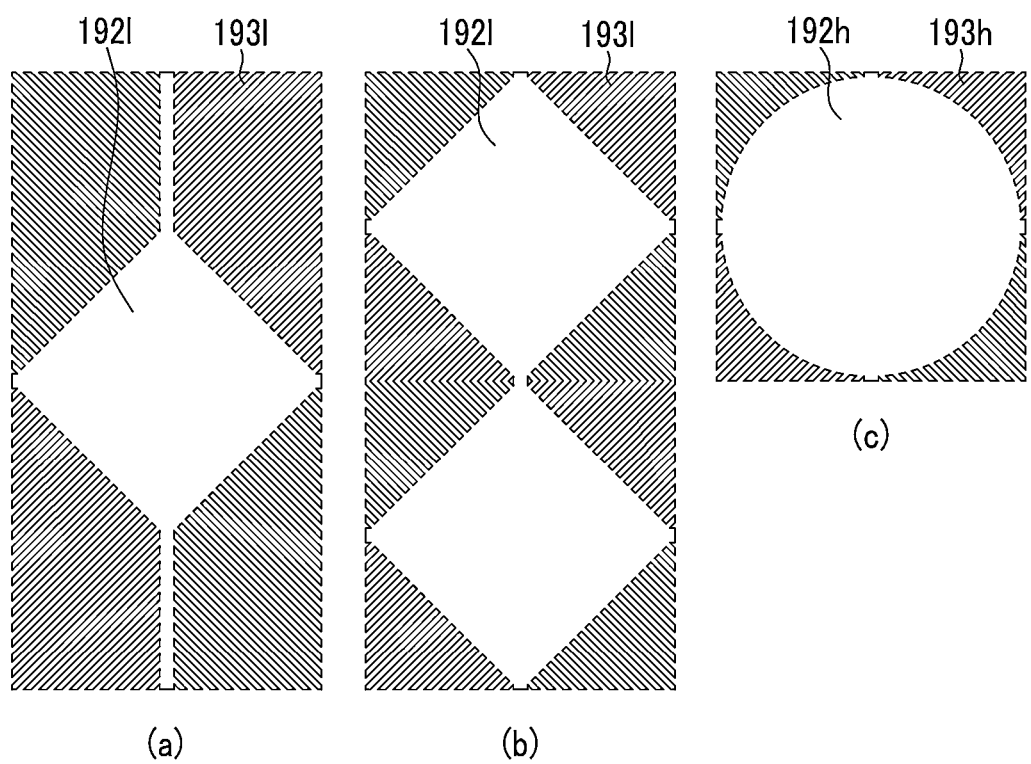

FIG. 22 shows the structure of the pixel electrode according to an exemplary embodiment of the present invention.

In FIG. 22, (a) and (b) show the structure corresponding to the second sub-pixel electrode of FIG. 1, and (c) of FIG. 22 shows the structure corresponding to the first sub-pixel electrode of FIG. 1.

Referring to (a) and (b) of FIG., (a) of FIG. 22 shows a case of forming one partial plate electrode 192l in the region of the second sub-pixel electrode, and (b) of FIG. 22 shows the structure in which two partial plate electrodes 192l are connected up and down in the region of the second sub-pixel electrode. Particularly, the second sub-pixel electrode is formed in the rectangle region, and when bisecting the rectangle region up and down, each region is a square region. In each square region, one partial plate electrode having a rhombus structure is formed.

In other regions, the longitudinal extension (referring to (a) of FIG. 22) or the is transverse extension (not shown) may be formed, and the minute branch electrodes are formed in the rest of the region.

Referring to (a) of FIG. 22, the partial plate electrode 192l contacts at least one position of the side surfaces of the second sub-pixel electrode, and two positions in (a) of FIG. 22.

In (c) of FIG. 22, the partial plate electrode 192h has a circular structure. FIG. 22 shows only the structure corresponding to the first sub-pixel electrode, however, according to an exemplary embodiment, the partial plate electrode may be formed in the second sub-pixel electrode thereby having an oval structure, like (b) of FIG. 22, where the partial plate electrode of two circuital structures may be formed. The minute branch electrodes may be formed outside of the partial plate electrode 192h of the circular structure.

Referring to (c) of FIG. 22 and the structure of the previous partial plate electrodes, the partial plate electrode according to an exemplary embodiment of the present invention may have a polygon shape such as a quadrangular shape of a rhombus, an octagonal shape, or a circular shape.

Figure 23:
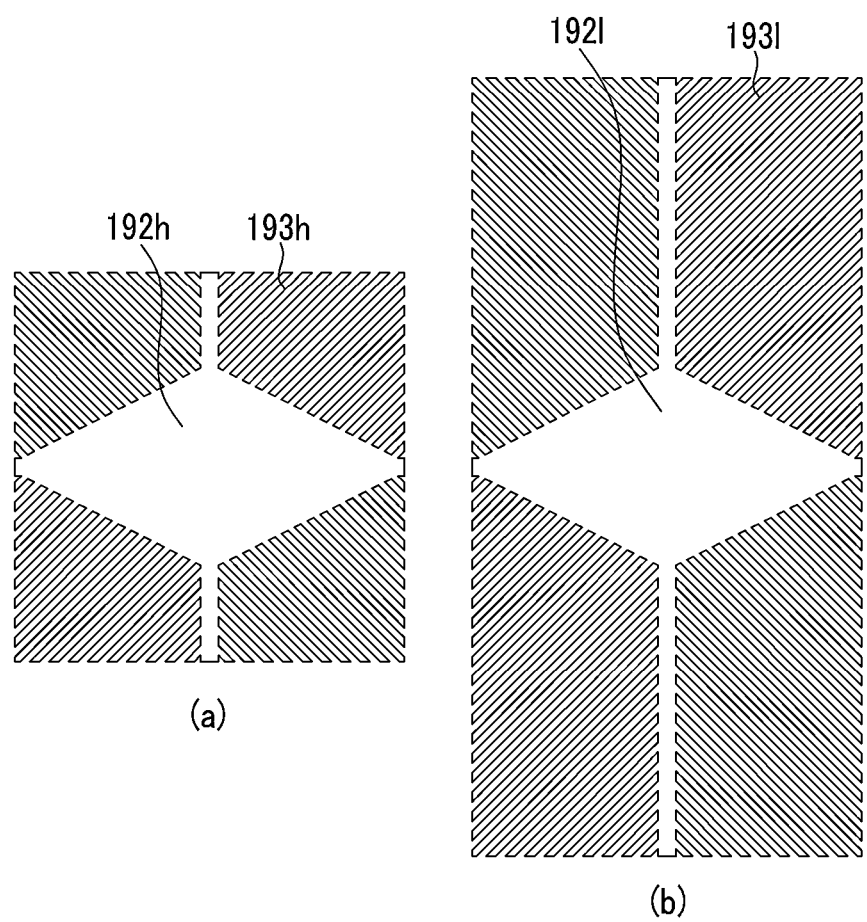
Figure 24:
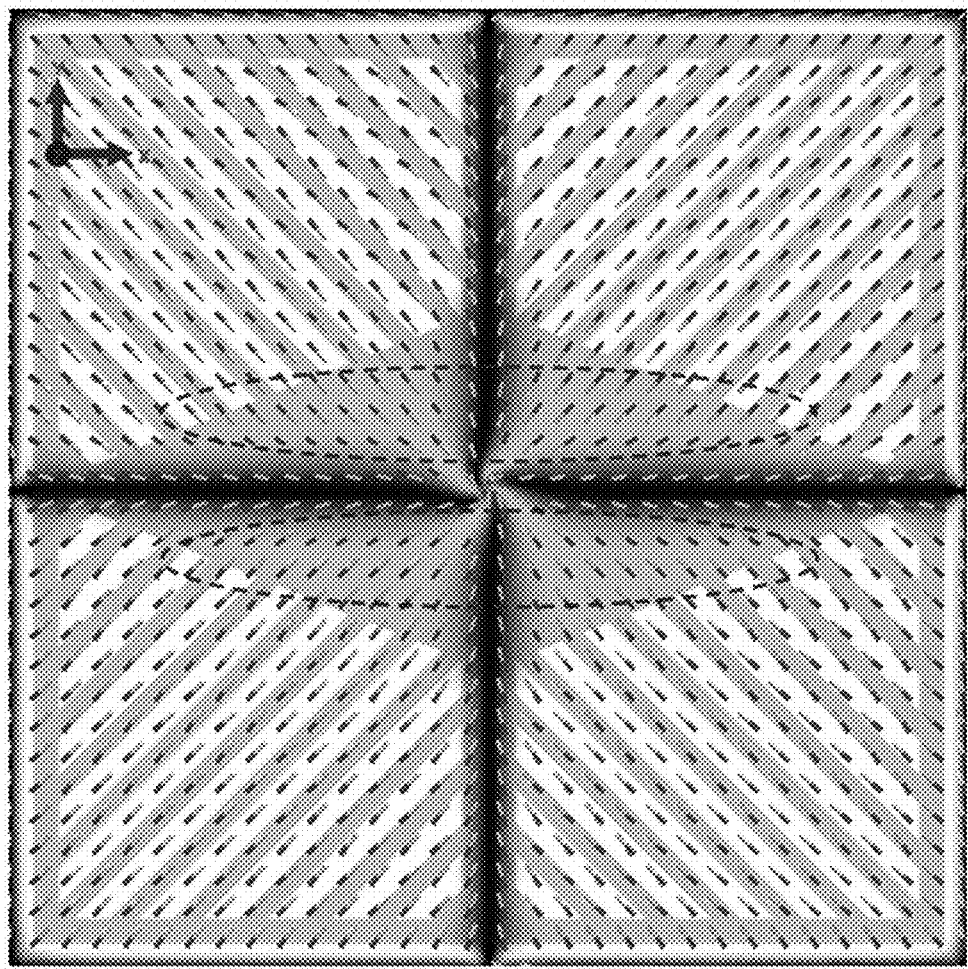

FIG. 23 and FIG. 24 show the pixel electrode structure according to an exemplary embodiment of the present invention, and the structure of the pixel electrode shown in FIG. 23 and FIG. 24 further improves the lateral visibility.

That is, the partial plate electrodes 192h and 192l shown in FIG. 23 have a structure in which the width in the horizontal direction is greater than the width in the vertical direction. In this case, a head direction of the liquid crystal molecules is slanted to the side, and as a result, the lateral visibility is improved in the direction of viewing of the head direction of the corresponding liquid crystal molecules. That is, in another exemplary embodiment, the is liquid crystal molecules are arranged in the direction of a 45 angle, however, in the exemplary embodiment of FIG. 23, the liquid crystal molecules are arranged at a smaller angle such that the viewing angle characteristic is improved in the side. Referring to FIG. 24, in the partial plate electrode structure having the large width of the horizontal direction like FIG. 23, the alignment direction of the liquid crystal molecules is shown to be arranged at an angle of less than 45 degrees. This is in reference to the region indicated by a dotted line of FIG. 24.

The above-described exemplary embodiment of the present invention is applied to various pixel structures, and representative examples applied with each pixel structure will be described with reference to FIG. 25 to FIG. 32.

First, referring to FIG. 25 and FIG. 26, a structure in which two sub-pixels are coupled by the storage capacitor Cas after receiving the data voltage from one transistor Q will be described.

Figure 25:
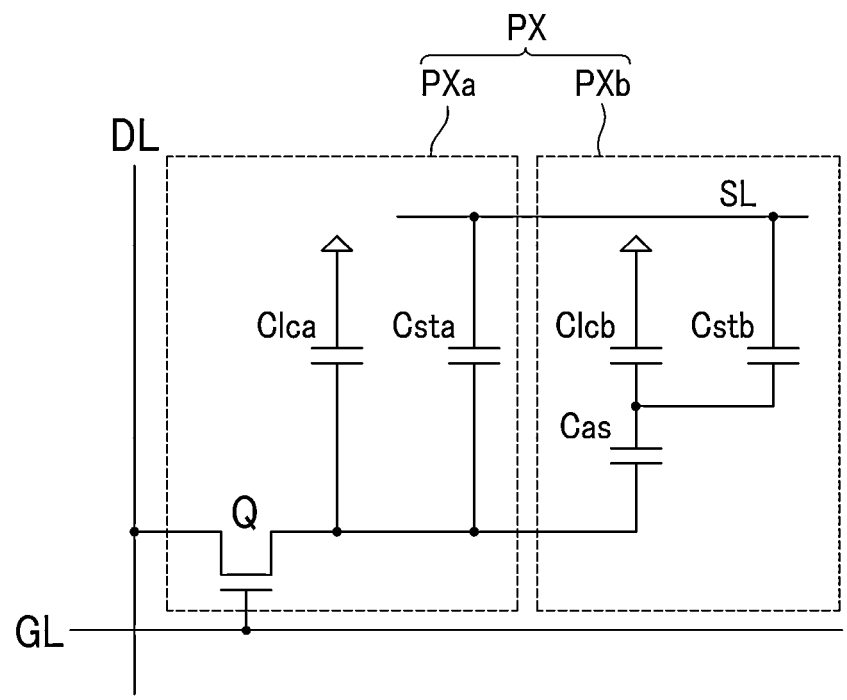
FIG. 25, FIG. 27, FIG. 29, and FIG. 31 are equivalent circuit diagrams of a liquid crystal display according to another exemplary embodiment of the present invention.
Figure 26:
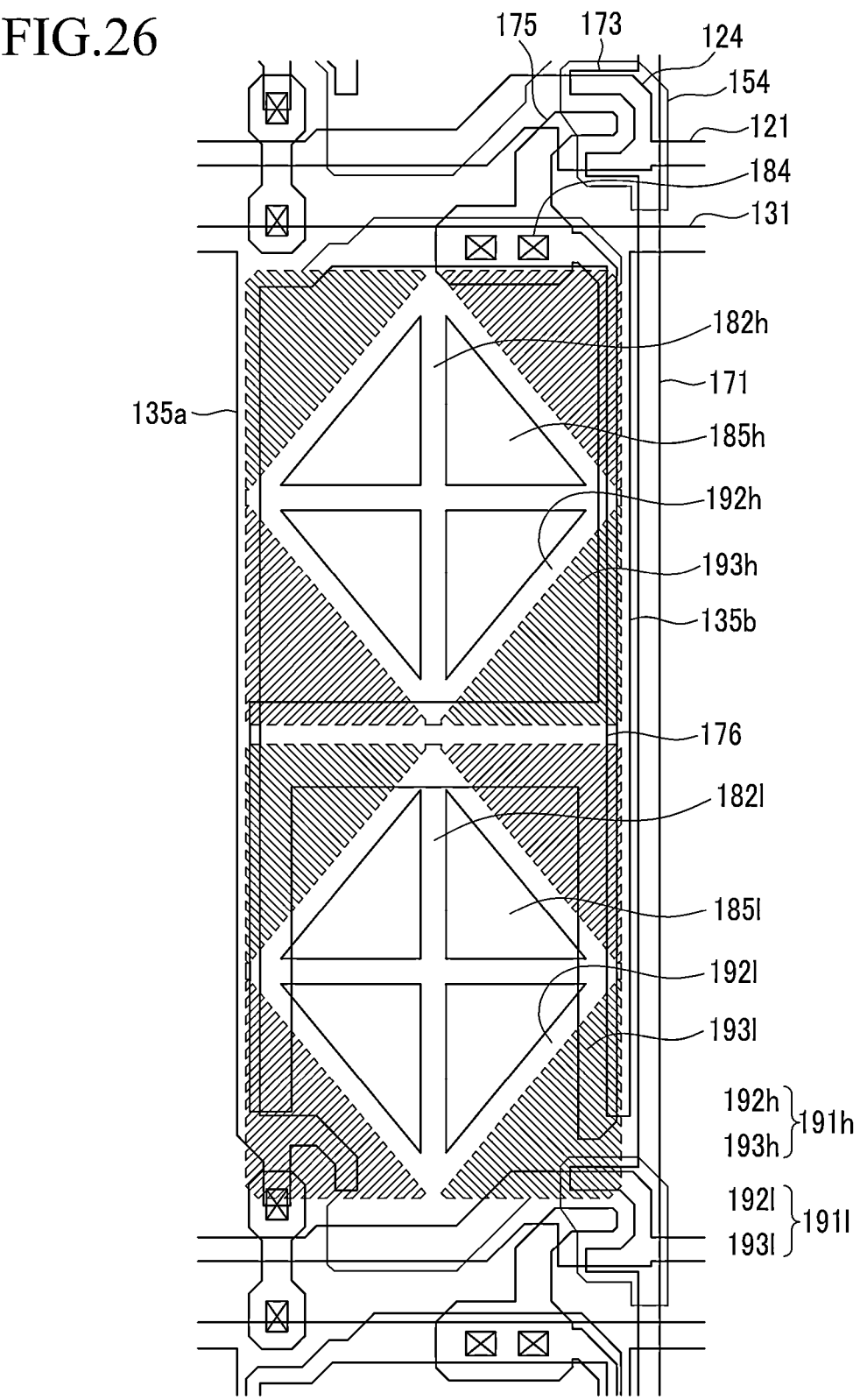
FIG. 26, FIG. 28, FIG. 30, and FIG. 32 are arrangement views of a liquid crystal display according to another exemplary embodiment of the present invention.

FIG. 25 is an equivalent circuit diagram of one pixel of a liquid crystal display according to another exemplary embodiment of the present invention, and FIG. 26 is a layout view of a lower panel of a liquid crystal display according to another exemplary embodiment of the present invention.

The liquid crystal display according to an exemplary embodiment of the present invention includes signal lines including a plurality of gate lines GL, a plurality of data lines DL, and a plurality of storage voltage lines SL and a plurality of pixels PX connected thereto. Each pixel PX includes a pair of a first sub-pixel PXa and a second sub-pixel PXb, wherein the first sub-pixel PXa includes the first sub-pixel electrode (191h of FIG. 26), and the second sub-pixel PXb includes the second sub-pixel electrode (191l of FIG. 26).

The liquid crystal display according to an exemplary embodiment of the present is invention further includes the switching element Q connected to the gate line GL and the data line DL, the first liquid crystal capacitor Clca and the first storage capacitor Csta that are connected to the switching element Q and formed in the first sub-pixel PXa, the second liquid crystal capacitor Clcb and the second storage capacitor Cstb that are connected to the switching element Q and formed in the second sub-pixel PXb, and an assistance capacitor Cas formed between the switching element Q and the second liquid crystal capacitor Clcb.

The switching element Q is a three-terminal element, such as a thin film transistor, disposed at the lower panel 100. The switching element Q includes a control terminal connected to a gate line (GL), an input terminal connected to a data line (DL), and an output terminal connected to the first liquid crystal capacitor Clca, the storage capacitor Csta, and the assistance capacitor Cas.

One terminal of the assistance capacitor Cas is connected to the output terminal of the switching element Q, and the other terminal is connected to the second liquid crystal capacitor Clcb and the second storage capacitor Cstb.

The charging voltage of the second liquid crystal capacitor Clcb is lower than the charging voltage of the first liquid crystal capacitor Clca by the assistance capacitor Cas such that the lateral visibility of the liquid crystal display may be improved.

In the structure of the liquid crystal display according to an exemplary embodiment of the present invention, as shown in FIG. 26, a plurality of gate conductors including a plurality of gate lines 121 and a plurality of storage voltage lines 131 are formed on the insulation substrate (not shown) made of transparent glass or plastic.

The gate line 121 transmits gate signals and extends in a substantially horizontal direction. Each gate line 121 includes a plurality of gate electrodes 124 protruding upward.

The storage electrode line 131 receives a predetermined voltage, and may extend parallel to the gate line 121. Each storage voltage line 131 is positioned between two adjacent gate lines 121. The storage voltage line 131 includes the storage electrodes 135a and 135b extending downward. However, the shape and the arrangement of the storage voltage lines 131 and the storage electrodes 135a and 135b may be variously changed.

The gate insulating layer (not shown) is formed on the gate conductors 121 and 131. A semiconductor island 154 is formed on the gate insulating layer. The semiconductor island 154 is positioned on the gate electrode 124.

The data conductor including a plurality of data lines 171 and drain electrodes 175 is formed on the semiconductor 154 and the gate insulating layer.

The data lines 171 transmit the data signals and extend in the vertical direction thereby intersecting the gate lines 121 and the storage voltage lines 131. Each data line 171 includes a source electrode 173 which extends toward the gate electrode 124.

The drain electrode 175 is separated from the data line 171 and includes a bar-shaped end facing the source electrode 173 with respect to the gate electrode 124. The bar-shaped end is partially surrounded by the source electrode 173 which is curved.

The other end of the drain electrode 175 substantially extends parallel to the data line 171 thereby being formed through the first sub-pixel PXa and the second sub-pixel PXb, and the portion formed in the second sub-pixel PXb is referred to as an auxiliary electrode 176.

The passivation layer (not shown) is formed on the data conductors 171 and 175 and the semiconductor 154. The passivation layer may be made of an insulator and has a flat surface. The step provider providing the step to the overlying layer is formed in the passivation layer of the insulator, and in FIG. 26, the step providing grooves 185h and 185l and the cross-shaped protrusions 182h and 182l positioned between the step providing grooves 185h and 185l are the step provider. As shown in FIG. 26, the step providing grooves 185h and 185l have a right triangle structure and are symmetrical to each other in a diagonal direction. As a result, the passivation layer 180 includes the cross-shaped protrusions 182h and 182l.

The color filter may be formed under the passivation layer.

A plurality of pixel electrodes 191 are formed on the passivation layer. Each pixel electrode 191 includes the first sub-pixel electrode 191h and the second sub-pixel electrode 191l formed at predetermined intervals.

The first sub-pixel electrode 191h and the second sub-pixel electrode 191l respectively include partial plate electrodes 192h and 192l positioned at a center thereof, and a plurality of minute branch electrodes 193h and 193l protruding from the partial plate electrodes 192h and 192l in an oblique direction.

The first sub-pixel electrode 191h includes the first partial plate electrode 192h and a plurality of first minute branch electrodes 193h, and is connected to the wide end of the drain electrode 175 outside the square region.

The first partial plate electrode 192h has a rhombus shape, and each vertex of the rhombus meets the boundary of the square region. The first partial plate electrode 192h covers the first step providing groove 185h and the first cross-shaped protrusion 182h of the passivation layer. As a result, the first partial plate electrode 192h has the step provided by the first step providing groove 185h of the passivation layer 180 and the first cross-shaped protrusion 182h. Here, the first cross-shaped protrusion 182h provides the pretilt to the liquid crystal molecules positioned at the center of the square region, thereby having a function of controlling an arrangement direction of the liquid crystal molecules, and as a result, texture is reduced. A is plurality of first minute branch electrodes 193h extend in the edge of the oblique direction of the first partial plate electrodes 192h. A plurality of first minute branch electrodes 193h form an angle of 45 degrees with respect to the gate line 121 or the data line 171, and form an angle of 90 degrees with respect to the edge of the oblique direction of the first partial plate electrode 192h.

The second sub-pixel electrode 191l includes the second partial plate electrode 192l and a plurality of second minute branch electrodes 193l, and overlaps the auxiliary electrode 176 thereby forming the assistance capacitor Cas.

The second partial plate electrode 192l has a rhombus shape connecting each edge of the rectangle region. As a result, each of the vertices of the rhombus meets the boundary of the rectangle region. The second partial plate electrode 192l covers the second step providing groove 185l of the passivation layer and the second cross-type protrusion 182l. As a result, the second partial plate electrode 192l has the step provided by the second step providing groove 185l of the passivation layer and the second cross-type protrusion 182l. A plurality of second minute branch electrodes 193l extend from the edge of the oblique direction of the second partial plate electrode 192l. A plurality of second minute branch electrodes 193l fill the rest of the region of the rectangle region, form an angle of 45 degrees with respect to the gate line 121 or the data line 171, and form an angle of 90±15 degrees with respect to the edge of the oblique direction of the second partial plate electrode 192l.

The first and second sub-pixel electrodes 191h and 191l form the first and second liquid crystal capacitors along with the common electrode of the upper panel and the liquid crystal layer therebetween to maintain the applied voltage after the thin film transistor (Q of FIG. 25) is turned off.

The first and second sub-pixel electrodes 191h and 191l overlap the storage is electrodes 135a and 135b to form the first and second storage capacitors Csta and Cstb, thereby reinforcing the voltage storage capacity of the first and second liquid crystal capacitors Clca and Clcb.

In the first exemplary embodiment, the auxiliary electrode 176 extends from the drain electrode 175, but the present invention is not limited thereto, and the auxiliary electrode 176 may be separated from the drain electrode 175. At this time, the passivation layer includes a contact hole formed on the first sub-pixel electrode 191h, and the auxiliary electrode 176 may be connected to the first sub-pixel electrode 191h through the contact hole and may overlap the second sub-pixel electrode 191l.

Hereinafter, referring to FIG. 27 and FIG. 28, after two sub-pixels respectively receive the same data voltage from the transistors Qa and Qb, the charge of the second sub-pixel electrode (191l of FIG. 28) flows to the assistance capacitor Cas of the third switching element Qc such that the voltage of the second liquid crystal capacitor Clcb is decreased.

The liquid crystal display according to an exemplary embodiment of the present invention will be described with reference to FIG. 27 and FIG. 28.

Figure 27:
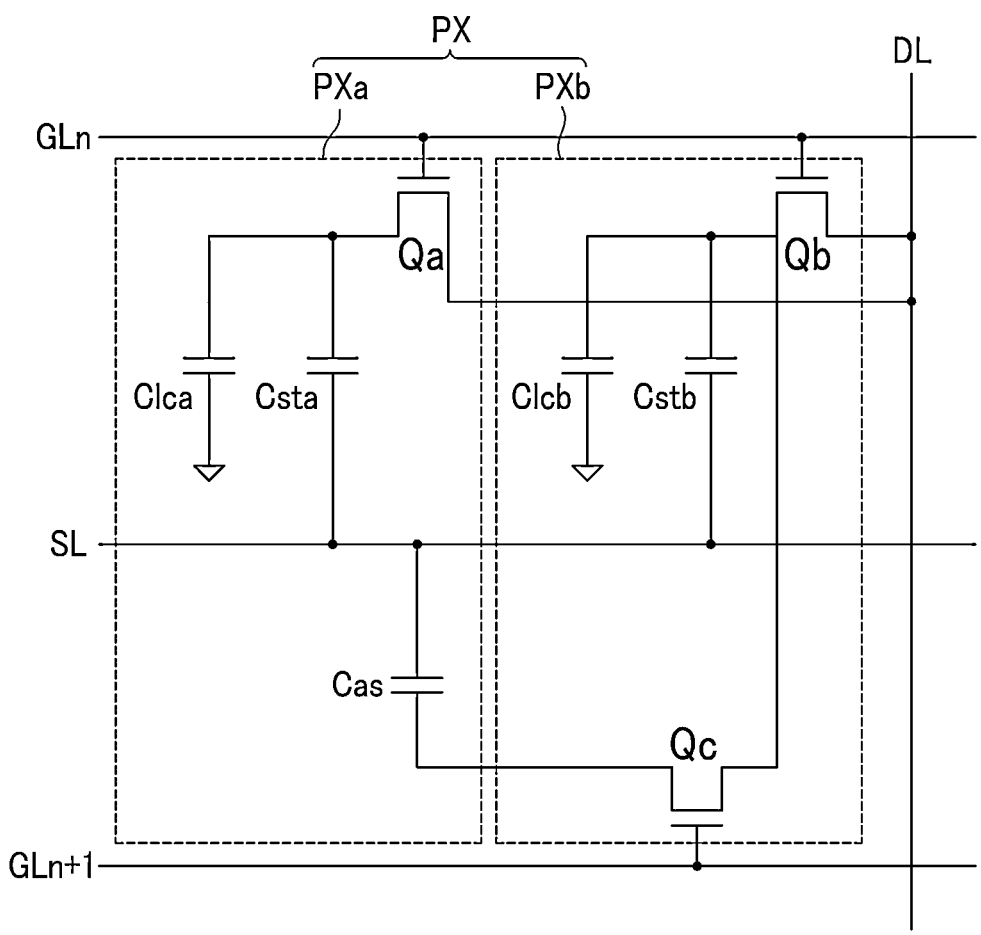
Figure 28:
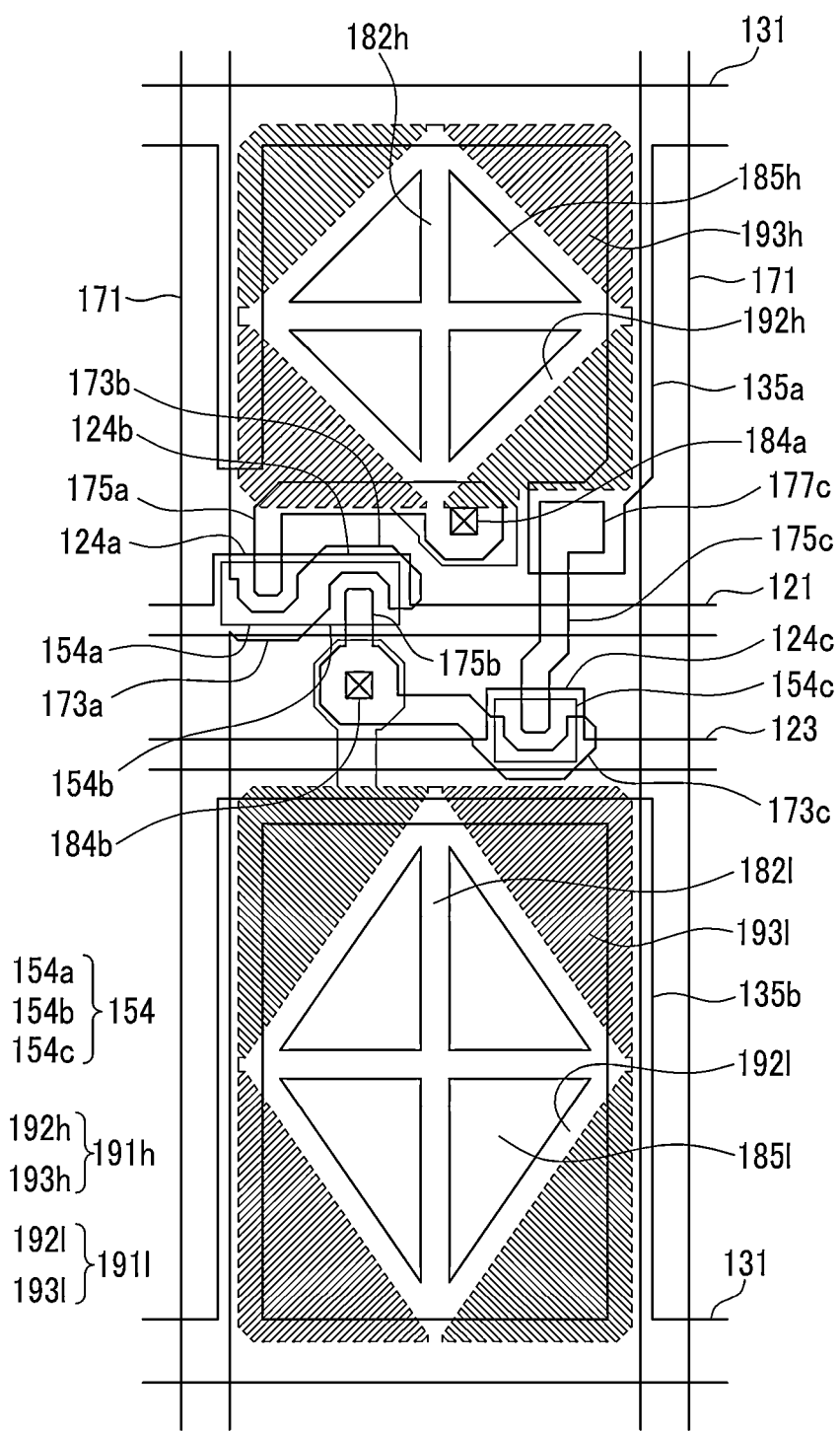

FIG. 27 is an equivalent circuit diagram of one pixel of a liquid crystal display according to an exemplary embodiment of the present invention, and FIG. 28 is a layout view of a lower panel of a liquid crystal display according to an exemplary embodiment of the present invention.

The liquid crystal display according to an exemplary embodiment of the present invention includes the signal lines including a plurality of gate lines GLn and GLn+1, a plurality of data lines DL, and a plurality of storage voltage lines SL, with a plurality of pixels PX connected thereto. Each pixel PX includes a pair of the first and second sub-pixels PXa and PXb, and the first sub-pixel PXa includes the first sub-pixel electrode (191h of FIG. 28) while the second sub-pixel PXb includes the second sub-pixel electrode (191l FIG. 28).

The liquid crystal display according to an exemplary embodiment of the present invention further includes the first switching element Qa and the second switching element Qb connected to the gate line GLn and the data line DL, the first liquid crystal capacitor Clca and the first storage capacitor Csta connected to the first switching element Qa and formed in the first sub-pixel PXa, the second liquid crystal capacitor Clcb and the second storage capacitor Cstb connected to the second switching element Qb and formed in the second sub-pixel PXb, the third switching element Qc connected to the second switching element Qb and switched by the gate line GLn+1 of the next stage, and the assistance capacitor Cas connected to the third switching element Qc.

The first and second switching elements Qa and Qb, as three-terminal elements such as a thin film transistor, etc., and provided on a lower display panel 100, include control terminals thereof connected to the gate line GLn, input terminals thereof connected to the data line DL, and output terminals thereof connected to the first liquid crystal capacitor Clca and the first storage capacitor Csta, and the second liquid crystal capacitor Clcb and the second storage capacitor Cstb, respectively.

The third switching element Qc, which is also a 3-terminal element such as a thin film transistor and the like provided on the lower display panel 100, includes a control terminal connected to the subsequent gate line GLn+1, an input terminal connected to the second liquid crystal capacitor Clcb, and an output terminal connected to the auxiliary capacitor Cas.

One terminal of the auxiliary capacitor Cas is connected to the output terminal of the third switching element Qc and the other terminal is connected to the storage electrode line SL.

Hereinafter, an operation of the liquid crystal display according to the exemplary embodiment of the present invention will be described. When the gate-on voltage is applied to the gate line GLn, the first and second switching elements Qa and Qb that are connected thereto are turned on and the data voltage of the data line 171 is applied to the first and second sub-pixel electrodes (191h and 191l of FIG. 28).

Subsequently, when a gate-off voltage is applied to the gate line GLn and the gate-on voltage is applied to the subsequent gate line GLn+1, the first and second switching elements Qa and Qb are turned off and the third switching element Qc is turned on. As a result, electrical charges of the second sub-pixel electrode (191l of FIG. 28) connected to the output terminal of the second switching element Qb flow into the auxiliary capacitor Cas to reduce the voltage of the second liquid crystal capacitor Clcb.

As described above, the charged voltages of the first and second liquid crystal capacitors Clca and Clcb are different from each other to improve the lateral visibility of the liquid crystal display.

In the structure of the liquid crystal display according to the second exemplary embodiment of the present invention, a plurality of gate conductors including a plurality of first gate lines 121, a plurality of second gate lines 123, and a plurality of storage electrodes lines 131 are formed on an insulation substrate (not shown) which is made of transparent glass or plastic, as shown in FIG. 28.

The first gate line 121 and the second gate line 123 extend primarily in the transverse direction and transfer the gate signal. The first gate line 121 includes the first gate electrode 124a and the second gate electrode 124b that protrude upwards. The second gate line 123 includes the third gate electrode 124c that protrudes upwards. The first gate electrode 124a and the second gate electrode 124b are connected to each other to form one protrusion.

The storage electrode line 131 extends primarily in the transverse direction and transfers the predetermined voltage, such as the common voltage, or the like. The storage electrode line 131 includes storage electrodes 135a and 135b that extend up and down. In this case, the shapes and layouts of the storage electrode line 131 and the storage electrodes 137a and 137b may be variously changed.

A gate insulating layer (not shown) is formed on the gate conductors 121, 123, and 131.

A plurality of semiconductor islands 154 are formed on the gate insulating layer 140. The semiconductor islands 154 include a first semiconductor 154a disposed on the first gate electrode 124a, a semiconductor 154b disposed on the second gate electrode 124b, and a third semiconductor 154c disposed on the third gate electrode 124c. The first semiconductor 154a and the second semiconductor 154b may be connected to each other.

A data conductor including a plurality of data lines 171, a first drain electrode 175a, a second drain electrode 175b, a third source electrode 173c, and a third drain electrode 175c is formed on the semiconductor 154 and the gate insulating layer 140.

The data lines 171 transfer the data signals and extend primarily in the longitudinal direction, thereby crossing the first gate line 121 and the second gate line 123. Each data line 171 includes the first source electrode 173a and the second source electrode 173b that extend toward the first gate electrode 124a and the second gate electrode 124b. The first source electrode 173a and the second source electrode 173b are connected to each other.

Each of the first drain electrode 175a, the second drain electrode 175b, and the is third drain electrode 175c includes one wide end portion and the other rod-shaped end portion. The rod-shaped end portions of the first drain electrode 175a and the second drain electrode 175b are partially surrounded by the first source electrode 173a and the second source electrode 173b, respectively. The third drain electrode 175c is also partially surrounded by the third source electrode 173c. The wide one end portion of the second drain electrode 175b is connected to the third source electrode 173c. A wide end portion 177c of the third drain electrode 175c is partially overlapped with an extension portion 137a of the storage electrode line 131 to form an auxiliary capacitor Cas.

The first/second/third gate electrode 124a/124b/124c, the first/second/third source electrode 173a/173b/173c, and the first/second/third drain electrode 175a/175b/175c form one first/second/third thin film transistor (TFT) (Qa/Qb/Qc of FIG. 4) together with the first/second/third semiconductor 154a/154b/154c. The channel of the thin film transistor is formed in each semiconductor 154a/154b/154c between each source electrode 173a/173b/173c and each drain electrode 175a/175b/175c.

The passivation layer (not shown) is formed on the data conductors 171, 175a, 175b, and 175c and exposed portions of the semiconductors 154a, 154b, and 154c. The passivation layer is made of the insulator and has a flat surface. The step provider providing the step to the overlying layer is formed in the passivation layer of the insulator, and in FIG. 26, the step providing grooves 185h and 185l and the cross-shaped protrusions 182h and 182l positioned between the step providing grooves 185h and 185l are the step provider. As shown in FIG. 28, the step providing grooves 185h and 185l have a right triangle structure and are symmetrical to each other in a diagonal direction. As a result, the passivation layer includes the cross-shaped protrusions 182h and 182l. The passivation layer includes a plurality of contact holes 184a and 184b respectively exposing the wide ends of the first drain electrode 175a and the second drain electrode 175b.

The color filter may be formed under the passivation layer.

A plurality of pixel electrodes 191 are formed on the passivation layer. Each pixel electrode 191 includes the first sub-pixel electrode 191h and the second sub-pixel electrode 191l formed at predetermined intervals.

The first sub-pixel electrode 191h and the second sub-pixel electrode 191l respectively include partial plate electrodes 192h and 192l positioned at a center thereof, and a plurality of minute branch electrodes 193h and 193l protruding from the partial plate electrode 192h and 192l in an oblique direction.

The first sub-pixel electrode 191h includes the first partial plate electrode 192h and a plurality of first minute branch electrodes 193h, and is connected to the wide end of the drain electrode 175a outside the region where the first sub-pixel electrode 191h is formed.

The first partial plate electrode 192h has a rhombus shape, and each vertex of the rhombus meets the boundary of the square region. The first partial plate electrode 192h covers the first step providing groove 185h and the first cross-shaped protrusion 182h of the passivation layer. As a result, the first partial plate electrode 192h has the step provided by the first step providing groove 185h of the passivation layer 180 and the first cross-shaped protrusion 182h. Here, the first cross-shaped protrusion 182h provides the pretilt to the liquid crystal molecules positioned at the center of the square region thereby controls an arrangement direction of the liquid crystal molecules and, as a result, texture is reduced. A plurality of first minute branch electrodes 193h extend in the edge of the oblique direction of the first partial plate electrode 192h. The plurality of first minute branch electrodes 193h form an angle of 45 degrees with is respect to the gate lines 121 or the data lines 171, and form an angle of 90 degrees with respect to the edge of the oblique direction of the first partial plate electrode 192h.

The second sub-pixel electrode 191l includes the second partial plate electrode 192l and a plurality of second minute branch electrodes 193l, and is connected to the wide end of the second drain electrode 175b outside the region where the second sub-pixel electrode is formed.

The second partial plate electrode 192l has a rhombus shape connecting each edge of the rectangle region. As a result, each of the vertices of the rhombus meets the boundary of the rectangle region. The second partial plate electrode 192l covers the second step providing groove 185l of the passivation layer and the second cross-shaped protrusion 182l. As a result, the second partial plate electrode 192l has the step provided by the second step providing groove 185l of the passivation layer and the second cross-shaped protrusion 182l. A plurality of second minute branch electrodes 193l extend from the edge of the oblique direction of the second partial plate electrode 192l. A plurality of second minute branch electrodes 193l fill the rest of the region of the rectangle region, form an angle of 45 degrees with respect to the gate lines 121 or the data lines 171, and form an angle of 90±15 degrees with respect to the edge of the oblique direction of the second partial plate electrode 192l.

The first and second sub-pixel electrodes 191h and 191l form the first and second liquid crystal capacitors (Clca and Clcb of FIG. 27) along with the common electrode of the upper panel and the liquid crystal layer therebetween to maintain the applied voltage after the thin film transistors (Qa and Qb of FIG. 27) are turned off.

The first and second sub-pixel electrodes 191h and 191l overlap the storage electrodes 135a and 135b to form the first and second storage capacitors Csta and Cstb, thereby is reinforcing the voltage storage capacity of the first and second liquid crystal capacitors Clca and Clcb.

Hereinafter, referring to FIG. 29 and FIG. 30, a structure in which different data voltages from the transistors Qa and Qb are respectively applied to two sub-pixels will be described.

Figure 29:
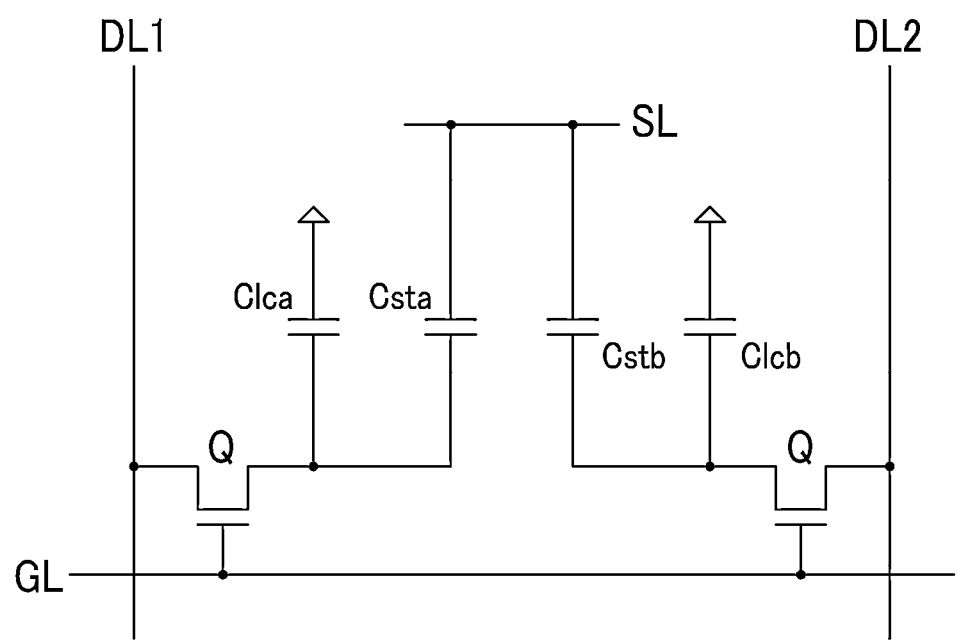
Figure 30:
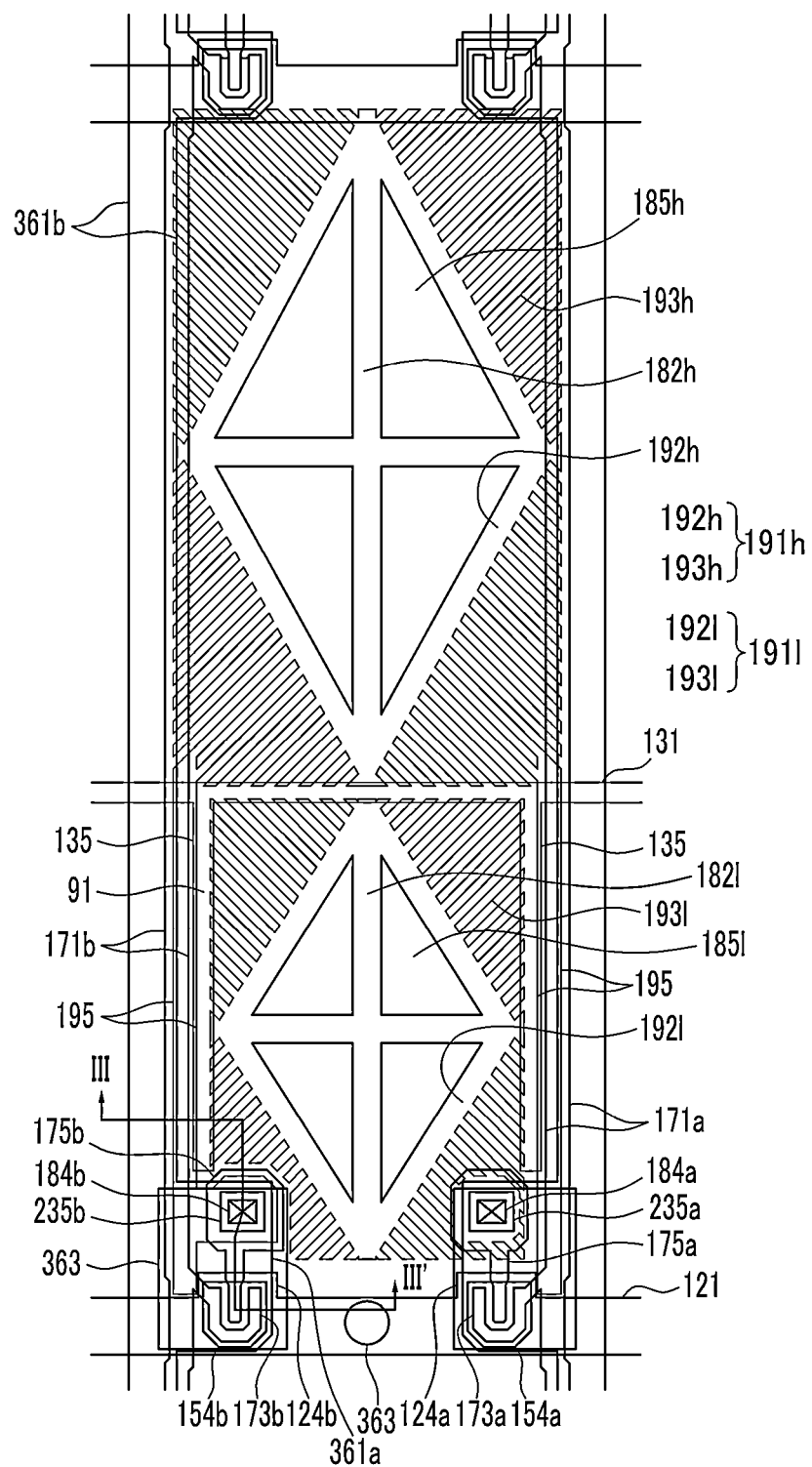

FIG. 29 is an equivalent circuit diagram of one pixel of a liquid crystal display according to an exemplary embodiment of the present invention, and FIG. 30 is a layout view of a lower panel of a liquid crystal display according to an exemplary embodiment of the present invention.

Referring to FIG. 29 and FIG. 30, the liquid crystal display according to an exemplary embodiment of the present invention includes the lower panel 100 and the upper panel 200 facing each other, and the liquid crystal layer 3 disposed between the two panels 100 and 200.

First, the lower panel 100 will be described.

A plurality of gate lines 121 and a plurality of storage voltage lines 131 and 135 are formed on the insulation substrate 110.

The gate lines 121 transmit gate signals, and proceed roughly in the transverse direction. The gate lines 121 each include a plurality of first and second gate electrodes 124a and 124b protruded upward.

The storage electrode lines include stems 131 extending substantially parallel to the gate lines 121, and a plurality of storage electrodes 135 protrude from the stems 131.

The shape and disposition of the storage electrode lines 131 and 135 may be altered in various ways.

A gate insulating layer 140 is formed on the gate lines 121 and the storage electrode lines 131 and 135, and a plurality of semiconductors 154a and 154b are formed on the gate insulating layer 140 with amorphous silicon or crystalline silicon.

A plurality of pairs of ohmic contacts (not shown) are formed on the semiconductors 154a and 154b, respectively. The ohmic contacts (not shown) may be formed with silicide, or with n+ hydrogenated amorphous silicon in which n-type impurities are doped at a high concentration.

A plurality of pairs of data lines 171a and 171b and a plurality of pairs of first and second drain electrodes 175a and 175b are formed on the ohmic contacts (not shown) and the gate insulating layer 140.

The data lines 171a and 171b transmit data signals, and proceed roughly in the vertical direction such that they cross the gate lines 121 and the stems 131 of the storage electrode lines. The data lines 171a and 171b include first and second source electrodes 173a and 173b bent toward the first and second gate electrode 124a and 124b in the shape of a letter U. The first and second source electrodes 173a and 173b face the first and second drain electrodes 175a and 175b around the first and second gate electrodes 124a and 124b.

The first and second drain electrodes 175a and 175b include one-side end portions partially surrounded by the first and second source electrodes 173a and 173b, body portions extended upwardly from the former end portions, and opposite-side wide end portions to be connected with other layers.

The shape and disposition of the data lines 171a and 171b including the first and second drain electrodes 175a and 175b may be altered in various manners.

The first and second gate electrodes 124a and 124b, the first and second source is electrodes 173a and 173b, and the first and second drain electrodes 175a and 175b form first and second thin film transistors (TFT) Qa and Qb together with the first and second semiconductors 154a and 154b, and the channels of the first and second thin film transistors Qa and Qb are formed at the first and second semiconductors 154a and 154b between the first and second source electrodes 173a and 173b and the first and second drain electrodes 175a and 175b.

The ohmic contacts exist only between the underlying semiconductors 154a and 154b and the overlying data lines 171a and 171b and drain electrodes 175a and 175b so as to lower the contact resistance therebetween. The semiconductors 154a and 154b have exposed portions not covered by the data lines 171a and 171b and the drain electrodes 175a and 175b, including a portion thereof between the source electrodes 173a and 173b and the drain electrodes 175a and 175b.

The passivation layer is formed on the data lines 171a and 171b, the drain electrodes 175a and 175b, and the exposed semiconductors 154a and 154b. The passivation layer is made of an insulator and has a flat surface. The step provider providing the step to the overlying layer is formed in the passivation layer of the insulator, and in FIG. 26, the step providing grooves 185h and 185l and the cross-shaped protrusions 182h and 182l positioned between the step providing grooves 185h and 185l are the step provider. As shown in FIG. 28, the step providing grooves 185h and 185l have a right triangle structure and are symmetrical to each other in a diagonal direction. As a result, the passivation layer includes the cross-shaped protrusions 182h and 182l.

The color filters may be formed under the passivation layer.

A plurality of pixel electrodes 191 are formed on the passivation layer. Each pixel electrode 191 includes the first sub-pixel electrode 191h and the second sub-pixel electrode 191l formed at predetermined intervals.

The first sub-pixel electrode 191h and the second sub-pixel electrode 191l respectively include partial plate electrodes 192h and 192l positioned at a center thereof and a plurality of minute branch electrodes 193h and 193l protruding from the partial plate electrode 192h and 192l in an oblique direction.

The first sub-pixel electrode 191h includes the first partial plate electrode 192h and a plurality of first minute branch electrodes 193h, and is connected to the drain electrode 175a outside the region where the first sub-pixel electrode 191h is formed.

The first partial plate electrode 192h has a rhombus shape, and each vertex of the rhombus meets the boundary of the square region. The first partial plate electrode 192h covers the first step providing groove 185h and the first cross-shaped protrusion 182h of the passivation layer. As a result, the first partial plate electrode 192h has the step provided by the first step providing groove 185h of the passivation layer 180 and the first cross-shaped protrusion 182h. Here, the first cross-shaped protrusion 182h provides the pretilt to the liquid crystal molecules positioned at the center of the square region, thereby controlling an arrangement direction of the liquid crystal molecules and, as a result, texture is reduced. A plurality of first minute branch electrodes 193h extend in the edge of the oblique direction of the first partial plate electrode 192h. The plurality of first minute branch electrodes 193h form an angle of 45 degrees with respect to the gate lines 121 or the data lines 171, and form an angle of 90 degrees with respect to the edge of the oblique direction of the first partial plate electrode 192h.

The second sub-pixel electrode 191l includes the second partial plate electrode 192l and a plurality of second minute branch electrodes 193l, and is connected to the second drain electrode 175b outside the region where the second sub-pixel electrode is formed.

The second partial plate electrode 192l has a rhombus shape connecting each edge of the rectangle region. As a result, each of the vertices of the rhombus meets the boundary of the rectangle region. The second partial plate electrode 192l covers the second step providing groove 185l of the passivation layer and the second cross-shaped protrusion 182l. As a result, the second partial plate electrode 192l has the step provided by the second step providing groove 185l of the passivation layer and the second cross-shaped protrusion 182l. A plurality of second minute branch electrodes 193l extend from the edge of the oblique direction of the second partial plate electrode 192l. A plurality of second minute branch electrodes 193l fill the rest of the rectangle region, form an angle of 45 degrees with respect to the gate lines 121 or the data lines 171, and form an angle of 90±15 degrees with respect to the edge of the oblique direction of the second partial plate electrode 192l.

The first and second sub-pixel electrodes 191h and 191l form the first and second liquid crystal capacitors along with the common electrode of the upper panel and the liquid crystal layer therebetween to maintain the applied voltage after the thin film transistors (Q of FIG. 29) are turned off.

The first and second sub-pixel electrodes 191h and 191l overlap the storage electrodes 135a and 135b to form the first and second storage capacitors Csta and Cstb, thereby reinforcing the voltage storage capacity of the first and second liquid crystal capacitors Clca and Clcb.

Hereinafter, referring to FIG. 31 and FIG. 32, a structure in which, after two sub-pixels receive the same data voltage from the transistors Qa and Qb and then a gray scale displayed in each sub-pixel is changed by the capacitors Csa and Csb connected to a power source line to swing the voltage, will be described.

Figure 31:
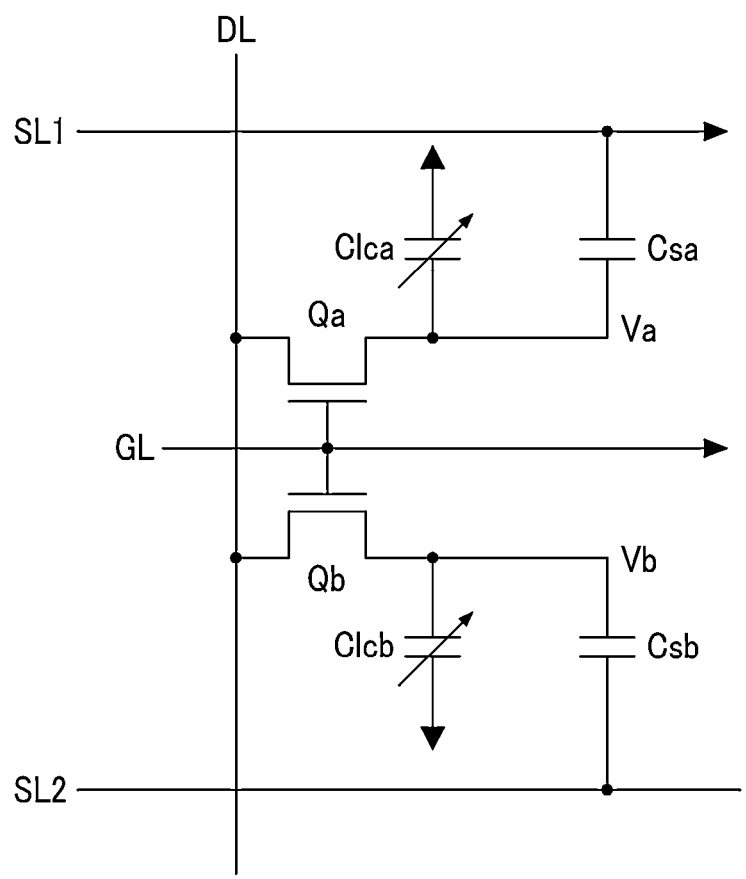
Figure 32:
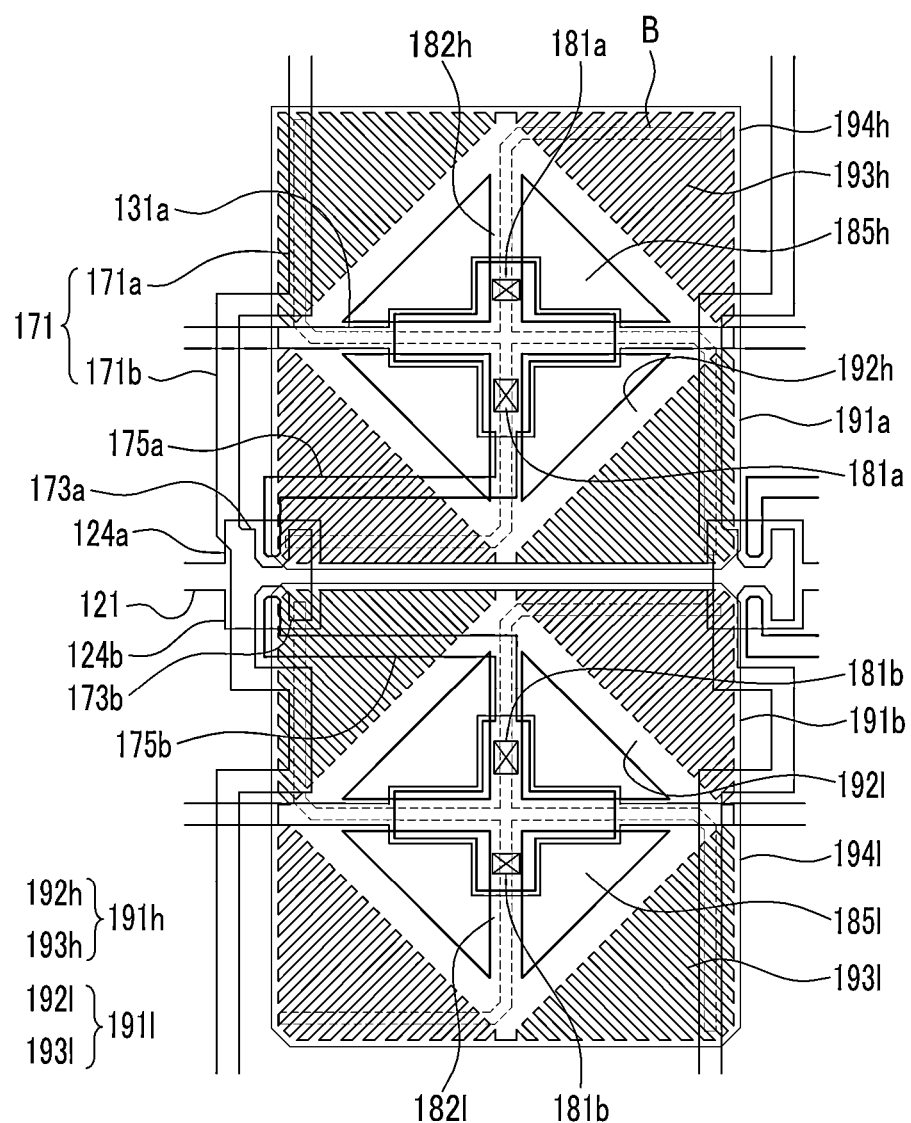

FIG. 31 is an equivalent circuit diagram of one pixel of a liquid crystal display according to an exemplary embodiment of the present invention, and FIG. 32 is a layout view of a lower panel of a liquid crystal display according to an exemplary embodiment of the present invention.

As shown in FIG. 31, the liquid crystal display according to an exemplary embodiment of the present invention includes the gate line GL, the data line DL, the first power line SL1, the second power line SL2, and the first switching element Qa and the second switching element Qb connected to the gate line GL and the data line DL.

The liquid crystal display according to an exemplary embodiment of the present invention further includes the assistance step-up capacitor Csa and the first liquid crystal capacitor Clca connected to the first switching element Qa, and the assistance step-down capacitor Csb and the second liquid crystal capacitor Clcb connected to the second switching element Qb.

The first switching element Qa and the second switching element Qb are made of a three terminal element, such as a thin film transistor. The first switching element Qa and the second switching element Qb are connected to the same gate line GL and the same data line DL to be turned on such that the same data signals are output at the same time.

A voltage that swings with a constant period is applied to the first power line SL1 and the second power line SL2. The first low voltage is applied to the first power line SL1 during the predetermined period (for example 1H), and the first high voltage is applied to the first power line SL1 during a next predetermined period. The second high voltage is applied to the second power line SL2 during the predetermined period, and the second low voltage is applied to the second power line SL2 during the next predetermined period. In this case, the first period and the second period are repeated several times during one frame, such that the voltage that swings is applied to the first power line SL1 and the second power line SL2. In this case, the first low voltage and the second low voltage may be the same, and the first high voltage and the second high voltage may be the same.

The assistance step-up capacitor Csa is connected to the first switching element Qa and the first power line SL1, and the assistance step-down capacitor Csb is connected to the second switching element Qb and the second power line SL2.

The voltage Va of the terminal (hereinafter referred to as "the first terminal") through which the assistance step-up capacitor Csa is connected to the first switching element Qa is decreased if the first low voltage is applied to the first power line SL1, but is increased if the first high voltage is applied to the first power line SL1. Next, the voltage Va of the first terminal is swung according to the swing of the voltage of the first power line SL1.

The voltage Vb of the terminal (hereinafter referred to as "the second terminal") through which the assistance step-down capacitor Csb is connected to the first switching element Qb is increased if the second high voltage is applied to the second power line SL2, but is decreased if the second low voltage is applied to the second power line SL2. Next, the voltage Vb of the second terminal is swung according to the swing of the voltage of the second power line SL2.

As described above, although the same data voltage is applied to two sub-pixels, the voltages Va and Vb of the pixel electrodes of two sub-pixels are different according to the magnitude of the voltages swung in the first and second power lines SL1 and SL2 such that the transmittance of the two sub-pixels is different, thereby improving lateral visibility.

Referring to FIG. 32, the structure of the liquid crystal display according to is another exemplary embodiment of the present invention will be described.

A plurality of gate lines 121, a first power line 131a, and a second power line 131b are formed on the first substrate (not shown) made of transparent glass or plastic.

The gate line 121 transmits the gate signals and extends mainly in the transverse direction. The gate line 121 includes the first gate electrode 124a protruding upward and the second gate electrode 124b protruding downward.

The voltage that is swung with the predetermined period is applied to the first power line 131a and the second power line 131b.

The first low voltage is applied to the first power line 131a during the predetermined period (for example 1H), and the first high voltage is applied to the first power line 131a during the next predetermined period. The second high voltage is applied to the second power line 131b during the predetermined period, and the second low voltage is applied to the second power line 131b during the next predetermined period. In this case, the first period and the second period are repeated several times during one frame, such that the voltage swings are repeatedly applied to the first power line 131a and the second power line 131b. In this case, the first low voltage and the second low voltage may be the same, and the first high voltage and the second high voltage may be the same.

The first power line 131a may be formed at an upper side based on the gate line 121, and the second power line 131b may be formed at a lower side based on the gate line 121.

The gate insulating layer (not shown) is formed on the gate line 121, the first power line 131a, and the second power line 131b. The semiconductor island (not shown) is formed on the gate insulating layer. The semiconductor is positioned on the first and second gate electrodes 124a and 124b.

The plurality of data lines 171, the first source electrode 173a, the second source electrode 173b, the first drain electrode 175a, and the second drain electrode 175b are formed on the semiconductor and the gate insulating layer.

The data lines 171 transmit the data signals and extend mainly in the longitudinal direction, thereby intersecting the gate lines 121 and the power lines 131a and 131b. As shown in FIG. 32, the data lines 171 are not formed to be straight. Each data line 171 includes a first sub-data line 171a and a second sub-data line 171b that are connected to each other, and the first sub-data line 171a and the second sub-data line 171b are disposed at different locations. The first sub-data line 171a is formed along the edge of the pixel electrode 191 adjacent to the right side of the data line 171, and the second sub-data line 171b is formed along the edge of the pixel electrode 191 adjacent to the left side of the data line 171.

The first source electrode 173a and the second source electrode 173b respectively protrude from the data line 171 on the first gate electrode 124a and the second gate electrode 124b. The first source electrode 173a and the second source electrode 173b protrude from the same data line 171 and thereby receive the same data voltage. The first source electrode 173a and the second source electrode 173b may be formed with a "U" shape.

The first drain electrode 175a is separated from the first source electrode 173a, and includes the bar-shaped end facing the first source electrode 173a based on the first gate electrode 124a and the expansion extended to partially overlap the first power line 131a. The bar-shaped end of the first drain electrode 175a is partially enclosed by the first source electrode 173a of the "U" shape. The extension of the first drain electrode 175a is cross-shaped.

The second drain electrode 175b is separated from the second source electrode 173b, and includes the bar-shaped end facing the second source electrode 173b based on the is second gate electrode 124b and the expansion extended to partially overlap the first power line 131b. The bar-shaped end of the second drain electrode 175b is partially enclosed by the second source electrode 173b of the "U" shape. The extension of the first drain electrode 175a is cross-shaped.

The first gate electrode 124a, the first source electrode 173a, and the first drain electrode 175a form the first switching element (Qa of FIG. 31), and the second gate electrode 124b, the second source electrode 173b, and the second drain electrode 175b form the second switching element (Qb of FIG. 31).

The passivation layer is formed on the data line 171, the first and second source electrodes 173a and 173b, and the first and second drain electrodes 175a and 175b. The passivation layer is made of the insulator and has a flat surface. The step provider providing the step to the overlying layer is formed in the passivation layer of the insulator, and in FIG. 32, the step providing grooves 185h and 185l and the cross-shaped protrusions 182h and 182l positioned between the step providing grooves 185h and 185l are the step provider. As shown in FIG. 32, the step providing grooves 185h and 185l have a right triangle structure and are symmetrical to each other in a diagonal direction. As a result, the passivation layer 180 includes the cross-type protrusions 182*h* and 182*l*.

The passivation layer includes a first contact hole 181*a* exposing a portion of the first drain electrode 175*a* and a second contact hole 181*b* exposing a portion of the second drain electrode 175*b*.

The color filter may be formed under the passivation layer.

A plurality of pixel electrodes 191 are formed on the passivation layer. Each pixel electrode 191 includes the first sub-pixel electrode 191*h* and the second sub-pixel electrode 191*l* formed at predetermined intervals.

The first sub-pixel electrode 191*h* and the second sub-pixel electrode 191*l* respectively include partial plate electrodes 192*h* and 192*l* positioned at a center thereof, and a plurality of minute branch electrodes 193*h* and 193*l* protrude from the partial plate electrode 192*h* and 192*l* in an oblique direction.

The first sub-pixel electrode 191*h* includes the first partial plate electrode 192*h* and a plurality of first minute branch electrodes 193*h*, and is connected to the extension of the first drain electrode 175*a* in the center (the first partial plate electrode 192*h*) of the region where the first sub-pixel electrode 191*h* is formed. The position where the first drain electrode 175*a* and the first sub-pixel electrode 191*h* are connected is on the first cross-shaped protrusion 182*h* in FIG. 32. According to an exemplary embodiment, the first drain electrode 175*a* and the first sub-pixel electrode 191*h* may be connected through the first step providing groove 185*h* or at another region.

The first partial plate electrode 192*h* has a rhombus shape, and each vertex of the rhombus meets the boundary of the quadrangle region. The first partial plate electrode 192*h* covers the first step providing groove 185*h* and the first cross-shaped protrusion 182*h* of the passivation layer. As a result, the first partial plate electrode 192*h* has the step provided by the first step providing groove 185*h* of the passivation layer 180 and the first cross-shaped protrusion 182*h*. Here, the first cross-shaped protrusion 182*h* provides the pretilt to the liquid crystal molecules positioned at the center of the quadrangle region, thereby controlling an arrangement direction of the liquid crystal molecules and, as a result, texture is reduced. A plurality of first minute branch electrodes 193*h* extend in the edge of the oblique direction of the first partial plate electrode 192*h*. The plurality of first minute branch electrodes 193*h* form an angle of 45 degrees with respect to the gate lines 121 or the data lines 171, and form an angle of 90±15 degrees with respect to the edge of the oblique direction of the first partial plate electrode 192*h*.

Meanwhile, the second sub-pixel electrode 191*l* includes the second partial plate electrode 192*l* and a plurality of second minute branch electrodes 193*l*, and is connected to the extension of the second drain electrode 175*b* in the center (the second partial plate electrode 192*l*) of the region where the second sub-pixel electrode 191*l* is formed. The position where the second drain electrode 175*b* and the second sub-pixel electrode 191*l* are connected is on the second cross-shaped protrusion 182*l* in FIG. 32. However, according to an exemplary embodiment, the second drain electrode 175*b* and the second sub-pixel electrode 191*l* may be connected through the second step providing groove 185*l* or at another region.

The second partial plate electrode 192*l* has a rhombus shape connecting each edge of the quadrangle region. As a result, each of the vertices of the rhombus meets the boundary of the quadrangle region. The second partial plate electrode 192*l* covers the second step providing groove 185*l* of the passivation layer and the second cross-shaped protrusion 182*l*. As a result, the second partial plate electrode 192*l* has the step provided by the second step providing groove 185*l* of the passivation layer and the second cross-shaped protrusion 182*l*. A plurality of second minute branch electrodes 193*l* extend from the edge of the oblique direction of the second partial plate electrode 192*l*. The plurality of second minute branch electrodes 193*l* fill the rest of the rectangle region, form an angle of 45 degrees with respect to the gate lines 121 or the data lines 171, and form an angle of 90±15 degrees with respect to the edge of the oblique direction of the second partial plate electrode 192*l*.

Although not shown in the drawings, a common electrode (not shown) to which a constant voltage is applied is formed on a second substrate (not shown) that faces a first substrate is while being attached thereto, and a liquid crystal layer (not shown) is formed between the first substrate and the second substrate.

The first sub-pixel electrode 191*a* and the second sub-pixel electrode 191*b* maintain the applied voltage even after the first and second switching elements Qa and Qb are in an off state by forming first and second liquid crystal capacitors Clca and Clcb in conjunction with the common electrode that is formed on the second substrate and the liquid crystal layer disposed therebetween.

The first sub-pixel electrode 191*a* forms the assistance step-up capacitor (Csa of FIG. 31) along with the first power line 131*a* and the passivation layer dis[posed therebetween such that the voltage of the first liquid crystal capacitor (Clca of FIG. 31) is increased. The second sub-pixel electrode 191*b* forms the assistance step-down capacitor (Csb of FIG. 31) along with the second power line 131*b* and the passivation layer interposed therebetween such that the voltage of the second liquid crystal capacitor (Clcb of FIG. 31) is decreased. According to the voltage applied to the power lines 131*a* and 131*b*, the assistance step-up capacitor (Csa of FIG. 31) decreases the voltage of the first liquid crystal capacitor (Clca of FIG. 31), and the assistance step-down capacitor (Csb of FIG. 31) increases the voltage of the second liquid crystal capacitor (Clcb of FIG. 31).

The alignment layer may be formed on the first and second substrates of the liquid crystal display according to the exemplary embodiment of the present invention, and photoalignment (referring to FIG. 44) that controls the alignment direction and alignment angle of the liquid crystal may be implemented by irradiating light to the alignment layer.

In FIG. 32, the portion B is a region in which texture occurs, and luminance is higher there as compared with the other regions. Accordingly, the texture effect may be is decreased by covering the corresponding portion. Among them, the vertical line portion that crosses the center of the first and second sub-pixel electrodes 191*a* and 191*b* does not have a large difference in the luminance of the other region in view of a side and a front thereof because the liquid crystal lies at an angle of 0 degrees. On the other hand, the horizontal line portion that crosses the center of the first and second sub-pixel electrodes 191*a* and 191*b* has a large difference in the luminance of the other region in view of a side thereof because the liquid crystal stands at an angle of 90 degrees.

Therefore, the first power line 131*a* and the second power line 131*b* may be formed so that they cover the horizontal line portion that crosses the center of the first sub-pixel electrode 191*a* and the second sub-pixel electrode 191*b*, thereby preventing the effect by the texture.

In FIG. 32, the structure of the data line 171 is not formed with a straight shape to cover the texture formed at the edge of the pixel.

That is, the first sub-data line 171a and the second sub-data line 171b are alternately disposed to be connected to each other. The first and second sub-pixel electrodes 191a and 191b are divided into an upper part and a lower part, respectively, the edges of the left sides of the upper parts of the first and second sub-pixel electrodes 191a and 191b overlap the first sub-data line 171a, and the edges of the right sides of the lower parts of the first and second sub-pixel electrodes 191a and 191b overlap the second sub-data line 171b. Therefore, according to this arrangement, the texture that is formed at the edge of the pixel may be decreased.

As shown in FIG. 1, FIG. 4, FIG. 7, FIG. 17, and FIG. 25 to FIG. 32, as in an exemplary embodiment of the present invention, the structure including the partial plate electrode, the minute branch electrode, and the step provider may be applied to various is exemplary embodiments in which one pixel is divided into at least two sub-pixels. This may be applied to a case where one pixel is not divided.

In the following exemplary embodiments, an exemplary embodiment in which the step provider such as the opening is formed in the color filter 230 will be described with reference to FIG. 33 to FIG. 43.

First, a liquid crystal display according to another exemplary embodiment of the present invention will be described with reference to FIG. 33 to FIG. 35.

Figure 33:
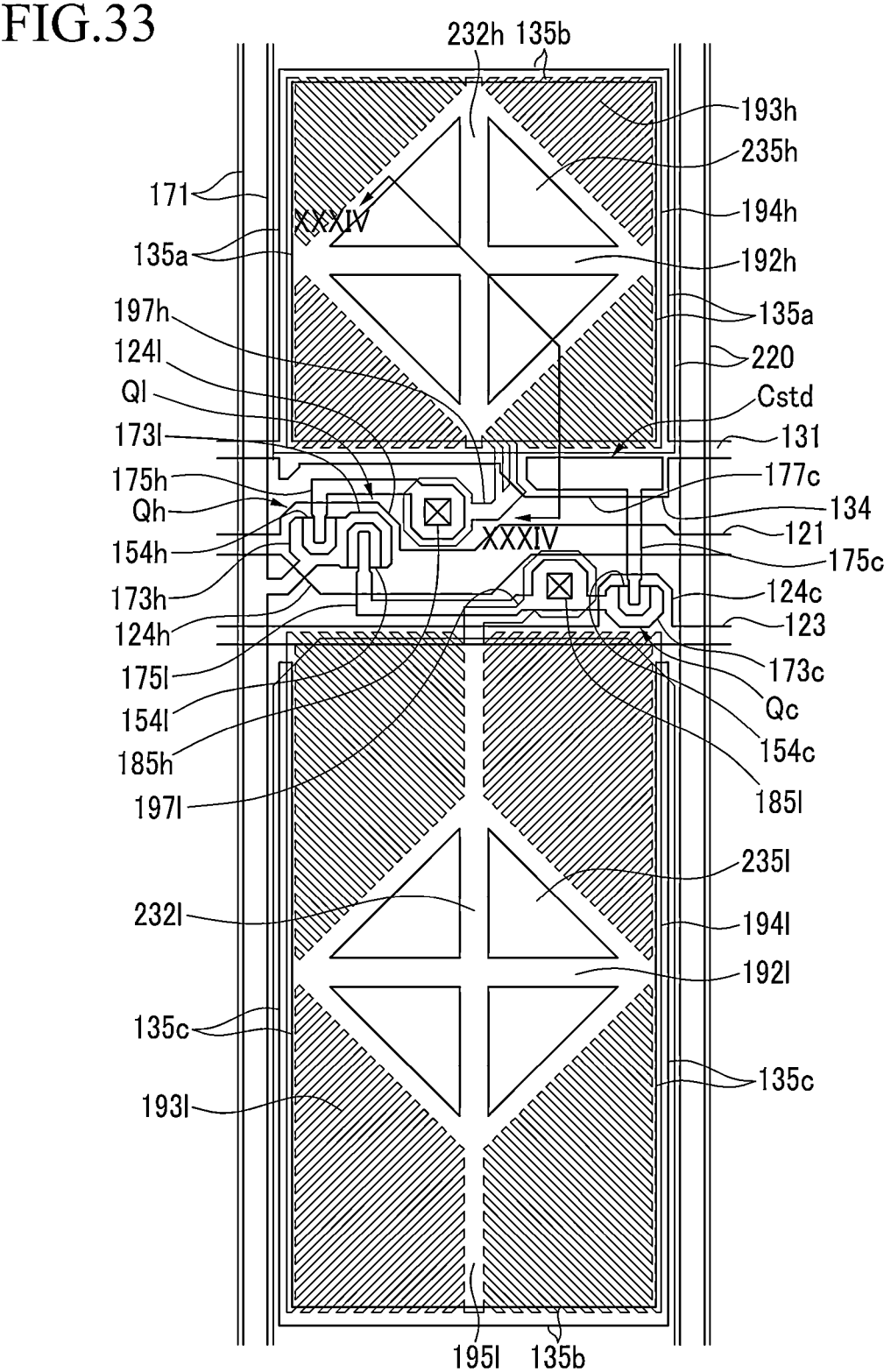
FIG. 33 is a layout view of a liquid crystal display according to an exemplary embodiment of the present invention.
Figure 34:
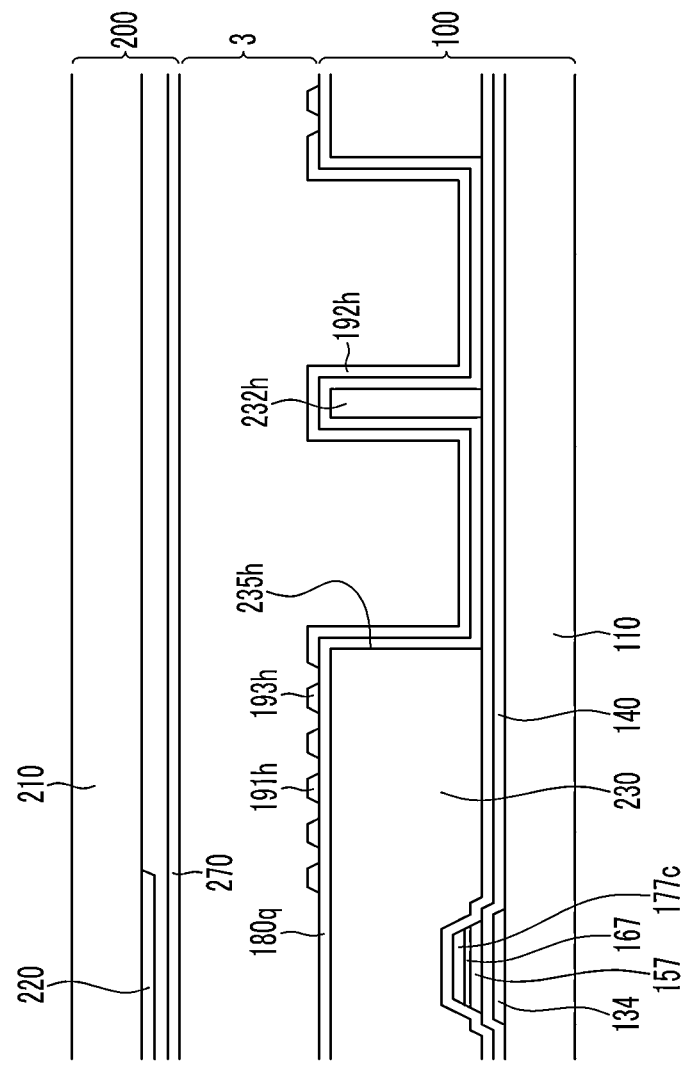
FIG. 34 is a cross-sectional view taken along the line XXXIV-XXXIV of FIG. 33.
Figure 35:
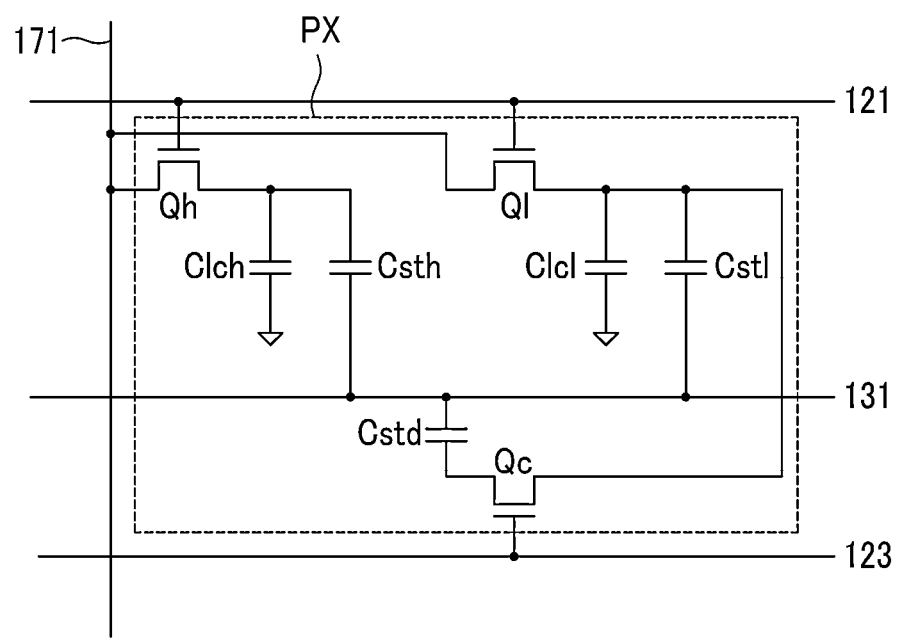
FIG. 35 is an equivalent circuit diagram of one pixel of the liquid crystal display of FIG. 33.

FIG. 33 is a layout view of a liquid crystal display according to an exemplary embodiment of the present invention, FIG. 34 is a cross-sectional view taken along the line XXXIV-XXXIV of FIG. 33, and FIG. 35 is an equivalent circuit diagram of one pixel of the liquid crystal display of FIG. 33.

Referring to FIG. 33 and FIG. 34, the liquid crystal display according to the present exemplary embodiment includes the lower panel 100 and the upper panel 200 facing each other, a liquid crystal layer 3 interposed between the two display panels 100 and 200, and a pair of polarizers (not shown) attached at the outer surfaces of the display panels 100 and 200.

Now, the lower panel 100 will be described.

A plurality of gate conductors including a plurality of gate lines 121, a plurality of step-down gate lines 123, and a plurality of storage electrode lines 131 are formed on an insulation substrate 110.

The gate lines 121 and the step-down gate lines 123 transfer gate signals and mainly extend in a transverse direction. Each gate line 121 includes a first gate electrode 124h and a second gate electrode 124l protruding upward and downward, and each step-down gate line 123 includes a third gate electrode 124c protruding upward. In the exemplary embodiment is of FIG. 33, the first gate electrode 124h and the second gate electrode 124l are connected to each other, thereby forming one protrusion.

The storage electrode lines 131 are mainly extended in the transverse direction, and transfer the predetermined voltage such as the common voltage Vcom. The storage electrode line 131 includes the storage electrodes 135a, 135b, and 135c, and the capacitor electrode 134 extending downward. The storage voltage line 131 includes two first longitudinal storage electrode parts 135a extending upward, a transverse storage electrode part 135b connecting the two first longitudinal storage electrode parts 135a, and two second longitudinal storage electrode parts 135c further extending upward from the transverse storage electrode part 135b.

The first longitudinal storage electrode part 135a is formed along a longitudinal edge of the first sub-pixel electrode 191h formed thereon, and the second longitudinal storage electrode part 135c is formed along the longitudinal edge of the second sub-pixel electrode 191l formed thereon. The transverse storage electrode part 135b is positioned between a transverse edge of the previous second sub-pixel electrode 191l and the transverse edge of the current first sub-pixel electrode 191h, and is formed along the two transverse edges.

As a result, the first longitudinal storage electrode part 135a and the transverse storage electrode part 135b are formed along the edge of the first sub-pixel electrode 191h, thereby at least partially overlapping the first sub-pixel electrode 191h, and the second longitudinal storage electrode part 135c and the transverse storage electrode part 135b are formed along the edge of the second sub-pixel electrode 191l, thereby at least partially overlapping the second sub-pixel electrode 191l.

In FIG. 33, the overlying transverse storage electrode part 135b and the is underlying transverse storage electrode part 135b appear to be separated from each other, but in actuality, the transverse storage electrode parts 135b of the pixels PX that are adjacent up and down are electrically connected to each other.

A gate insulating layer 140 is formed on the gate conductors 121 and 123 and the storage voltage line 131.

A plurality of semiconductors made of hydrogenated amorphous silicon (a-Si), polysilicon, or so on, are formed on the gate insulating layer 140. The semiconductors are extend mainly in the vertical direction, and each semiconductor includes first and second semiconductors 154h and 154l extending toward the first and second gate electrodes 124h and 124l and connected to each other, and a third semiconductor 154c connected to the second semiconductor 154l. The third semiconductor 154c is extended, thereby forming a fourth semiconductor 157.

A plurality of ohmic contacts (not shown) are formed on the semiconductors 154h, 154l, and 154c, wherein the first ohmic contact (not shown) is formed on the first semiconductor 154h, and the second ohmic contact (not shown) and the third ohmic contact (not shown) are respectively formed on the second semiconductor 154l and the third semiconductor 154c. The third ohmic contact is extended, thereby forming a fourth ohmic contact 167.

A data conductor including a plurality of data lines 171, a plurality of first drain electrodes 175h, a plurality of second drain electrodes 175l, and a plurality of third drain electrodes 175c, is formed on the ohmic contacts.

The data lines 171 transmit data signals and extend in the longitudinal direction, thereby intersecting the gate lines 121 and the step-down gate lines 123. Each data line 171 includes a first source electrode 173h and a second source electrode 173l extending toward a first is gate electrode 124h and a second gate electrode 124l and connected to each other.

The first drain electrode 175h, the second drain electrode 175l, and the third drain electrode 175c have one end portion having a wide area and the other end portion having a linear shape. The bar end portions of the first drain electrode 175h and the second drain electrode 175l are partially enclosed by the first source electrode 173h and the second source electrode 173l. The wide end portion of the second drain electrode 175l is again extended thereby forming a third source electrode 173c having a "U" shape. The wide end portion 177c of the third drain electrode 175c overlaps the capacitor electrode 134, thereby forming the step-down capacitor Cstd, and the bar end portion is partially enclosed by the third source electrode 173c.

The first/second/third gate electrode 124h/124l/124c, the first/second/third source electrode 173h/173l/173c, and the first/second/third drain electrode 175h/175l/175c form a first/second/third thin film transistor (TFT) Qh/Ql/Qc along with the first/second/third semiconductor island 154h/154l/154c, and a channel of the thin film transistor is respectively formed in the semiconductor 154h/154l/154c between the source electrode 173h/173l/173c and the drain electrode 175h/175l/175c.

The semiconductors, including the semiconductors 154h, 154l, and 154c except for the channel region between the source electrodes 173h, 173l, and 173c and the drain electrodes 175h, 175l, and 175c, have substantially the same shape as the data conductors 171, 175h, 175l, and 175c and the first to fourth ohmic contacts. That is, the semiconductors including the semiconductors 154h, 154l, and 154c have a portion that is exposed without being covered by the data conductors 171, 175h, 175l, and 175c, and a portion between the source electrodes 173h, 173l, and 173c and the drain electrodes 175h, 175l, and 175c.

A lower passivation layer (not shown) made of an insulator such as silicon nitride or silicon oxide is formed on the data conductors 171, 175h, 175l, 175c and the exposed semiconductors 154h, 154l, and 154c.

The color filter 230 is positioned on the lower passivation layer (not shown). Each color filter 230 is formed in the longitudinal direction between the neighboring data lines 171, and has openings 235h and 235l overlapping the first and second sub-pixel electrodes 191h and 191l. As shown in FIG. 33, the openings 235h and 235l have aright triangle structure and are symmetrical to each other in the diagonal direction. As a result, the color filter 230 includes a cross-shaped protrusion 232. Each color filter 230 may display one of three primary colors such as red, green, and blue, and the color filters 230 may overlap each other on the data line 171.

An upper passivation layer 180q is formed on the lower passivation layer (not shown) exposed by the openings 235h and 235l and the color filter 230. The upper passivation layer 180q prevents peeling of the color filter 230, and suppresses contamination of the liquid crystal layer 3 by an organic material of the solvent that flows in from the color filter 230, so it prevents defects, such as afterimages, that may occur when an image is driven, and may be made of the insulator such as silicon nitride or silicon oxide, or an organic material.

The lower passivation layer (not shown), the color filter 230, and the upper passivation layer 180q have a plurality of first contact holes 185h and a plurality of second contact holes 185l respectively exposing the wide ends of the first drain electrode 175h and the second drain electrode 175l.

A plurality of pixel electrodes 191 are formed on the upper passivation layer 180q. The pixel electrode 191 includes the first sub-pixel electrode 191h and the second sub-pixel electrode 191l that are separated based on two gate lines 121 and 123, are disposed up and is down the pixel area, and neighbor each other in the column direction.

The first sub-pixel electrode 191h and the second sub-pixel electrode 191l respectively include the partial plate electrode 192h and 192l and a plurality of minute branch electrodes 193h and 193l protruding from the partial plate electrode 192h and 192l in the oblique direction.

The first sub-pixel electrode 191h includes the first partial plate electrode 192h and a plurality of first minute branch electrodes 193h positioned in the square region and connected to a wide end portion of the first drain electrode 175a by the first connection 197h extending outside the square region.

The first partial plate electrode 192h has a rhombus shape, a center thereof is positioned at a center of the square region, and each vertex of the rhombus meets the boundary of the square region. The first partial plate electrode 192h covers the opening 235h of the color filter 230 and the first cross-shaped protrusion 232h. As a result, the first partial plate electrode 192h has the step provided by the first opening 235h of the color filter 230. Here, referring to FIG. 34, a first cross-shaped protrusion 232h provides a pretilt to the liquid crystal molecules positioned at the center of the square region, thereby controlling an arrangement direction of the liquid crystal molecules and, as a result, the texture is reduced.

A plurality of first minute branch electrodes 193h extend in an edge of the oblique direction of the first partial plate electrode 192h. A plurality of first minute branch electrodes 193h fill the rest of the square region, form an angle of 45 degrees with respect to the gate lines 121 or the data lines 171, and form an angle of 90 degrees with respect to the edge of the oblique direction of the first partial plate electrode 192h.

In the exemplary embodiment of FIG. 33, the first sub-pixel electrode 191h is includes the first minute branch connection 194h connecting the first partial plate electrode 192h and the ends of a plurality of first minute branch electrodes 193h in a longitudinal direction or a horizontal direction. However, according to an exemplary embodiment, the first connection 194h may be omitted, and in this case, a plurality of first minute branch electrodes 193h protrude to the outside.

On the other hand, the second sub-pixel electrode 191l includes the second partial plate electrode 192l and a plurality of second minute branch electrodes 193l formed in the rect-angle region having a longitudinal edge, and is connected to the wide end portion of the second drain electrode 175l by the second minute branch connection 194l extending outside the rectangle region.

The second partial plate electrode 192l has a rhombus shape having the length of all edges being the same, the center thereof is positioned at the center of the rectangle region, and the left/right vertices of the vertices of the rhombus meet the boundary of the rectangle region. Longitudinal extensions 195l extending in the vertical direction are connected at the remaining two vertices of the second partial plate electrode 192l, and the other end of the longitudinal extensions 195l meets the boundary of the rectangle region. The second partial plate electrode 192l covers the second opening 235l of the color filter 230 and the second cross-shaped protrusion 232l. As a result, the second partial plate electrode 192l has the step provided by the second opening 235l of the color filter 230, as shown in FIG. 33 and FIG. 34. A plurality of second minute branch electrodes 193l extend from the edge of the oblique direction of the second partial plate electrode 192l and two longitudinal extensions 195l. A plurality of second minute branch electrodes 193l fill the rest of the rectangle region, form an angle of 45 degrees with respect to the gate line 121 or the data line 171, and form an angle of 90±15 degrees with is respect to the edge of the oblique direction of the second partial plate electrode 192l.

In the exemplary embodiment of FIG. 32, the second sub-pixel electrode 191l includes the second partial plate electrode 192l and the second longitudinal connection 194l connecting the ends of a plurality of second minute branch electrodes 193l in the longitudinal direction. At this time, the first longitudinal connection 194h and the first minute branch electrode 193h form an angle of 45 degrees. However, according to an exemplary embodiment, the second longitudinal connection 194l may be omitted and, in this case, a plurality of second minute branch electrodes 193l protrude outside.

The first sub-pixel electrode 191h and the second sub-pixel electrode 191l receive the data voltage from the first drain electrode 175h and the second drain electrode 175l through the first contact hole 185h and the second contact hole 185l. The first sub-pixel electrode 191h and the second sub-pixel electrode 191l to which the data voltage is applied generate an electric field in conjunction with the common electrode 270 of the common electrode panel 200 to determine a direction of the liquid crystal molecules of the liquid crystal layer 3 between the two electrodes 191 and 270. As described above, according to the determined direction of the liquid crystal molecules, the luminance of light that passes through the liquid crystal layer 3 is changed.

The first sub-pixel electrode 191h and the common electrode 270 form the first liquid crystal capacitor Clch in conjunction with the liquid crystal layer 3 therebetween, and the second sub-pixel electrode 191l and the common electrode 270 form the second liquid crystal capacitor Clcl in conjunction with the liquid crystal layer 3 therebetween, so that the applied voltage is maintained even though the first and second thin film transistors Qh and Ql are turned off.

The first and second sub-pixel electrodes 191h and 191l overlap the storage is electrode 135 and the storage electrode line 131 to form the first and second storage capacitors Csth and Cstl, and the first and second storage capacitors Csth and Cstl strengthen the voltage maintaining ability of the first and second liquid crystal capacitors Clch and Clcl.

The capacitor electrode 134 and the wide end portion 177c of the third drain electrode 175c overlap the gate insulating layer 140 and semiconductor layers 157 and 167 therebetween to form a voltage drop capacitor Cstd. In another exemplary embodiment of the present invention, the semiconductor layers 157 and 167 that are disposed between the capacitor electrode 134 and the wide end portion 177c of the third drain electrode 175c that constitute the voltage drop capacitor Cstd may be removed.

The lower alignment layer (not shown) is formed on the pixel electrode 191 and the exposed upper passivation layer 180q. The lower alignment layer may be a vertical alignment layer and may include the photo-reactive material.

The upper panel 200 will be described below.

The light blocking member 220 is positioned under the insulation substrate 210. The light blocking member 220 is referred to as a black matrix and prevents light leakage. The light blocking member 220 extends upward and downward according to the gate line 121 and the step-down gate line 123 and covers a region of the first thin film transistor Qh, the second thin film transistor Ql, and the third thin film transistor Qc, and extends according to the data line 171 and covers the surroundings of the data line 171. The region that is not covered by the light blocking member 220 emits light to the outside, thereby displaying the images.

The planarization layer 250 providing a planar lower surface and made of the organic material is formed under the light blocking member 220. According to the exemplary embodiment of FIG. 34, the light blocking member 220 is formed in the upper panel 200, is although it may be formed in the lower panel 100 according to an exemplary embodiment.

The common electrode 270 made of the transparent conductive material is formed under the planarization layer 250.

The upper alignment layer (not shown) is formed under the common electrode 270. The upper alignment layer may be a vertical alignment layer and may be an alignment layer in which a photo-polymer material is photo-aligned.

The polarizers (not shown) are formed on the outer surface of the display panels 100 and 200, the polarization axes of the two polarizers are crossed, and one polarization axis thereof may be parallel to the gate lines 121. Alternatively, the polarizer may be disposed on only one outer surface among the two display panels 100 and 200.

The liquid crystal layer 3 has negative dielectric anisotropy. The liquid crystal molecules of the liquid crystal layer 3 are arranged such that a longitudinal axis of the liquid crystal molecules may be perpendicular to the surfaces of the two panels 100 and 200 in the case in which an electric field does not exist. Therefore, the incident light does not pass through the crossed polarizers but is blocked in a state in which there is no electric field.

As described above, because the first sub-pixel electrode 191h and the second sub-pixel electrode 191l to which the data voltage is applied generate an electric field in conjunction with the common electrode 270 of the common electrode panel 200, the liquid crystal molecules of the liquid crystal layer 3, which are aligned vertically with respect to the surfaces of the two electrodes 191 and 270 in a state in which there is no electric field, lie in a horizontal direction with respect to the surfaces of the two electrodes 191 and 270, and the luminance of light that passes through the liquid crystal layer 3 is changed according to the degree of tilt of the liquid crystal molecules.

The liquid crystal display further includes a spacer (not shown) to maintain a cell gap between two display panels 100 and 200, and the spacer is attached to the upper panel 200 and may be positioned under the common electrode 270.

The liquid crystal layer 3 disposed between the lower panel 100 and the upper panel 200 includes liquid crystal molecules 31 having negative dielectric anisotropy.

The liquid crystal layer 3 may further include a polymer that is polymerized by light, such as ultraviolet rays. The polymer included in the liquid crystal layer 3 provides the pretilt to the liquid crystal layer 3, and a method providing the pretilt angle will be described in detail in FIG. 44. That is, the liquid crystal layer 3 may not include the polymer when the arrangement direction is sufficiently controlled without the polymer providing the pretilt angle. Meanwhile, according to an exemplary embodiment of the present invention, the alignment layer formed in the upper panel 200 and the lower panel 100 may include the polymer that is polymerized by the light such as ultraviolet rays, and the polymer may be included through the method shown in FIG. 44. At this time, the liquid crystal layer 3 may not include the polymer.

The exemplary embodiment of FIG. 33 includes the upper passivation layer 180q and the lower passivation layer (not shown). That is, the upper passivation layer 180q and the lower passivation layer (not shown) are formed on and under the color filter 230, and according to an exemplary embodiment of the present invention, the upper passivation layer 180q and the lower passivation layer (not shown) may both be removed or only one passivation layer may be removed.

Next, a structure of the color filter and the pixel electrode including the characteristics in the liquid crystal display of FIG. 33 will be described with reference to FIG. 36.

Figure 36:
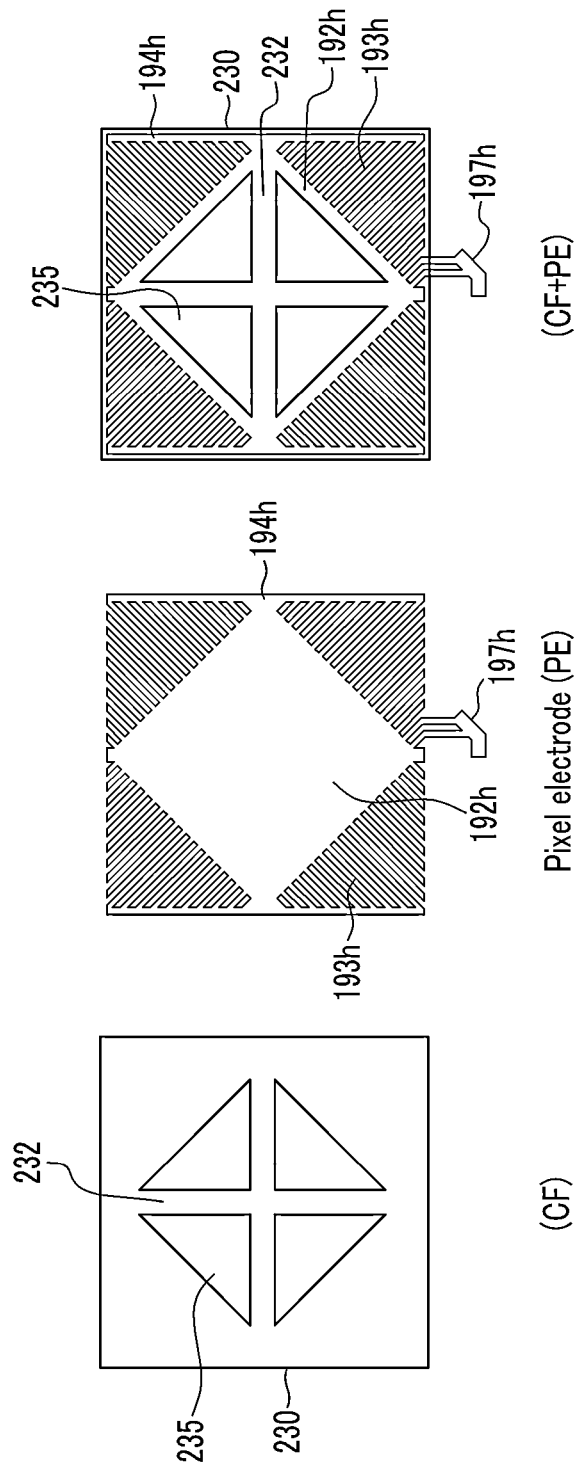
FIG. 36 is a layout view showing a color filter and a pixel electrode in the liquid crystal display of FIG. 33.

FIG. 36 is a layout view only showing a color filter and a pixel electrode in the liquid crystal display of FIG. 33.

First, FIG. 36 shows the sub-pixel positioned at the upper side of the pixel of FIG. 33, wherein CF indicates the color filter and PE indicates the pixel electrode.

The color filter 230 of FIG. 36 has the opening 235. The opening 235 includes four portions having the right triangle structure as shown in FIG. 36, disposed diagonally across from each other. As a result, the cross-shaped protrusion 232 is formed through the center of the color filter 230. The color filter 230 is removed in the opening 235 of the color filter 230, the opening 235 provides the step, and the liquid crystal molecules are arranged in the predetermined direction by the step.

The pixel electrode PE shown in FIG. 36 has the following characteristics.

The first sub-pixel electrode 191h is formed on the color filter 230, the first sub-pixel electrode 191h has the step provided by the color filter 230, and the first partial plate electrode 192h of the first sub-pixel electrode 191h has the step.

The first sub-pixel electrode 191h includes the first partial plate electrode 192h positioned at the center and a plurality of first minute branch electrodes 193h protrude from the first partial plate electrode 192h in the oblique direction. The first sub-pixel electrode 191h is connected to the wide portion of the first drain electrode 175h by the first connection 197h extending outside the square region.

The first partial plate electrode 192h has a rhombus shape and covers four first openings 235h of the color filter 230 and the first cross-shaped protrusion 232h.

A plurality of first minute branch electrodes 193h extend in an edge of the oblique direction of the first partial plate electrode 192h and form an angle of 90 degrees by the edge of is the oblique direction of the first partial plate electrode 192h. According to an exemplary embodiment of the present invention, the angle between the edge of the oblique direction of the first partial plate electrode 192h and the first minute branch electrode 193h may be changed, and may more than 85 degrees but less than 95 degrees.

The first sub-pixel electrode 191h further includes the first longitudinal connection 194h connecting the first partial plate electrode 192h and the ends of a plurality of first minute branch electrodes 193h in the vertical direction. However, the first connection 194h may be omitted, and in this case, a plurality of first minute branch electrodes 193h are protruded outside.

FIG. 36 shows the structure of the sum of the pixel electrode PE and the color filter CF, having the step as a result of the opening 235h of the color filter 230. Referring to FIG. 34, with regard to the sum structure CF+PE of the pixel electrode PE and the color filter CF, the edge of the rhombus shape of the first partial plate electrode 192h and the longest edge in the triangle shape of four first openings 235h of the color filter 230 correspond to each other. That is, the longest edge in the triangle shape of the four first openings 235h is positioned inside the edge of the rhombus shape of the first partial plate electrode 192h.

A change of the transmission and the display characteristic by the step provided from the color filter will be described.

Figure 37:
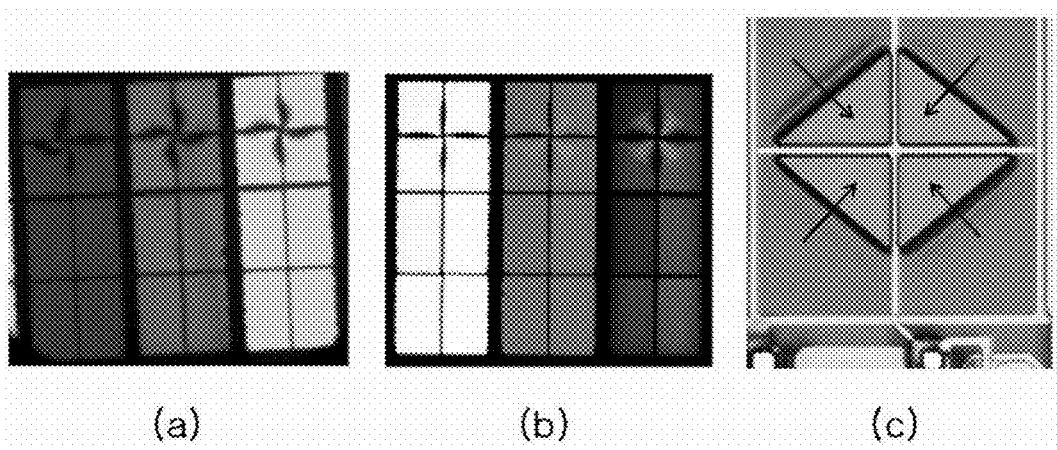
FIG. 37 and FIG. 38 are views showing an experimental result using an exemplary embodiment of the present invention.
Figure 38:
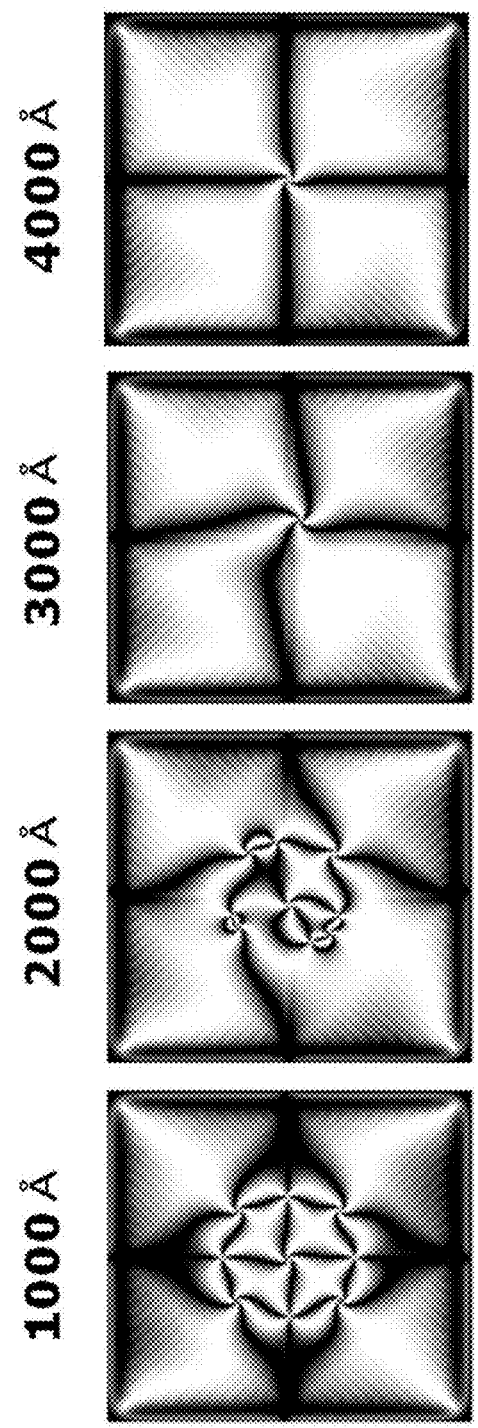

FIG. 37 and FIG. 38 are views showing an experimental result using an exemplary embodiment of the present invention, where FIG. 37 is the experimental result of the display characteristic of a case that the step is not formed and a case that the step is formed, and FIG. 38 is the experimental result of the display characteristic according to various steps.

First, FIG. 37 will be described.

In FIG. 37, (a) shows the display characteristic of the case where the step is not provided from the underlying layer (for example, the color filter) and the pixel electrode includes the partial plate electrode and the minute branch electrode. Referring to the upper sub-pixel of (a) of FIG. 37, the texture is formed as a cross-shape through the wide region such that the transmittance is decreased and the luminance is decreased and, as a result, the texture must be covered such that the aperture ratio is decreased.

In contrast, (b) of FIG. 37 shows the display characteristic in the case that the step is provided. When compared with the case of (a) of FIG. 37, although the texture is generated, the cross-shaped texture of the cross type has a relatively narrow width such that the transmittance is high and the luminance is high. In FIG. 37, (a) has transmittance about 84% and (b) has transmittance of about 87% such that the case of providing the step has the preferable transmittance and luminance, and the aperture ratio may be increased.

In (c) of FIG. 37, in the case of providing the step like in (b) of FIG. 37, the arrangement direction of the liquid crystal is controlled in the arrow direction such that the range of the texture generation is decreased.

When providing the step as in FIG. 37, the display characteristic is improved, and how the step is provided will be described with reference to FIG. 38.

FIG. 38 is the experimental result of the display characteristics when the step provided from the color filter 230 has the thickness of 1000 Å, 2000 Å, 3000 Å, and 4000 Å, and the structure of FIG. 36 is applied.

As shown in FIG. 38, when the step provided from the color filter 230 is 1000 Å, the range of the texture generation is very wide. As the step is increased, the range of the texture generation is decreased, and when the step is 4000 Å, the step is only generated in the region of is the cross shape. Therefore, the step provided from the color filter 230 may be more than 4000 Å.

In particular, the cross-shaped protrusion 232 formed in the color filter 230 provides the pretilt to the liquid crystal molecules positioned at the center of the square region, thereby controlling the arrangement direction of the liquid crystal molecules such that it is preferable that the height of the cross-shaped protrusion 232 is more than 4000 Å. In that case, the arrangement direction of the liquid crystal molecules is also controlled in the center of the square region, and the texture may be reduced.

According to an exemplary embodiment, the color filter 230 may not be completely removed. That is, the opening 235 of the triangle shape formed in the color filter 230 is not the opening and the color filter 230 of the predetermined thickness may be formed with a remaining groove. The opening and the groove are referred to as "a step provider" hereafter. When the step provider is not the opening, but is instead the groove, the color filter may be formed with a relatively smaller thickness than the thickness of the surrounding color filter 230 in the groove of the triangle shape. Also, according to an exemplary embodiment of the present invention, the color filter that is thinly formed in the groove of the triangle shape may have a thickness that is gradually changed in at least one direction.

As described above, the exemplary embodiment includes the step provider (the opening or the groove). However, the area displaying white is increased in the exemplary embodiment where that the color filter 230 is completely removed such that the luminance and the transmittance are increased, and thereby the aperture ratio is also increased.

A pixel structure according to another exemplary embodiment of the present invention will be described with reference to FIG. 39 to FIG. 42.

FIG. 39 to FIG. 42 are layout views of a part separated from another exemplary is embodiment of the present invention.

Figure 39:
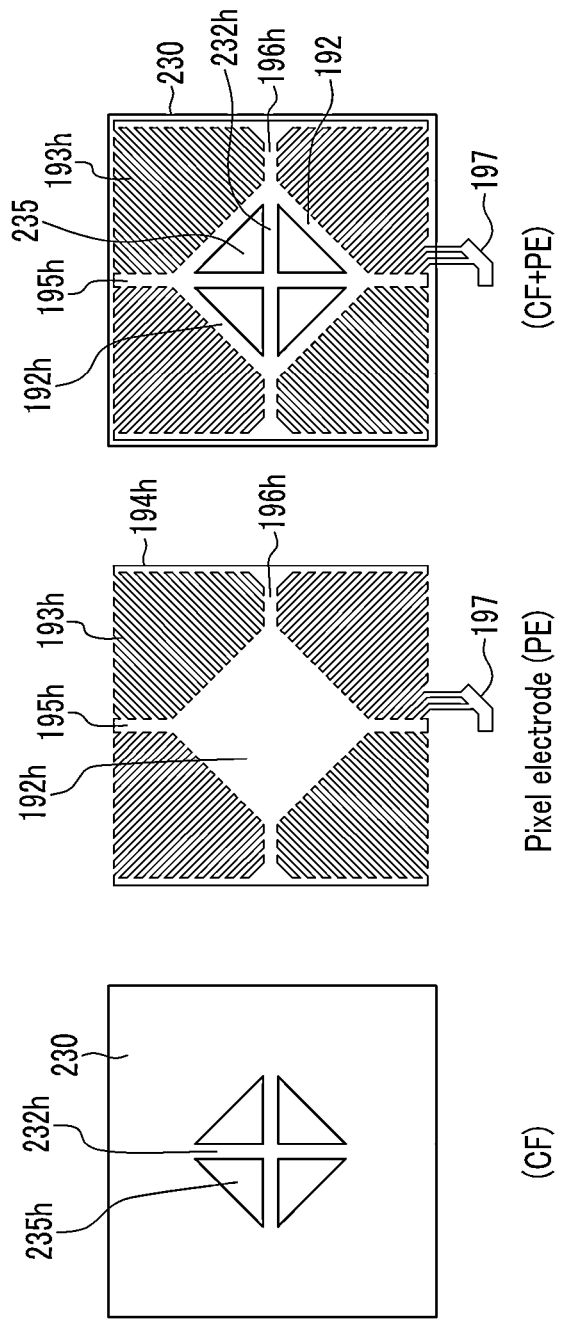
FIG. 39, FIG. 40, FIG. 41, and FIG. 42 are layout views of a part separated from another exemplary embodiment of the present invention.

FIG. 39 is the exemplary embodiment in which the size of the opening 235 of the color filter 230 and the size of the partial plate electrode 192 are small as compared with FIG. 36. As a result, in FIG. 39, the length of the minute branch electrode 193 is relatively long and the partial plate electrode 192 is positioned inside the square region such that the longitudinal extension 195 extending in the vertical direction and the transverse extension 196 extending in the horizontal direction are formed in the partial plate electrode 192.

The structure of the color filter 230 and the pixel electrode 191 according to FIG. 39 is described in detail, and the exemplary embodiment of FIG. 39 only shows the upper sub-pixel among one pixel.

The color filter 230 is positioned on the substrate 110. The thin film transistor may be formed between the color filter 230 and the substrate 110. The color filter 230 has the opening 235h. The opening 235h has a right triangle structure, and a total of four openings 235h are disposed to be symmetrical to each other in the diagonal direction. As a result, the color filter 230 includes the cross-shaped protrusion 232h.

The first sub-pixel electrode 191h is formed on the color filter 230. The first sub-pixel electrode 191h includes the first partial plate electrode 192h positioned at the center and a plurality of first minute branch electrodes 193h protruding from the first partial plate electrode 192h in the oblique direction. The first sub-pixel electrode 191h includes the first partial plate electrode 192h and a plurality of first minute branch electrodes 193h positioned in the square region, and is connected to the output terminal of the thin film transistor by the first connection 197h extending outside the square region.

The first partial plate electrode 192h has a rhombus shape, and the center thereof is positioned at the center of the square region. However the size thereof is small such that the vertex of the rhombus is separated from the boundary of the square region by a predetermined distance. In each vertex of the rhombus of the first partial plate electrode 192h, the longitudinal extension 195h and the transverse extension 196h respectively extending in the vertical direction and the horizontal direction are formed and meet the boundary of the square region. Here, the line width of the longitudinal extension 195h and the transverse extension 196h may be the same, and may be more than 1/3 and less than 1 times the line width of the protrusion 232h of the cross type. In reality, when forming the cross-shaped protrusion 232h in the color filter 230, the cross-shaped protrusion 232h of the cross type may have the taper structure. At this time, if the tapered side is projected to the lower surface (hereinafter referred to as "the line width of the tapered side"), the line width of the tapered side may have about 1/3 of the width of the lower surface (hereinafter referred to as "a total line width"), and in this case, the upper surface of the tapered protrusion 232h also has the width of about 1/3 of the width of the lower surface. In this exemplary embodiment, the width of the longitudinal extension 195h and the transverse extension 196h may have the width of the degree of the upper surface of at least the tapered first protrusion 232h. At this time, the width of the longitudinal extension 195h and the transverse extension 196h may have a value of more than the line width of the tapered side surface of the protrusion 232h to less than the entire line width.

Meanwhile, the first partial plate electrode 192h covers the opening 235h of the color filter 230 and the first cross-shaped protrusion 232h. As a result, the first partial plate electrode 192h has the step provided by the first opening 235h of the color filter 230. That is, FIG. 39 is a view showing the pixel electrode PE and the color filter CF in a plane view. However, the structure actually has the step because of the opening 235h of the color filter 230. Here, the first cross-shaped protrusion 232h controls the arrangement direction of the liquid crystal molecules positioned at the center of the square region, thereby reducing the texture.

A plurality of first minute branch electrodes 193h are extended at the edge of the oblique direction of the first partial plate electrode 192h, and at the longitudinal extension 195h and the transverse extension 196h. A plurality of first minute branch electrodes 193h fill the rest of the square region and form the angle of 90 degrees with respect to the edge of the oblique direction of the first partial plate electrode 192h, the longitudinal extension 195h, and the transverse extension 196h.

The first sub-pixel electrode 191h includes the first longitudinal connection 194h connecting the first partial plate electrode 192h and the ends of a plurality of first minute branch electrodes 193h in the vertical direction. At this time, the first longitudinal connection 194h and the first minute branch electrode 193h form an angle of 45 degrees. However, according to an exemplary embodiment of the present invention, the first connection 194h may be omitted, and in this case, a plurality of first minute branch electrodes 193h protrude to the outside.

According to an exemplary embodiment, the angle formed by the edge of the oblique direction of the first partial plate electrode 192h, the longitudinal extension 195h, and the transverse extension 196h and the first minute branch electrode 193h may be changed in the range of more than 85 to less than 95 degrees. The angle between the first minute branch electrode 193h and the first longitudinal connection 194h may have an angle of more than 40 to less than 50 degrees.

In the exemplary embodiment of FIG. 39, as shown in FIG. 44, the pretilt providing polymer 350 may be included in the liquid crystal layer 3, and when the step provided by the opening 235h of the color filter 230 and the pattern of the minute branch electrodes 193 is only controls the liquid crystal molecules and the texture is not decreased, the pretilt providing polymer 350 may additionally be used.

In the exemplary embodiment of FIG. 39, compared with the exemplary embodiment of FIG. 33, FIG. 34, and FIG. 36, the size of the opening 235h of the color filter 230 is small. However, the opening 235h that is not formed in the color filter 230 is formed such that the white luminance is high and the texture is reduced by controlling the liquid crystal molecules such that the portion to be covered is reduced, thereby resulting in an increase in the aperture ratio and the transmittance.

Figure 40:
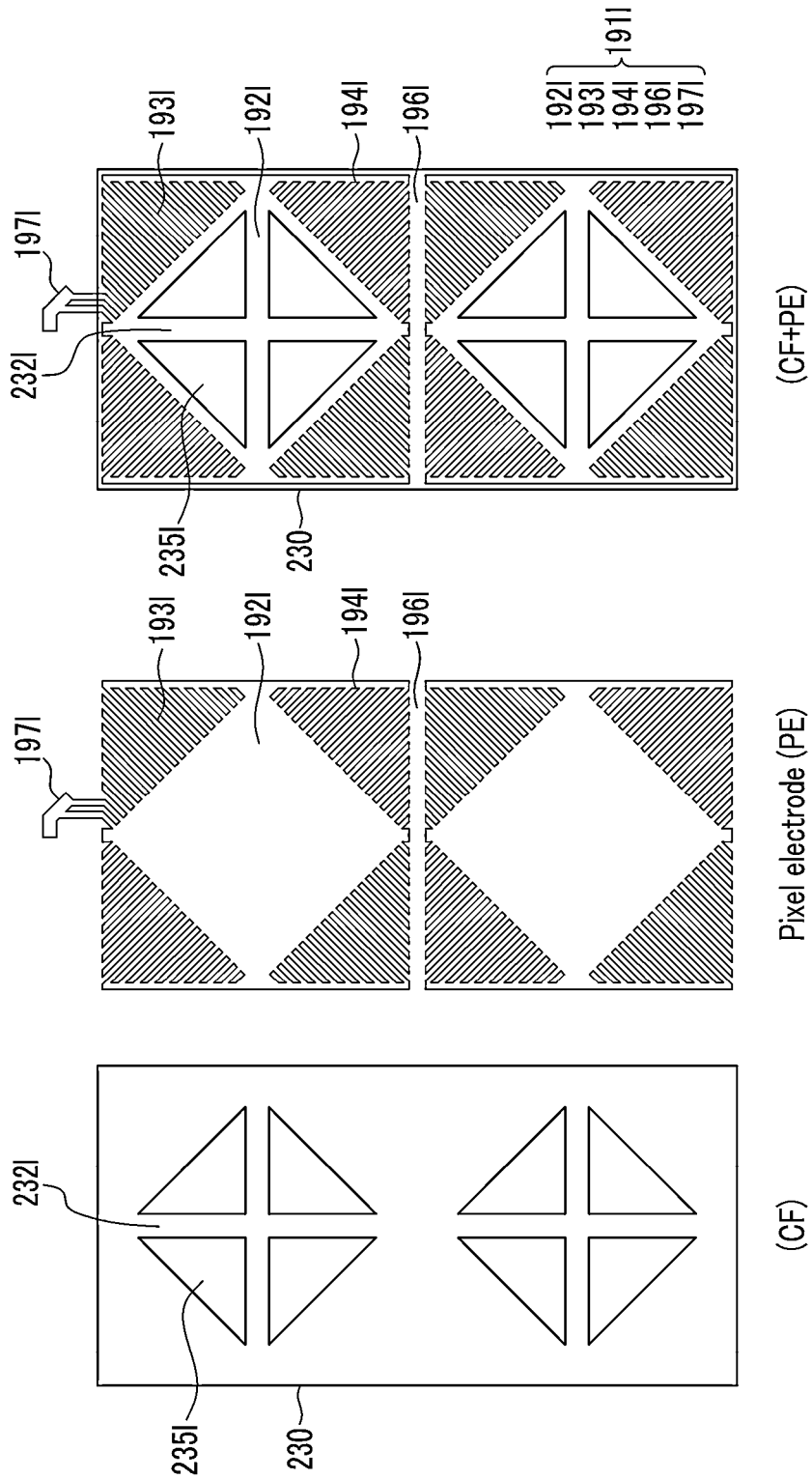

FIG. 40 only shows the lower sub-pixel of one pixel, and when compared with FIG. 33, the size of the opening 235l of the color filter 230 and the size of the partial plate electrode 192l are the same. However, the number of openings 235l and the number of partial plate electrodes 192l is twice that shown in FIG. 33. As a result, in FIG. 40, the number of openings 235l that are not formed in the color filter 230 is increased such that the white luminance is high, and the aperture ratio and the transmittance are high.

The structure of the color filter 230 and the pixel electrode 191 according to FIG. 40 will now be described in detail.

The color filter 230 is positioned on the substrate 110. The thin film transistor may be formed between the color filter 230 and the substrate 110. The color filter 230 has the opening 235l. The opening 235l has the right triangle structure, and includes an opening 235l group that is symmetrically arranged in pairs. A total of four openings 235l are disposed to be symmetrical to each other in the diagonal direction, and the cross-shaped protrusion 232l is formed by the opening 235l in the color filter 230. The opening 235l groups that are symmetrically arranged in pairs are disposed up and down, and the cross-shaped protrusion 232l is connected into a straight line.

The second sub-pixel electrode 191l is formed on the color filter 230. The second sub-pixel electrode 191l is divided in two regions up and down, a pair of the second partial plate electrodes 192l and a plurality of second minute branch electrode 193l are formed for one region, and they respectively correspond to the opening 235l group that is symmetrically arranged. The two regions divide the rectangle region up and down, thereby respectively forming the square region.

The second partial plate electrode 192l and a plurality of second minute branch electrode 193l formed in one region will now be described.

The second partial plate electrode 192*l* positioned at the center of one region and a plurality of second minute branch electrodes 193*l* protruding from the second partial plate electrode 192*l* in the oblique direction are included. The second sub-pixel electrode 191*l* includes the second partial plate electrode 192*l* positioned in the square region and a plurality of second minute branch electrodes 193*l*.

The second partial plate electrode 192*l* has the rhombus shape, the center thereof is positioned at the center of the square region, and each vertex of the rhombus meets the boundary of the square region.

The second partial plate electrode 192*l* covers the second opening 235*l* of the color filter 230 and the second cross-shaped protrusion 232*l*. As a result, the second partial plate electrode 192*l* has the step provided by the second opening 235*l* of the color filter 230. That is, FIG. 40 is a view showing the pixel electrode PE and the color filter CF in a plane view, having the step formed by the opening 235*l* of the color filter 230. Here, the second cross-shaped protrusion 232*l* controls the arrangement direction of the liquid crystal molecule positioned at the is center of the square region, thereby reducing the texture.

A plurality of second minute branch electrodes 193*l* extend from the edge of the oblique direction of the second partial plate electrode 192*l*. The plurality of second minute branch electrodes 193*l* fill the rest of the square region and form an angle of 90 degrees with respect to the edge of the oblique direction of the second partial plate electrode 192*l*.

The second sub-pixel electrode 191*l* includes the second longitudinal connection 194*l* connecting the second partial plate electrode 192*l* and the ends of a plurality of second minute branch electrodes 193*l* in the vertical direction. The second longitudinal connection 194*l* and the second minute branch electrode 193*l* form an angle of 45 degrees. However, according to an exemplary embodiment of the present invention, the second longitudinal connection 194*l* may be omitted, and a plurality of second minute branch electrode 193*l* may protrude outside.

According to an exemplary embodiment of the present invention, the angle between the edge of the oblique direction of the second partial plate electrode 192*l* and the second minute branch electrode 193*l* may be changed, and may be more than 85 degrees to less than 95 degrees. The angle between the second minute branch electrode 193*l* and the second longitudinal connection 194*l* may be changed to be more than 40 degrees to less than 50 degrees.

A pair of the second partial plate electrodes 192*l* respectively formed in two regions of the second sub-pixel electrode 191*l* and a plurality of second minute branch electrodes 193*l* are connected by the second longitudinal connection 194*l* and have the symmetrical structure by the second longitudinal connection 194*l*. The second longitudinal connection 194*l* is formed along the boundary of two up and down regions. The opening 235*l* formed in the color filter 230 is positioned at the symmetrical position by the second longitudinal connection 194*l* in the plane view. According to an exemplary embodiment of the present invention, the second is longitudinal connection 194*l* may be omitted, and the second partial plate electrodes 192*l* and the second minute branch electrodes 193*l* may be respectively connected directly to each other. The second partial plate electrode 192*l*, a plurality of second minute branch electrodes 193*l*, and the opening 235*l* have a structure that is symmetrical with respect to an imaginary line (a line dividing the two up and down regions) formed at the position of the second longitudinal connection 194*l*.

The second sub-pixel electrode 191*l* may be connected to the output terminal of the thin film transistor by the second connection 197*l* extending from the second partial plate electrode 192*l* or a plurality of second minute branch electrode 193*l* in the upper direction.

In the exemplary embodiment of FIG. 40, as shown in FIG. 44, the pretilt providing polymer 350 may be included in the liquid crystal layer 3, and when the step provided by the opening 235*l* of the color filter 230 and the pattern of the minute branch electrode 193 controls only the liquid crystal molecules and the texture is not decreased, the pretilt providing polymer 350 may additionally be used.

In the exemplary embodiment of FIG. 40, the number of openings 235*h* in the color filter 230 is twice that of the exemplary embodiment of FIG. 33, FIG. 34, and FIG. 36, such that the white luminance is high and the texture is reduced by controlling the liquid crystal molecules and, thereby, the portion to be covered is reduced, resulting in an increase in both the aperture ratio and the transmittance.

Figure 41:
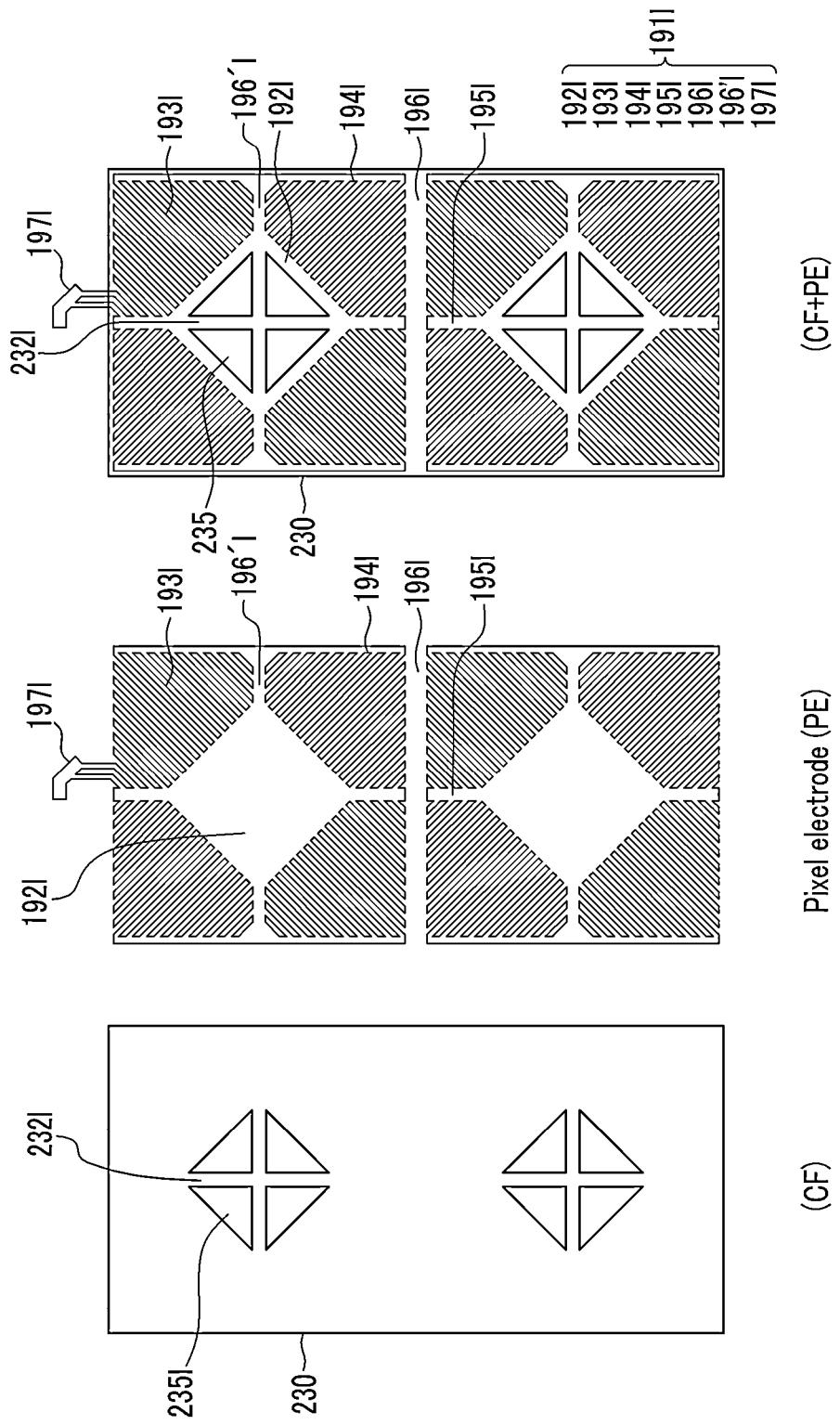

The exemplary embodiment of FIG. 41 shows only the lower sub-pixel of one pixel, as in FIG. 40, and compared with FIG. 40, the size of the opening 235*l* of the color filter 230 and the size of the partial plate electrode 192*l* are relatively small. As a result, in FIG. 40, the length of the minute branch electrode 193*l* is relatively long, and the longitudinal extension 195*l* extending from the partial plate electrode 192*l* in the vertical direction and the transverse extension 196*l* extending in the horizontal direction are formed.

The structure of the color filter 230 and the pixel electrode 191 according to FIG. 41 will be described in detail below.

The color filter 230 is positioned on the substrate 110. The thin film transistor may be formed between the color filter 230 and the substrate 110. The color filter 230 has the opening 235*l*. The opening 235*l* has the right triangle structure, and an opening 235*l* group that is symmetrically arranged in pairs is included. However, the size of the opening 235*l* is smaller than that of the exemplary embodiment of FIG. 40. In one opening 235*l* group, a total of four openings 235*l* are disposed to be symmetrical to each other in the diagonal direction, and the cross-shaped protrusion 232*l* is formed by the opening 235*l* in the color filter 230. The opening 235*l* group that is symmetrically arranged in pairs is disposed up and down, and the cross-shaped protrusion 232*l* is connected in a straight line.

The second sub-pixel electrode 191*l* is formed on the color filter 230. The second sub-pixel electrode 191*l* is divided into two up and down regions, a pair of the second partial plate electrodes 192*l* and a plurality of second minute branch electrodes 193*l* are formed for one region, and they respectively correspond to one opening 235*l* group that is symmetrically arranged. The two regions divide the rectangle region up and down, thereby respectively forming the square region.

The second partial plate electrode 192*l* and a plurality of second minute branch electrodes 193*l* formed in one region will now be described.

The second partial plate electrode 192*l* positioned at the center of one region and a plurality of second minute branch electrodes 193*l* protruding from the second partial plate is electrode 192*l* in the oblique direction are included. The second sub-pixel electrode 191*l* includes the second partial plate electrode 192*l* positioned in the square region, and a plurality of second minute branch electrodes 193*l*.

The second partial plate electrode 192*l* has the rhombus shape and the center thereof is positioned at the center of the square region. However, the size thereof is small such that each vertex of the rhombus is separated from the boundary of the square region by a predetermined distance. In each vertex of the rhombus of the second partial plate electrode 192*l*, the longitudinal extension 195*l* and the transverse extension 196*l* respectively extending in the vertical direction and the horizontal direction are formed and meet the boundary of the square region. Here, the line width of the longitudinal extension 195*l* and the transverse extension 196*l* may be the same, and may have a size of more than ⅓ and less than 1 times that of the line width of the cross-shaped protrusion 232*l*. In reality, when forming the cross-shaped protrusion 232*l* in the color filter 230, the cross-shaped protrusions 232*l* have the taper structure. If the tapered side is projected to the lower surface (hereinafter, referred to as "the line width of the tapered side"), the line width of the tapered side may have about ⅓ of the width of the lower surface (hereinafter, referred to as "a total line width"), and in this case, the upper surface of the tapered protrusion 232*l* also has the width of about ⅓ of the width of the lower surface. In this exemplary embodiment of the present invention, the width of the longitudinal extension 195*l* and the transverse extension 196*l* may have the width similar to that of the upper surface of at least tapered protrusion 232*l*. The width of the longitudinal extension 195*l* and the transverse extension 196*l* may have a value of more than the line width of the tapered side surface of the protrusion 232*n* to less than the entire line width.

The first partial plate electrode 192*l* covers the opening 235*l* of the color filter 230 and the second cross-shaped protrusion 232*l*. As a result, the second partial plate electrode 192*l* has the step provided by the first opening 235*l* of the color filter 230. That is, FIG. 41 is a view showing the pixel electrode PE and the color filter CF in a plane view. However, the structure has the step because of the opening 235*l* of the color filter 230. Here, the second cross-shaped protrusion 232*l* controls the arrangement direction of the liquid crystal molecules positioned at the center of the square region, thereby reducing the texture.

A plurality of second minute branch electrodes 193*l* extend in the edge of the oblique direction of the second partial plate electrode 192*l*, and the second longitudinal extension 195*l* and the second-first transverse extension 196'*l*. A plurality of second minute branch electrodes 193*l* fill the rest of the square region and form the angle of 90 degrees with respect to the edge of the oblique direction of the second partial plate electrode 192*l*, the second longitudinal extension 195*l*, and the second-first transverse extension 196'*l*.

The second sub-pixel electrode 191*l* includes the second longitudinal connection 194*l* connecting the second-first transverse extension 196'*l* and the ends of a plurality of second minute branch electrodes 193*l* in the vertical direction. The second longitudinal connection 194*l* and the second minute branch electrode 193*l* form an angle of 45 degrees. However, according to an exemplary embodiment of the present invention, the second longitudinal connection 194*l* may be omitted, and in this case, a plurality of second minute branch electrodes 193*l* protrude outside.

According to an exemplary embodiment of the present invention, the angle formed by the edge of the oblique direction of the second partial plate electrode 192*l* and the second minute branch electrode 193*l* may be changed in the range of more than 85 degrees to less than 95 degrees. The angle between the second minute branch electrode 193*l* and the second is longitudinal connection 194*l* may have an angle of more than 40 degrees to less than 50 degrees.

A pair of the second partial plate electrodes 192*l* respectively formed in two regions of the second sub-pixel electrode 191*l* and a plurality of second minute branch electrodes 193*l* are connected by the second longitudinal connection 194*l*, and have a symmetrical structure is formed by the second longitudinal connection 194*l*. The second longitudinal connection 194*l* is formed along the boundary of two up and down regions. The opening 235*l* formed in the color filter 230 is positioned at the symmetrical position by the second longitudinal connection 194*l* in the plane view. According to an exemplary embodiment of the present invention, the second longitudinal connection 194*l* may be omitted, and the second partial plate electrodes 192*l* and the second minute branch electrodes 193*l* may be respectively connected directly to each other. The second partial plate electrode 192*l*, a plurality of second minute branch electrodes 193*l*, and the opening 235*l* have a structure that is symmetrical with respect to an imaginary line (a line dividing the two up and down regions) formed at the position of the second longitudinal connection 194*l*.

The second sub-pixel electrode 191*l* may be connected to the output terminal of the thin film transistor, and may have the structure connected by the second connection 197*l* extending from the second partial plate electrode 192*l* or a plurality of second minute branch electrodes 193*l* in the upper direction.

In the exemplary embodiment of FIG. 41, as shown in FIG. 44, the pretilt providing polymer 350 may be included in the liquid crystal layer 3, and when only the step provided by the opening 235*l* of the color filter 230 and the pattern of the minute branch electrodes 193 controls the liquid crystal molecules and the texture is not decreased, the pretilt providing polymer 350 may additionally be used.

In the exemplary embodiment of FIG. 40, the number of openings 235*h* of the color filter 230 is twice that of the exemplary embodiment of FIG. 33, FIG. 34, and FIG. 36, such that the white luminance is high and the texture is reduced by controlling the liquid crystal molecules such that the portion to be covered is reduced, and, as a result, the aperture ratio and the transmittance are increased.

Figure 42:
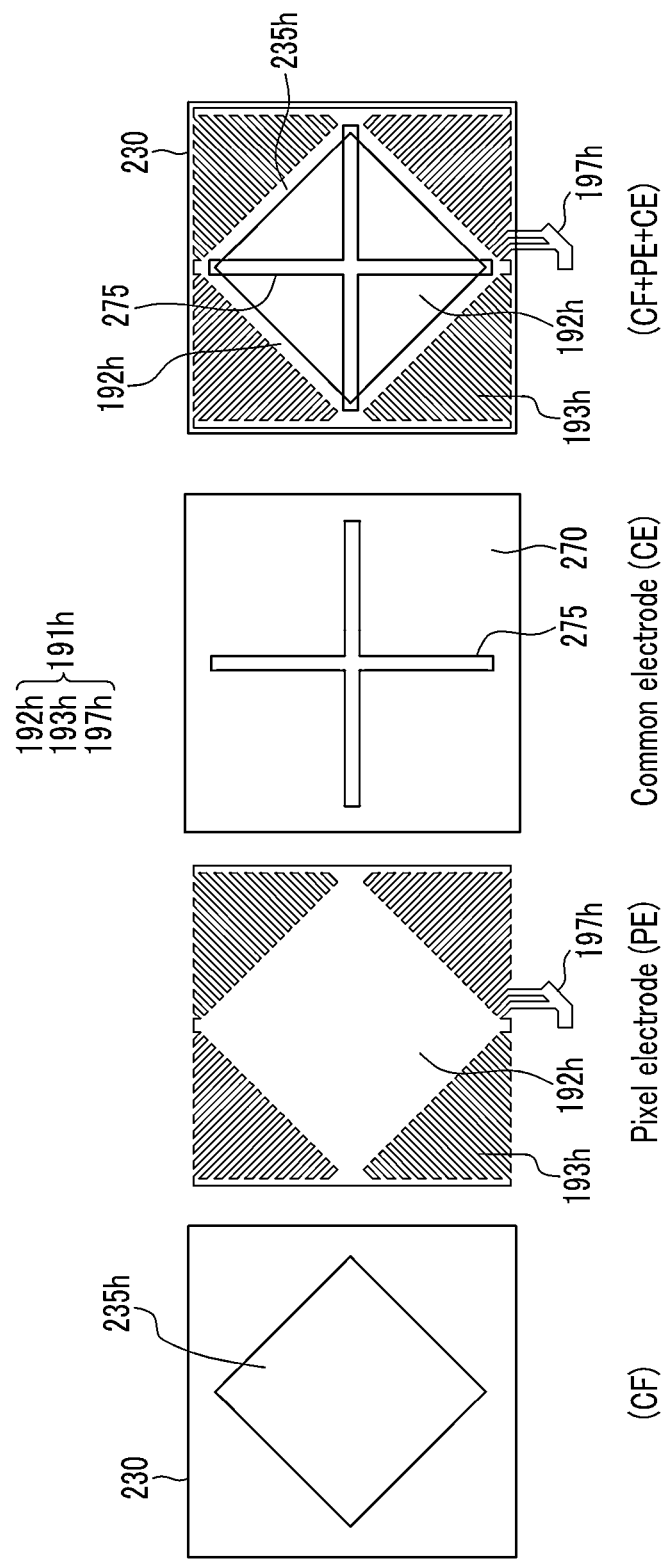

In FIG. 42, the step provider 235 of the color filter 230 has a rhombus shape, and the upper common electrode 270 has the cross shaped opening 275.

The exemplary embodiment of FIG. 42 will be described below.

The color filter 230 is positioned on the lower substrate 110. The thin film transistor may be formed between the color filter 230 and the substrate 110. The color filter 230 has the opening 235*h*, as opposed to another exemplary embodiment, of a rhombus shape, having the length of all edges the same in the present exemplary embodiment. As a result, as in another exemplary embodiment, the cross-shaped protrusion is not formed on the color filter 230.

The first sub-pixel electrode 191*h* is formed on the color filter 230. The first sub-pixel electrode 191*h* has the same structure as that of FIG. 36. That is, the first partial plate electrode 192*h* positioned at the center and a plurality of first minute branch electrodes 193*h* protruding from the first partial plate electrode 192*h* in the oblique direction are included. The first sub-pixel electrode 191*h* includes the first partial plate electrode 192*h* and a plurality of first minute branch electrodes 193*h* positioned in the square region, and is connected to the output terminal of the thin film transistor by the first connection 197*h* extending outside the square region.

The first partial plate electrode 192*h* has a rhombus shape, a center thereof is positioned at a center of the square region, and each vertex of the rhombus meets the boundary of is the square region.

The first partial plate electrode 192*h* covers the first opening 235*h* of the color filter 230, and the edge of the oblique direction of the first opening 235*h* and the edge of the oblique direction of the first partial plate electrode 192*h* are parallel to each other. As a result, the first partial plate electrode 192*h* has the step provided by the first opening 235*h* of the color filter

230. That is, FIG. 42 is a view showing the pixel electrode PE and the color filter CF in a plane view. However, it is actually a structure having a step resulting from the opening 235*h* of the color filter 230.

A plurality of first minute branch electrodes 193*h* extend in the edge of the oblique direction of the first partial plate electrode 192*h*. The plurality of first minute branch electrodes 193*h* fill the rest of the region and form an angle of 90 degrees with respect to the edge of the oblique direction of the first partial plate electrode 192*h*.

The first sub-pixel electrode 191*h* includes the first longitudinal connection 194*h* connecting the first partial plate electrode 192*h* and the ends of a plurality of first minute branch electrodes 193*h* in a longitudinal direction or a horizontal direction. The first longitudinal connection 194*h* and the first minute branch electrode 193*h* form an angle of 45 degrees. However, according to an exemplary embodiment of the present invention, the first longitudinal connection 194*h* may be omitted, and in this case, a plurality of first minute branch electrodes 193*h* may protrude to the outside.

According to an exemplary embodiment, the angle between the edge of the oblique direction of the first partial plate electrode 192*h* and the first minute branch electrode 193*h* may be changed and may be more than 85 degrees to less than 95 degrees. The first minute branch electrode 193*h* and the first longitudinal connection 194*h* may form an angle of more is than 40 degrees to less than 50 degrees.

In the exemplary embodiment of FIG. 42, the common electrode 270 positioned under the upper substrate 210 has the opening 275. The opening 275 of the common electrode 270 is formed corresponding to the position of the cross-shaped protrusion formed in the color filter 230 in another exemplary embodiment. That is, the center of the opening of the cross shape is positioned at the center of the square region, and the opening is extended in the up/down and right/left direction with the same length such that the center of the opening of the cross shape accords with the center of the first partial plate electrode 192*h*.

Here, the line width of the opening 275 of the common electrode 270 may have a size of more than ⅓ to less than 1 times that of the line width of the protrusion 232 of the cross shape formed in the color filter 230 in another exemplary embodiment, thereby having the line width corresponding to the line width of the longitudinal extension 195 and the transverse extension 196 in another exemplary embodiment.

The opening 275 of the cross shape formed in the common electrode 270 controls the arrangement direction of the liquid crystal molecules in the center region at the lower region provided by the opening 235*h* of the color filter 230. As a result, the texture that is generated from the center of the square region to the cross shape may be maximally reduced.

In the exemplary embodiment of FIG. 42, as shown in FIG. 44, the pretilt providing polymer 350 may be included in the liquid crystal layer 3, and at this time, when the step provided by the opening 235*h* of the color filter 230, the pattern of the minute branch electrode 193, and the opening 275 of the common electrode 270 only control the liquid crystal molecules but the texture is not decreased, the pretilt providing polymer 350 may be additionally used.

In the exemplary embodiment of FIG. 42, as compared with another exemplary embodiment, the size of the opening 235*h* of the color filter 230 is large such that the white luminance is high and the texture is reduced by controlling the liquid crystal molecules such that the portion to be covered is reduced, resulting in an increase in the aperture ratio and the transmittance. However, as compared with another exemplary embodiment, the common electrode 270 must be etched once to form the opening 275 such that the additional process is required.

In the exemplary embodiment of FIG. 42, as opposed to another exemplary embodiment, the opening 235 of the color filter 230 has the rhombus shape, and the common electrode 270 has the cross-shaped opening 275. This structure may be applied to another exemplary embodiment of FIG. 39 to FIG. 41 as well as the exemplary embodiment of FIG. 33, FIG. 34, and FIG. 36 like FIG. 42, and may also be applied to the lower sub-pixel. The cross-shaped opening 275 of the common electrode 270 is formed at the position corresponding to the cross-shaped protrusion formed by the opening 235 of the color filter 230 in each exemplary embodiment.

Next, a cross-sectional view of the opening 235*a* of the color filter 230 according to another exemplary embodiment of the present invention will be described with reference to FIG. 43.

Figure 43:
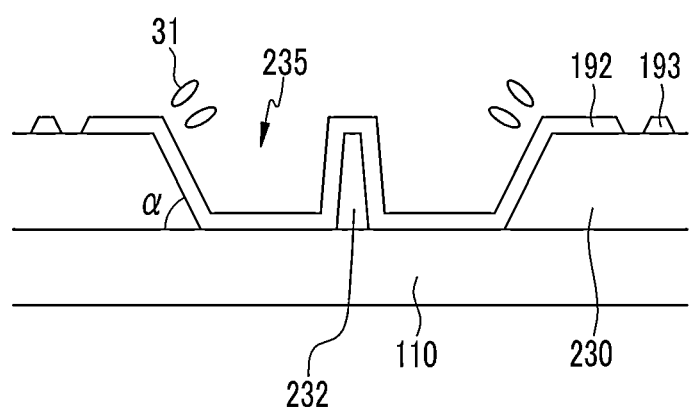
FIG. 43 is a cross-sectional view of a color filter according to another exemplary embodiment of the present invention.

FIG. 43 is a cross-sectional view of a color filter according to another exemplary embodiment of the present invention.

Comparing the cross-sectional view of FIG. 43 with the cross-sectional view of FIG. 34, the opening 235 of FIG. 34 does not have the taper structure such that the side of the opening 235 where the color filter 230 is removed has a vertical surface. However, in FIG. 43, is the side of the opening 235 has an inclined taper structure.

Usually, when forming the opening 235 in the color filter 230, a slight taper structure is generally generated, and the angle thereof may be controlled by controlling a process condition or by changing a mask (a transflective mask, a slit mask, etc.). That is, the taper angle ($\alpha$) in FIG. 43 may be controlled, and the liquid crystal molecule 31 may be arranged while having the pretilt according to the corresponding taper angle ($\alpha$), thereby reducing the texture. Therefore, as shown in FIG. 44, although the pretilt providing polymer 350 is not included in the liquid crystal layer 3, the texture may be reduced by controlling the taper angle ($\alpha$) of the side wall of the opening 235. However, according to an exemplary embodiment of the present invention, in contrast to the case that the texture may not be reduced although the taper angle ($\alpha$) of the side wall of the opening 235 is controlled, as shown in FIG. 44, the pretilt providing polymer 350 may be included in the liquid crystal layer 3.

Meanwhile, when forming the opening 235 of the color filter 230, the side wall generally has the inclined structure such that the color filter 230 must be sufficiently removed to form the opening 235, with the color filter 230 completely removed in the opening 235. Referring to the exemplary embodiments of FIG. 33 to FIG. 42 when considering this point, the minimum area of the opening 235 to be provided in one sub-pixel area is about 8%. If the opening 235 is formed to a value of less than 8%, a portion where the color filter 230 is not completely removed may be generated. Referring to the exemplary embodiments of FIG. 33 to FIG. 42, the maximum area of the opening 235 to be provided in one sub-pixel area is about 50%. Therefore, the opening 235 may formed with an area ratio of the range of more than 8% to less than 50% in the pixel area.

In FIG. 43, the cross-shaped protrusion 232 of the color filter 230 has an inclined is taper structure. If the tapered side is projected to the lower surface (hereinafter referred to as "the line width of the tapered side"), the line width of the tapered side may have about ⅓ of the width of the lower surface (hereinafter referred to as "a total line width"), and in this case, the upper surface of the tapered protrusion 232 also has the width of about ⅓ of the width of the lower surface.

As described above, the opening 235 of the color filter 230 is formed as the step provider. However, the step provider is not limited to the opening and may be formed as a groove. That is, the color filter 230 may remain with the predetermined thickness to form the groove instead of the opening where the color filter 230 is completely removed, thereby forming the step provider.

Meanwhile, the photo-reactive material may be included in the liquid crystal layer or the alignment layer, and this will be described with reference to FIG. 44.

FIG. 44 is a view of a process for providing a pretilt to liquid crystal molecules by using a prepolymer that is polymerized by light such as ultraviolet rays.

Referring to FIG. 44, firstly, prepolymers 330, such as a monomer that is polymerized by light, such as ultraviolet rays, are injected along with a liquid crystal material between the two display panels 100 and 200. The prepolymer 330 may be a reactive mesogen that is polymerized by light, such as ultraviolet rays.

The data voltage is applied to the first and second sub-pixel electrodes and a common voltage is applied to the common electrode of the upper panel 200, thereby forming the electric field in the liquid crystal layer 3 between the two display panels 100 and 200. Thus, the liquid crystal molecules 31 of the liquid crystal layer 3 are inclined in a predetermined direction in response to the electric field.

As described above, if light of ultraviolet rays is irradiated such that the liquid crystal molecules 31 of the liquid crystal layer 3 are inclined in the predetermined direction, the prepolymer 330 is polymerized, and as shown in FIG. 44, the pretilt providing polymer 350 is formed. The pretilt providing polymer 350 contacts with the display panels 100 and 200. The liquid crystal molecules 31 are determined to have the alignment direction in the above-described direction while having the pretilt produced by the pretilt providing polymer 350. Accordingly, when the voltage is not applied to the field generating electrodes 191 and 270, the liquid crystal molecules 31 are arranged with the pretilt of four directions.

As a result, the liquid crystal molecules 31 have the pretilt in four directions in each region of the upper and lower sub-pixels among the pixel.

The pretilt using the polymer, as shown in FIG. 44, may be additionally applied when the texture is not reduced through the control for the liquid crystal molecules by the step provided by the color filter 230.

In FIG. 44, the liquid crystal layer includes the photo-reactive material. However, the alignment layer may include the photo-reactive material.

As described above, the partial plate electrode is formed along with the minute pattern in the pixel electrode, thereby increasing the viewing angle and the lateral visibility of the liquid crystal display, as well as the response speed, and the step provider is provided at the color filter or the overlying layer to reinforce the control force of the liquid crystal molecules, thereby reducing the texture generated in the center of the pixel.

It will be apparent to those skilled in the art that various modifications and variations can be made in the present invention without departing from the spirit or scope of the invention. Thus, it is intended that the present invention cover the modifications and variations is of this invention provided they come within the scope of the appended claims and their equivalents.

What is claimed is:

1. A liquid crystal display comprising:
a substrate;
a pixel electrode comprising a partial plate electrode and a plurality of branch electrodes extending from the partial plate electrode and disposed on the substrate; and
a step provider disposed between the substrate and the pixel electrode,
wherein the step provider comprises a cross-shaped protrusion.

2. The liquid crystal display of claim 1,
further comprising an insulator disposed between the substrate and the pixel electrode,
wherein the cross-shaped protrusion and the insulator are formed in the same layer.

3. The liquid crystal display of claim 2, wherein the cross shaped protrusion is made of the same material as the insulator.

4. The liquid crystal display of claim 3, wherein the step provider further comprises a step providing groove sharing a side surface with the cross-shaped protrusion.

5. The liquid crystal display of claim 4, wherein the partial plate electrode covers the step providing groove.

6. The liquid crystal display of claim 5, wherein the step providing groove has a depth of more than 3000 Å.

7. The liquid crystal display of claim 6, wherein the step providing groove comprises a tapered side wall.

8. The liquid crystal display of claim 7, wherein a shape of the partial plate electrode corresponds to a shape of the step providing groove.

9. The liquid crystal display of claim 8, wherein the partial plate electrode has a polygonal shape or a circular shape.

10. The liquid crystal display of claim 9, wherein the branch electrode is connected to the partial plate electrode at an angle.

11. The liquid crystal display of claim 10, wherein one edge of the partial plate electrode and the branch electrode form an angle in a range of 90±15 degrees.

12. The liquid crystal display of claim 10, wherein a color filter is disposed between the substrate and the insulator.

13. The liquid crystal display of claim 12, further comprising:
an opposing substrate facing the substrate; and
a liquid crystal layer disposed between the substrate and the opposing substrate; and
an alignment layer disposed between the liquid crystal layer and at least one of the substrate and the opposing substrate, and
at least one of the liquid crystal layer and the alignment layer comprises a pretilt providing polymer that is polymerized by light.

14. The liquid crystal display of claim 13, wherein the partial plate electrode has a larger width in a horizontal direction than the width in a vertical direction.

15. The liquid crystal display of claim 13, wherein the pixel electrode comprises a first sub-pixel electrode and a second sub-pixel electrode,
wherein the first sub-pixel electrode and the second sub-pixel electrode respectively comprise a partial plate electrode and a plurality of branch electrodes extending from the partial plate electrode, and
wherein the step provider comprises the step providing groove corresponding to the partial plate electrode and the cross-shaped protrusion.

16. The liquid crystal display of claim 15, wherein the partial plate electrode contacts at least one side of the first sub-pixel electrode or the second sub-pixel electrode.

17. The liquid crystal display of claim 15, wherein the partial plate electrode has a larger width in the horizontal direction than the width in the vertical direction.

18. The liquid crystal display of claim 15, wherein
at least one of the first sub-pixel electrode and the second sub-pixel electrode has a larger width in the vertical direction than the width in the horizontal direction.

19. The liquid crystal display of claim 6, wherein
the step providing groove comprises an inclined lower surface, and the lower surface is integrally formed with one side surface and is inclined with a slope.

20. The liquid crystal display of claim 19, wherein
a shape of the partial plate electrode corresponds to the shape of the step providing groove.

21. The liquid crystal display of claim 20, wherein
the partial plate electrode has a polygonal shape or a circular shape.

22. The liquid crystal display of claim 21, wherein
the branch electrode is connected to the partial plate electrode at an angle.

23. The liquid crystal display of claim 22, further comprising:
an opposing substrate facing the substrate;
a liquid crystal layer disposed between the substrate and the opposing substrate;
an alignment layer disposed between the liquid crystal layer and at least one of the substrate and the opposing substrate,
wherein the liquid crystal layer and the alignment layer do not comprise a pretilt providing polymer that is polymerized by,
the partial plate electrode has an octagonal shape, and
the color filter is not formed between the substrate and the pixel electrode.

24. The liquid crystal display of claim 23, wherein
one edge of the partial plate electrode and the branch electrodes form an angle in a range of 90±15 degrees.

25. The liquid crystal display of claim 23, wherein
the color filter is disposed between the substrate and the insulator.

26. The liquid crystal display of claim 22, further comprising:
an opposing substrate facing the substrate;
a liquid crystal layer disposed between the substrate and the opposing substrate; and
an alignment layer disposed between the liquid crystal layer and at least one of the substrate and the opposing substrate,
wherein at least one of the liquid crystal layer and the alignment layer comprises a pretilt providing polymer that is polymerized by light.

27. The liquid crystal display of claim 26, wherein
the partial plate electrode has a larger width in the horizontal direction than the width in the vertical direction.

28. The liquid crystal display of claim 26, wherein
the pixel electrode comprises a first sub-pixel electrode and a second sub-pixel electrode,
the first sub-pixel electrode and the second sub-pixel electrode respectively comprise the partial plate electrode and a plurality of branch electrodes extending from the partial plate electrode, and
the step provider comprises a step providing groove corresponding to the partial plate electrode and the cross-shaped protrusion step provider.

29. The liquid crystal display of claim 28, wherein
the partial plate electrode is configured to contact at least one side of the first sub-pixel electrode or the second sub-pixel electrode.

30. The liquid crystal display of claim 28, wherein
the partial plate electrode has a larger width in the horizontal direction than the width in the vertical direction.

31. The liquid crystal display of claim 28, wherein
at least one of the first sub-pixel electrode and the second sub-pixel electrode has a larger width in the vertical direction than the width in the horizontal direction.

* * * * *